(12) United States Patent
Han

(10) Patent No.: US 10,675,751 B2
(45) Date of Patent: Jun. 9, 2020

(54) MULTI-MOTION-PLATFORM PARALLEL ROBOT CONSTRUCTION METHOD AND PARALLEL ROBOTS FOR SAME

(71) Applicants: BEIJING FINE WAY TECHNOLOGY CO., LTD., Beijing (CN); Fangyuan Han, Changchun (CN)

(72) Inventor: Fangyuan Han, Changchun (CN)

(73) Assignees: BEIJING FINE WAY TECHNOLOGY CO., LTD., Beijing (CN); Fangyuan Han, Changchun (CN)

(*) Notice: Subject to any disclaimer, the term of this patent is extended or adjusted under 35 U.S.C. 154(b) by 0 days.

(21) Appl. No.: 16/405,596

(22) Filed: May 7, 2019

(65) Prior Publication Data
US 2019/0262984 A1    Aug. 29, 2019

Related U.S. Application Data

(63) Continuation of application No. 15/576,657, filed as application No. PCT/CN2016/082745 on May 20, 2016, now Pat. No. 10,279,469.

(30) Foreign Application Priority Data

May 26, 2015   (CN) .......................... 2015 1 0275161

(51) Int. Cl.
*B25J 17/00*        (2006.01)
*B25J 9/00*         (2006.01)
(Continued)

(52) U.S. Cl.
CPC ............ *B25J 9/003* (2013.01); *B23Q 1/5456* (2013.01); *B23Q 1/5462* (2013.01); *B23Q 5/28* (2013.01); *B25J 9/00* (2013.01)

(58) Field of Classification Search
CPC ...... B23Q 1/5456; B23Q 1/5462; B23Q 5/28; B25J 9/00; B25J 9/003
See application file for complete search history.

(56) References Cited

U.S. PATENT DOCUMENTS

| | | | |
|---|---|---|---|
| 2004/0103739 A1 | 6/2004 | Brogardh | |
| 2006/0104793 A1* | 5/2006 | Skutberg | B23Q 1/5462 414/744.6 |
| 2007/0255453 A1 | 11/2007 | Brogardh | |

FOREIGN PATENT DOCUMENTS

| | | |
|---|---|---|
| CN | 1819901 A | 8/2006 |
| CN | 101973027 A | 2/2011 |

(Continued)

*Primary Examiner* — Muhammad S Islam
(74) *Attorney, Agent, or Firm* — IM IP Law; Chai Im; C. Andrew Im

(57) ABSTRACT

A multi-motion-platform parallel robot, comprising an original parallel mechanism; and a plurality of $N_1$ derivative parallel mechanisms, wherein: each of the parallel mechanisms possesses $N_2$ degrees-of-freedom (DOFs) and shares an identical set of DOF properties; $N_1$ is an integer greater than 1; $N_2$ is one of 2, 3, 4, 5 and 6; the original parallel mechanism includes an original base platform, an original movable platform and a plurality of $N_2$ original chains; the plurality of original chains connect the original base platform and the original movable platform; each of the original chains includes a plurality of generalized kinematic pairs interconnected in series; the derivative parallel mechanism includes a derivative base platform, a derivative movable platform and a plurality of $(N_2 \times N_1)$ derivative chains; and the plurality of derivative chains connect the derivative base platform and the derivative movable platform.

19 Claims, 20 Drawing Sheets

(51) Int. Cl.
*B23Q 1/54* (2006.01)
*B23Q 5/28* (2006.01)

(56) References Cited

FOREIGN PATENT DOCUMENTS

| | | |
|---|---|---|
| CN | 103522283 A | 1/2014 |
| CN | 104972453 A | 10/2015 |
| EP | 2740567 A2 | 6/2014 |

* cited by examiner

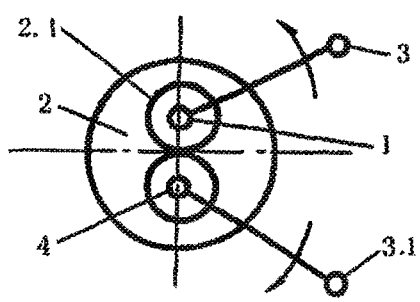
Figure1
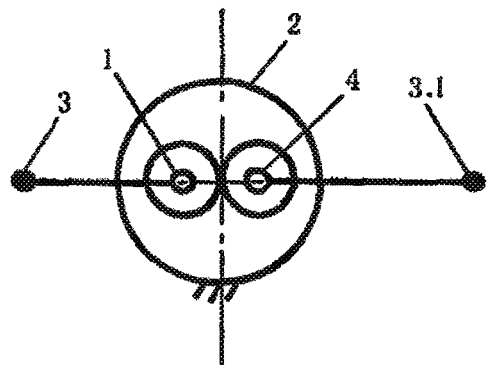
Figure2
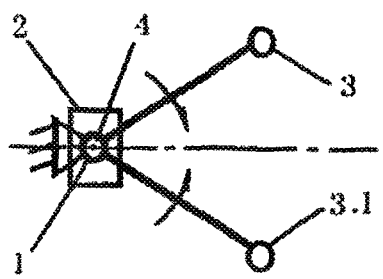
Figure3.1
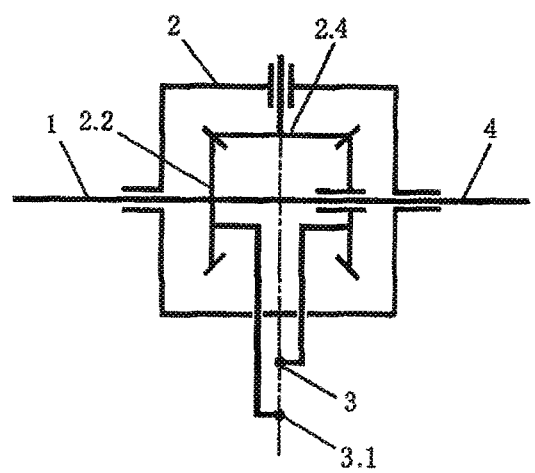
Figure3.2
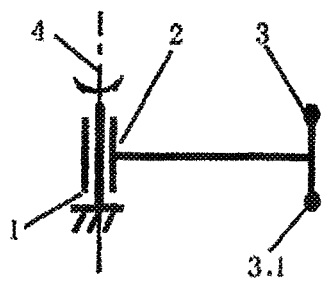
Figure4
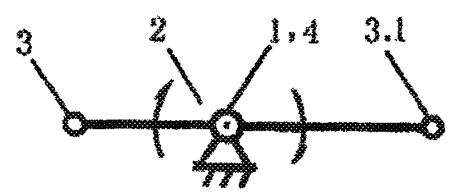
Figure5

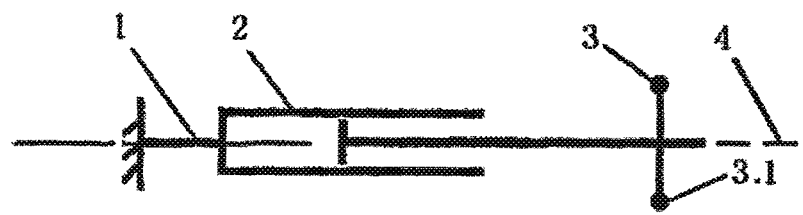
Figure6
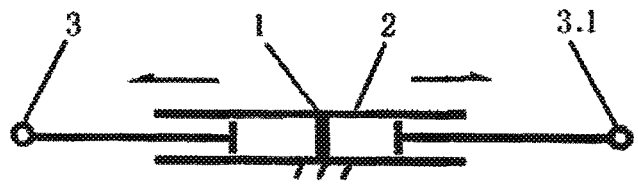
Figure7
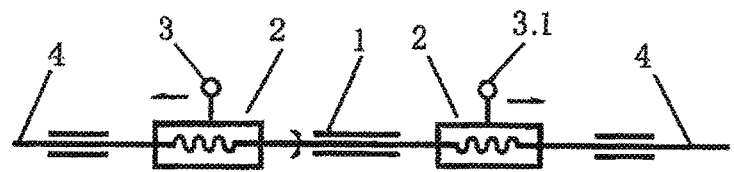
Figure8
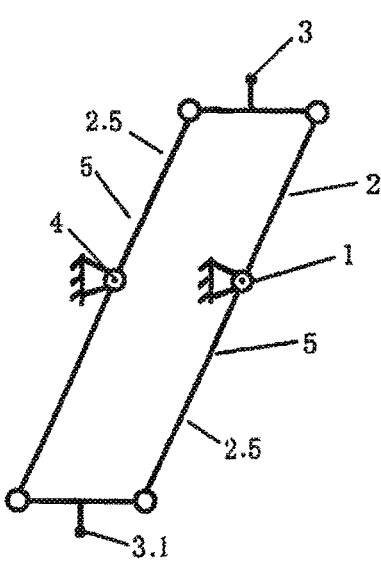 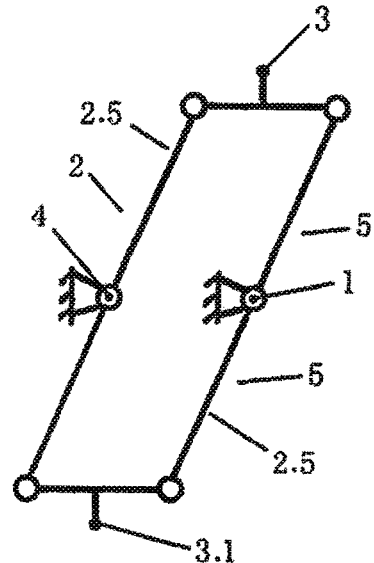
Figure9.1  Figure9.2

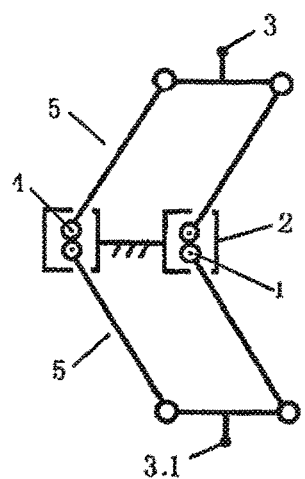
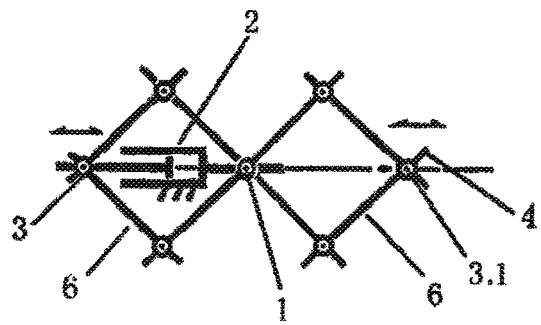
Figure10
Figure11.1
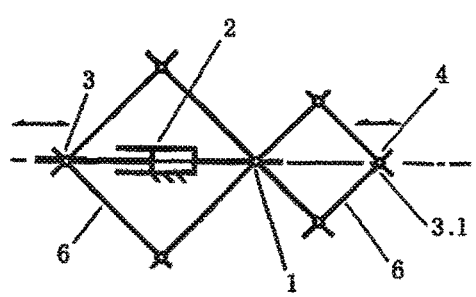
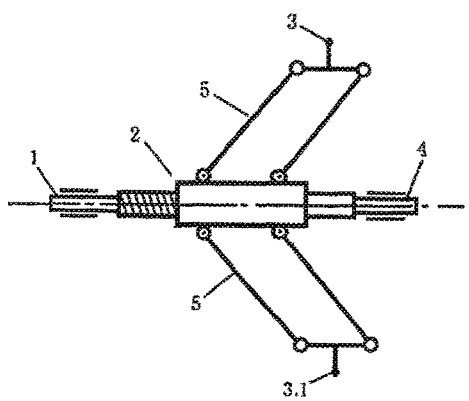
Figure11.2
Figure12.1
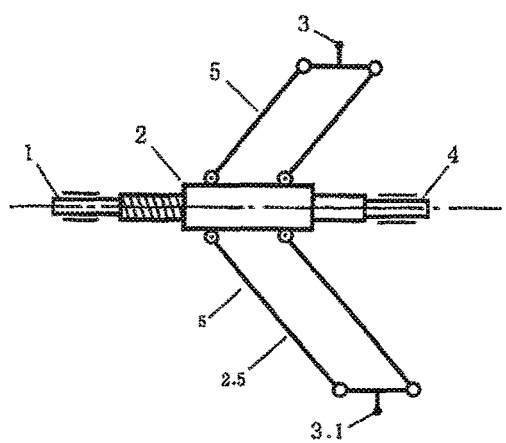
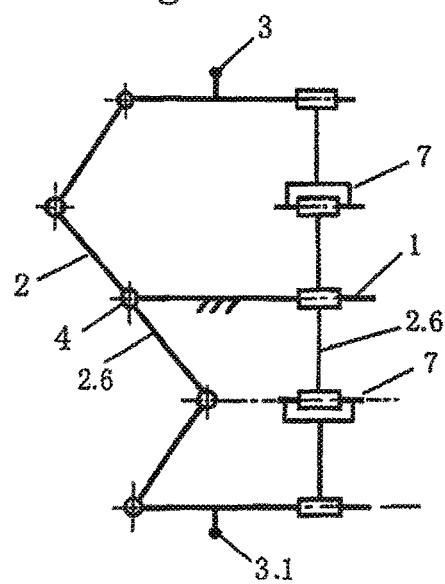
Figure12.2
Figure13

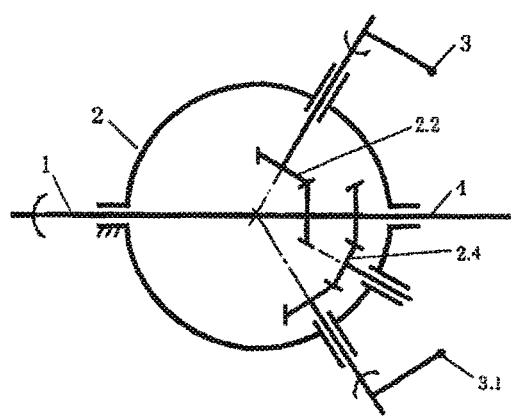
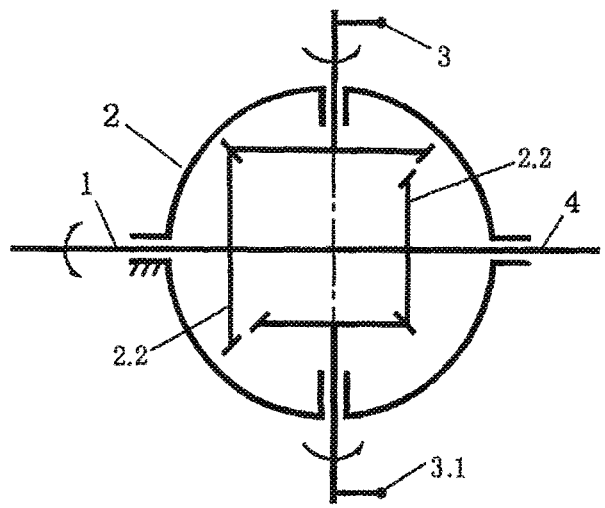
Figure 14　　　　　　Figure 15
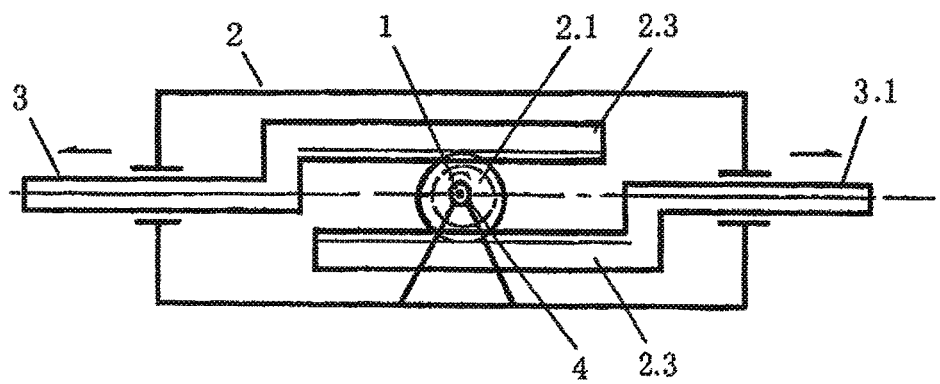
Figure 16
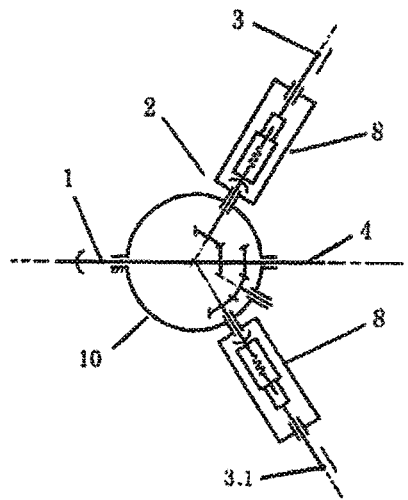
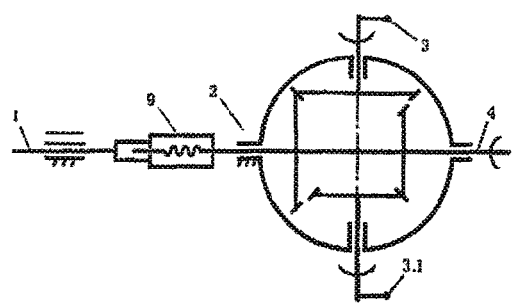
Figure 17　　　　　　Figure 18

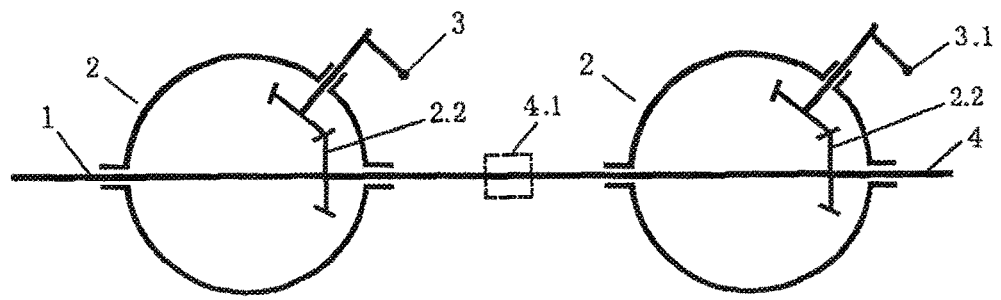
Figure 24
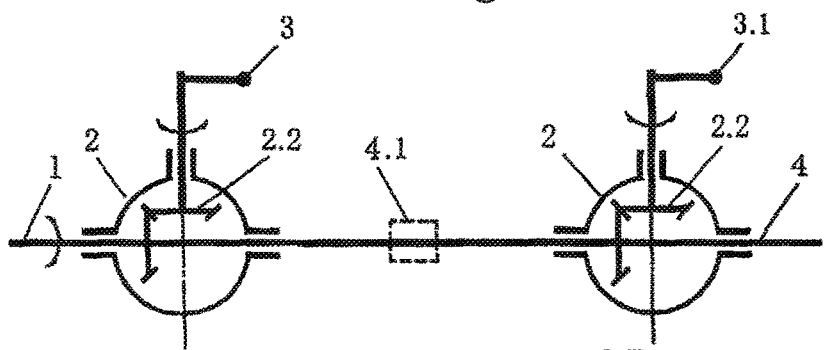
Figure 25
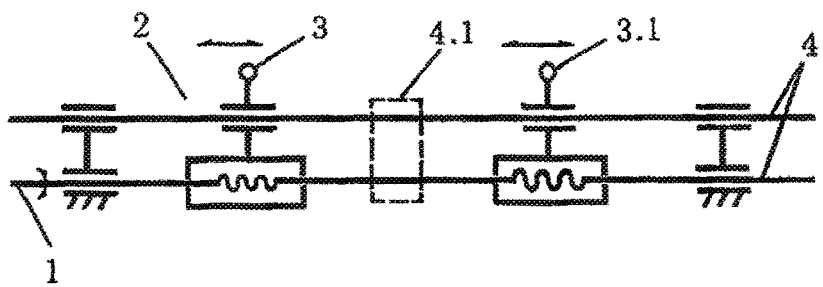
Figure 26
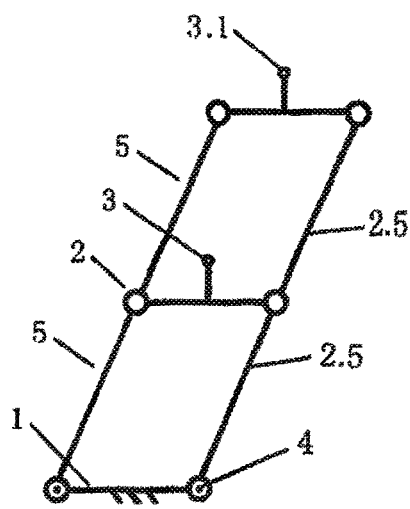
Figure 27
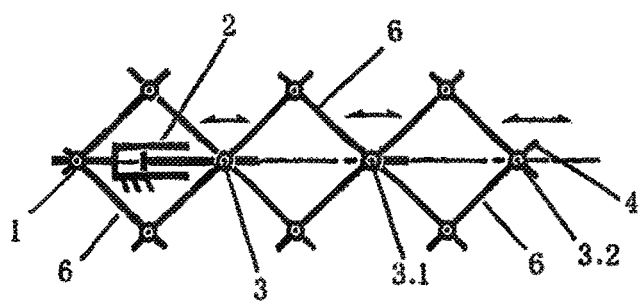
Figure 28.1

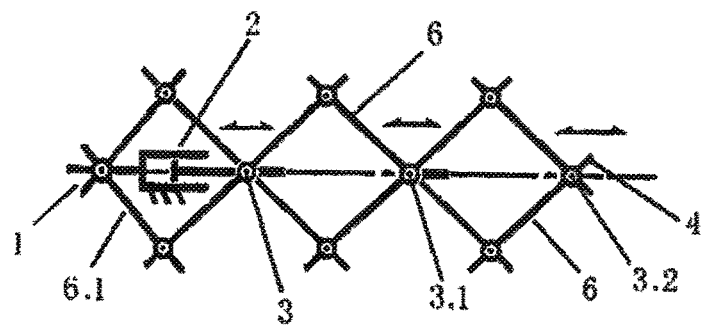
Figure28.2
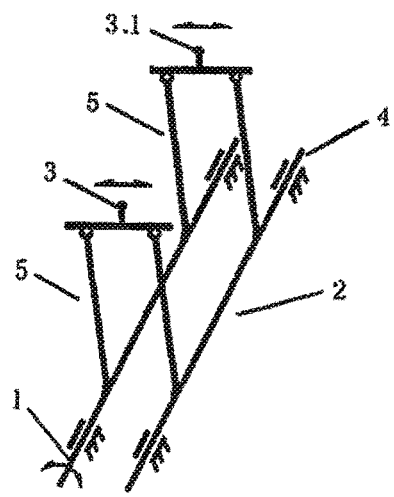
Figure29
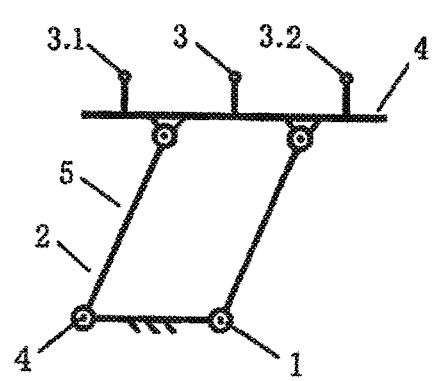
Figure30
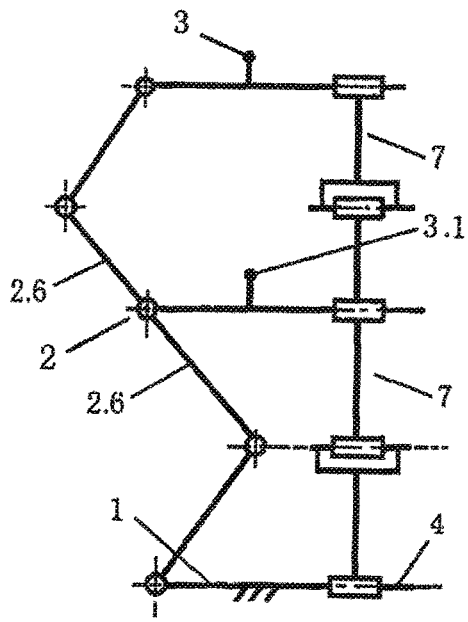
Figure31
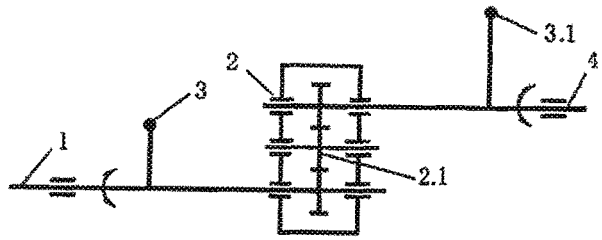
Figure32

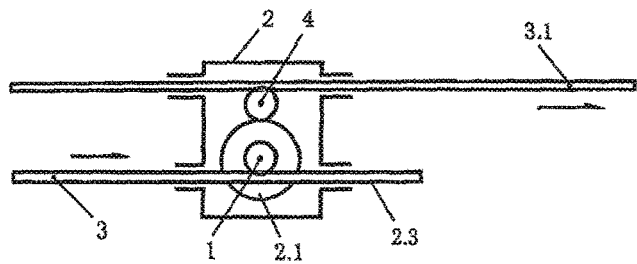
Figure33
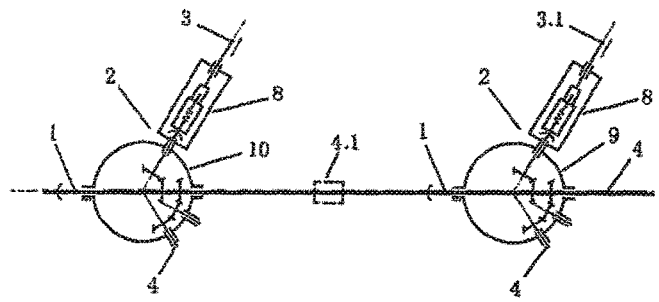
Figure34.1
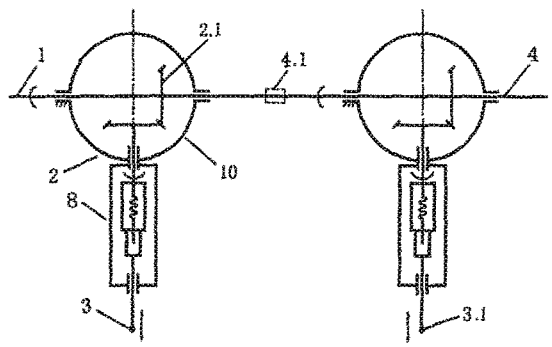
Figure34.2
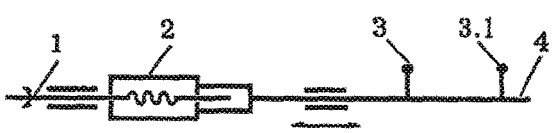
Figure35
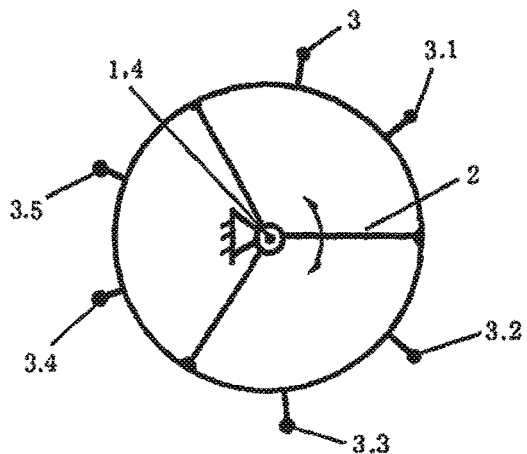
Figure36
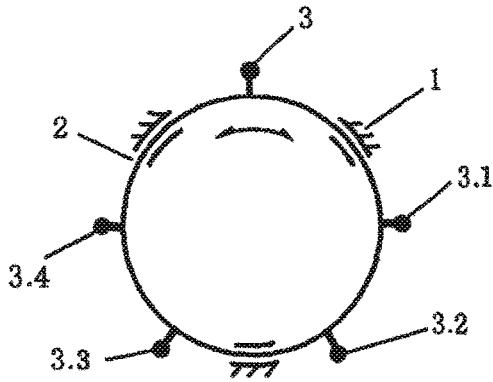
Figure37

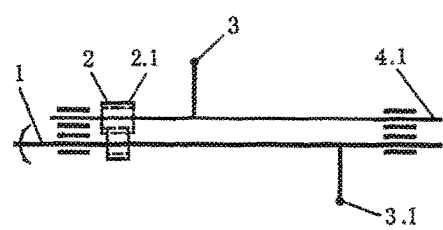
Figure45
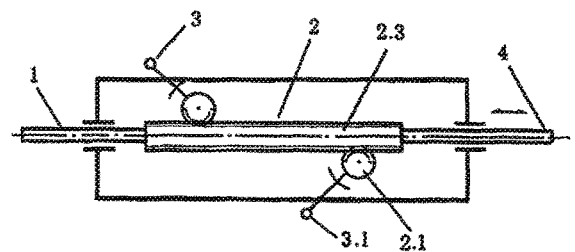
Figure46
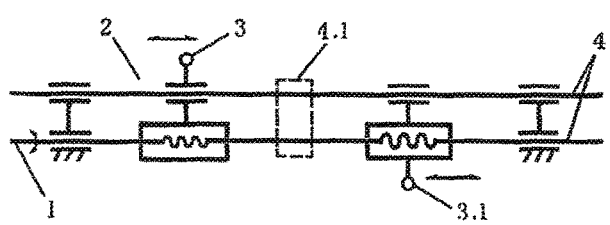
Figure47
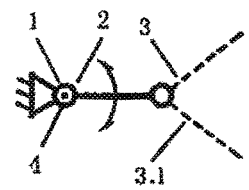
Figure48
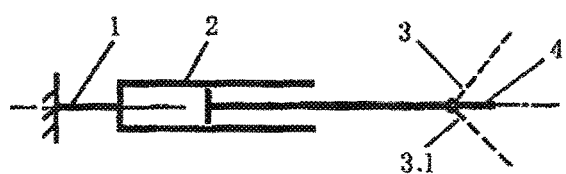
Figure49
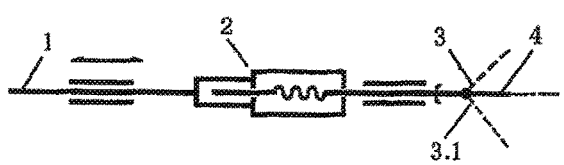
Figure50
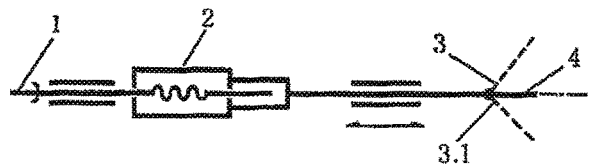
Figure51
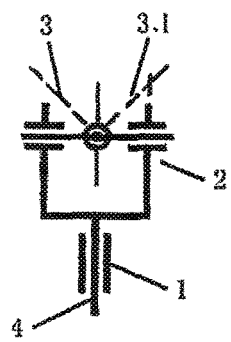
Figure52.1
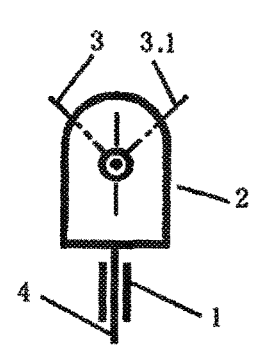
Figure52.2
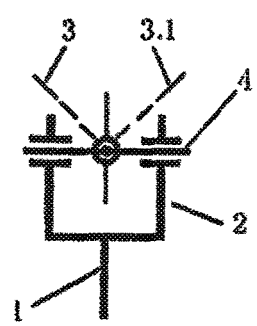
Figure52.3

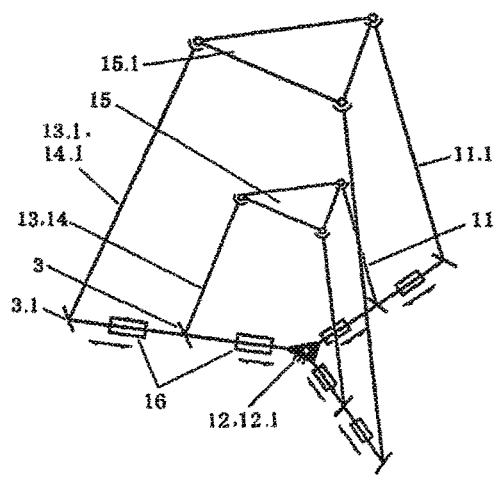
Figure 84
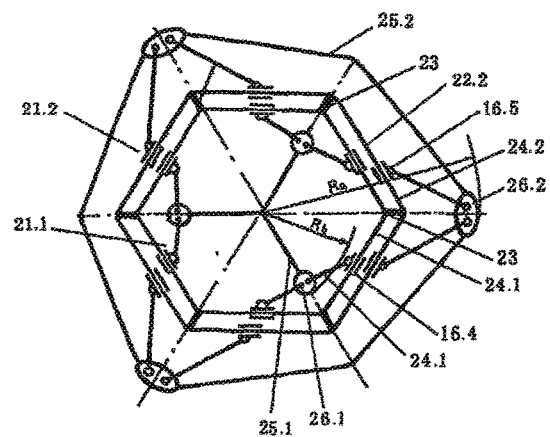
Figure 85.1
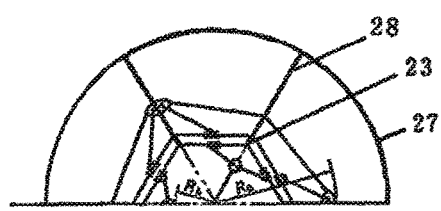
Figure 85.2
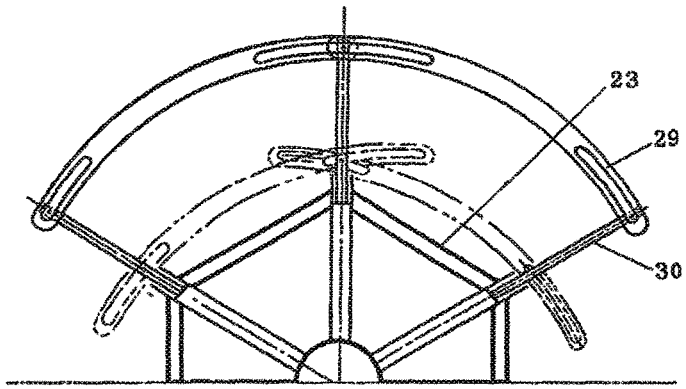
Figure 86
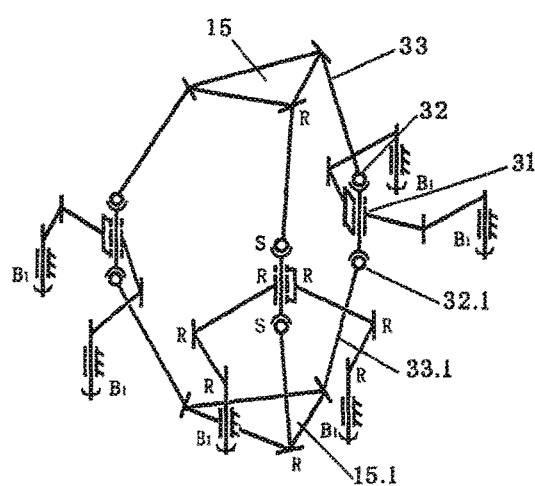
Figure 87
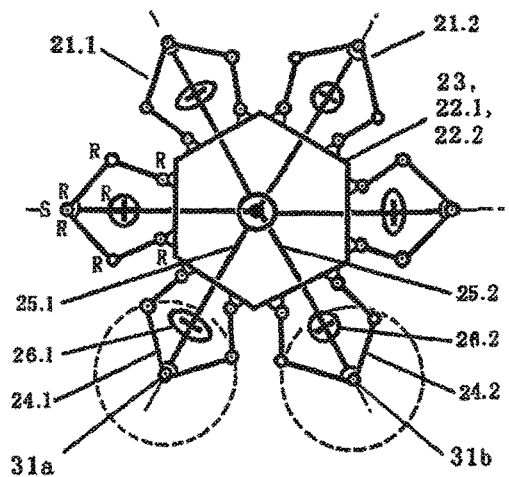
Figure 88

MULTI-MOTION-PLATFORM PARALLEL ROBOT CONSTRUCTION METHOD AND PARALLEL ROBOTS FOR SAME

RELATED APPLICATIONS

The present application is continuation application of application Ser. No. 15/576,657 filed Nov. 22, 2017, which is a national stage application of the international application PCT/CN2016/082745 having an international filing date of May 20, 2016, which claims the benefit of the Chinese patent application CN201510275161.6 filed May 26, 2015, each of which is incorporated herein by reference in its entirety.

FIELD OF THE INVENTION

The invention discloses a multiple-movable-platform parallel robot construction method and a parallel robot, and in particular relates to improvements to parallel robot construction methods, belonging to the technical field of robotic mechanisms.

BACKGROUND OF THE INVENTION

The structure of current parallel robots comprises a base platform, a movable platform (also called as moving platform, as in the context hereafter), and derivative chains connected between the base platform and the movable platform.

Most existing parallel robots each have only one base platform, one movable platform and a group of derivative chains connected between the base platform and the movable platform. Such example includes handling (assembling) parallel robots and parallel machine tool robots. Both types of robots have the following defects: for handling (or assembling) parallel robots, one robot can only assemble components for one machine or equipment; and for parallel machine tool robots, one parallel machine tool robot can machine only one component at a time, but cannot conduct the same or substantially the same operation to two or more objects at the same time.

Some existing parallel robots also include parallel robots having two movable platforms. For example, patent reference CN 201320207661 discloses a parallel robot comprising two movable platforms and two groups of derivative chains, as well as two sets of corresponding driving and controlling systems which are independent from each other. Defects of this robot are that one object is manipulated by actuators on the two movable platforms and that it has a relatively complex structure. This robot cannot conduct the same or substantially the same operation to two or more objects at the same time.

There are also some walking parallel robots each comprising two parallel mechanisms and two movable platforms. Embodiments of them include walking parallel robots disclosed in patent reference CN 201010292424.1 and patent reference CN 03826959.7. Such a robot has two movable platforms and two groups of derivative chains, the structure of it comprises two parallel mechanisms which are independent from each other. Correspondingly, it comprises two sets of driving and controlling systems which are independent from each other. Walking action is achieved by means of the cooperation of two movable platforms (foot arches) which are independent from each other. A defect of such a robot is that the two movable platforms (foot arches) are equipped with two sets of driving and controlling systems which are independent from each other. The robot cannot be operated by only one set of driving and controlling system. The two independent parallel mechanisms can only walk or operate on one plane, but cannot walk on an opposite plane. In other words, if the robot is turned over by 180 degrees, it cannot walk. That is, the robot cannot conduct the same or substantially the same operation in two orientations.

Thus, a common defect in current parallel robots exists in that they do not comprise two or more movable platforms defined below: the movable platforms are associated with each other and possess certain symmetry, and they can fulfill the same or substantially the same operation or task by means of only one set of driving and controlling system.

An object of the invention is to overcome the above defect by providing a multiple-movable-platform parallel robot which comprises two or more movable platforms, the movable platforms possessing a certain symmetry therebetween and being able to conduct the same or substantially the same operation by means of only one set of driving system. In other words, the parallel robot comprises two or more movable platforms having the same or similar motion pattern. Meanwhile, the invention also provides a double-sided walking parallel robot which is also able to walk after it is turned over by 180 degrees, as well as a profiling or scaling type parallel robot.

OBJECTS AND SUMMARY OF THE INVENTION

The invention discloses a multiple-movable-platform parallel robot construction method, a parallel mechanism performing this method, and a parallel robot in which this is applied or this parallel mechanism is incorporated.

The technical solution according to a multiple-movable-platform parallel robot construction method disclosed by the invention is described below.

The parallel robot is composed of an original parallel mechanism and N1 (N1≥1) derivative parallel mechanism(s), each parallel mechanism having the same N2 (2≤N2≤6) degrees-of-freedom (DOFs) and the same DOF property.

The original parallel mechanism (which is also called as generating element) comprises a original base platform, an original movable platform and N2 (2≤N2≤6) original chain s connecting the original base platform with the original movable platform, each original chain being composed of two or more generalized kinematic pairs which are connected in series; the derivative parallel mechanism comprises a derivative base platform, a derivative movable platform and N2 (2≤N2≤6) derivative chains connecting the derivative base platform with the derivative movable platform.

The construction method comprising the steps of:
(1) Constructing the original parallel mechanism The original parallel mechanism (11) further meets the following five requirements:
(a) The original base platform is a planar base platform; (b) a first generalized kinematic pair in each original chain is an active pair; each original chain has only one active pair; an input end of the first kinematic pair of the original chain is a rotatable pair or a sliding pair; (c) the input end axes of the first generalized kinematic pairs are arranged in one or two or three orientations of: being parallel to the plane of the base platform, lying in the base platform plane, or being perpendicular to the base platform plane; (d) in two or three preceding generalized kinematic pairs of the original chain, at least one generalized kinematic pair is an expandable output kinematic pair; (e) the original movable platform is located at one side of the plane of the original base platform or is co-planar with the original base platform plane; in the original chain, a portion for connecting the expandable output kinematic pair with the original movable platform is called downstream original chain.

As to the original base platform, the generalized kinematic pair and the expandable output kinematic pair, detailed description of them will be seen from the section of detailed description to the original base platform, the generalized kinematic pair and the expandable output kinematic pair.

(2) Constructing the derivative parallel mechanism: comprising the following three steps:

a) Selecting and constructing a symmetrical multiple (double)-output kinematic pair (will be unitarily called as multiple-output kinematic pair) and the derivative base platform.

In each original chain of the original parallel mechanism, selecting an expandable kinematic pair, the expandable kinematic pair being also called as boundary kinematic pair; to this expandable kinematic pair, adding an output end which is called as an auxiliary output end, the original output end being called as main output end; totally N1 auxiliary output ends being added, the auxiliary output ends having the same function and symmetrical structure with the primary output end; the symmetry includes identity symmetry, translational symmetry, rotational symmetry, reflectional symmetry, gliding reflection symmetry, as well as scale symmetry.

The expandable kinematic pair becomes a multiple-output kinematic pair (comprising double-output kinematic pair) which has one more output end than the original generalized kinematic pair; in the derivative chain, a portion for connecting the boundary generalized kinematic pair with the derivative movable platform is called as downstream derivative chain; the downstream derivative chain is also called as auxiliary derivative chain.

A lower end point of the derivative chain is a hinge point between the derivative chain and the derivative base platform; the hinge points of the N2 derivative chains form the derivative base platform; the derivative base platform has the same, similar or substantially the same shape with the original base platform; the symmetry includes identity symmetry, translational symmetry, rotational symmetry, reflectional symmetry, gliding reflection symmetry, as well as scale symmetry.

As to the derivative base platform, multiple (double)-output kinematic pair and symmetry, detailed description of them will be seen from the section of detailed description to the derivative base platform, the multiple-output kinematic pair and symmetry.

b) Constructing the auxiliary derivative chains:

To each newly added auxiliary output end, connecting an auxiliary derivative chain or an auxiliary derivative rod element (the auxiliary derivative chain and the auxiliary derivative rod element will both be called as auxiliary derivative chain below); the downstream original chain in this auxiliary derivative chain is the same or substantially the same with that of the original chain; all the auxiliary derivative chains form a group of N2 auxiliary derivative chains; the auxiliary derivative chain is symmetrical with the downstream original chain; the symmetry includes translational symmetry, rotational symmetry, reflection symmetry, gliding reflection symmetry, as well as scale symmetry.

The derivative chain is also divided into two portions; with boundary kinematic pair (expandable kinematic pair) as a separation, the portion between the boundary kinematic pair and the derivative movable platform is called as downstream derivative chain, and the remaining portion of the derivative chain is called as upstream derivative chain. The downstream derivative chain is also called as auxiliary derivative chain. The downstream derivative chain and the upstream derivative chain form the derivative chain.

c) Connecting the derivative movable platform:

To a tip end of each one of the group of the auxiliary derivative chains, a derivative movable platform is connected, the derivative movable platform has the same, similar or substantially the same shape with the original movable platform, and the derivative movable platform is symmetrical with the original movable platform; in this way, a derivative parallel mechanism symmetrical with the original parallel mechanism is formed; the symmetry between the derivative movable platform and the original movable platform includes translational symmetry, rotational symmetry, reflectional symmetry, gliding reflection symmetry, as well as scale symmetry.

As to the derivative movable platform, detailed description of it will be seen from the section of detailed description to the derivative movable platform.

(3) Repeating sub-steps a), b) and c) of step (2); in this way, one more new symmetrical derivative movable platform is obtained, and one more new symmetrical derivative parallel mechanism is also obtained; repeating step (2) by N1−1 times; in this way, N1 new symmetrical derivative movable platforms and N1 new symmetrical derivative parallel mechanisms are obtained.

A multiple-movable-platform parallel robot in which the method of described above is effected, the parallel robot comprising an original parallel mechanism (11) and N1 (N1 ≥ 1) derivative parallel mechanisms, each parallel mechanism having the same N2 (2 ≤ N2 ≤ 6) DOFs and the same DOF property (that is, having the same number of DOF and the same components of the DOF).

(1) The original parallel mechanism has the following structure:

The original parallel mechanism (also called as generating element), comprises a original base platform, an original movable platform and N2 (2 ≤ N2 ≤ 6) original chain s connecting the original base platform with the original movable platform, each original chain being composed of two or more generalized kinematic pairs which are connected in series;

The original parallel mechanism meets the following five requirements:

(a) The original base platform is a planar base platform; when necessary, the original base platform is represented by B0;

Detailed description to the original base platform will be seen from the section of detailed description to the original base platform.

(b) A first generalized kinematic pair in each original chain is an active pair; each original chain has only one active pair; an input end of the first kinematic pair of the original chain is a rotatable pair or a sliding pair.

(c) The input end axes of the first generalized kinematic pairs are arranged in one or two or three orientations of: being parallel to the plane of the base platform, lying in the base platform plane, or being perpendicular to the base platform plane.

(d) In two or three preceding generalized kinematic pairs of the original chain, at least one generalized kinematic pair is an expandable output kinematic pair; the expandable output kinematic pair has (N1+1)*N2 output ends, in which there are N2 primary output ends, the primary output ends are located on the original chain, and the remaining (N1*N2) output ends are called as auxiliary output ends; the primary output end is symmetrical in structure with the auxiliary output end and has the same function, and the expandable kinematic pair is also called as boundary kinematic pair or symmetrical multiple-output kinematic pair; the original chain is divided into two portions by the boundary kinematic pair, in which a portion between the primary output end of the boundary kinematic pair and the original movable platform is called as downstream original chain; the primary output end is symmetrical auxiliary output end; the symmetry includes identity symmetry, translational symmetry, rotational symmetry, reflectional symmetry, gliding reflection symmetry, as well as scale symmetry.

In the original chain, except the downstream original chain, the remaining portion is called as upstream original chain. Detailed description to the generalized kinematic pair, the expandable output kinematic pair and the multiple-output kinematic pair will be seen from the section of detailed description to the generalized kinematic pair, the expandable output kinematic pair and the multiple-output kinematic pair.

(e) N2 downstream original chains are connected to the original movable platform, and the original movable platform is located at one side of the plane of the original base platform or is co-planar with the original base platform plane.

Detailed description to the original movable platform will be seen from the section of detailed description to the original movable platform.

(2) The derivative parallel mechanisms each have the following structure:

The derivative parallel mechanism comprises a derivative base platform, a derivative movable platform and N2*N1 derivative chains connecting the derivative base platform with the derivative movable platform; the derivative parallel mechanism has the following characteristics in structure:

(a) In the expandable output kinematic pair of the original chain, each auxiliary output end is connected with an auxiliary derivative chain; a portion between the auxiliary output end of the boundary kinematic pair and the derivative movable platform is called as downstream derivative chain; the downstream derivative chain portion is also called as auxiliary derivative chain; the auxiliary derivative chain is the same or substantially the same with the downstream original chain of the original chain; their structures are symmetrical, and the symmetry includes translational symmetry, rotational symmetry, reflectional symmetry, gliding reflection symmetry, as well as scale symmetry.

The derivative chain is also divided into an upstream portion and a downstream portion, the remaining portion of downstream derivative chain being called as upstream derivative chain. The downstream derivative chain and the upstream derivative chain form the derivative chain.

Detailed description to the derivative chain will be seen from the section of detailed description to the derivative chain.

(b) A lower end point of the derivative chain is a hinge point between a derivative chain and the derivative base platform, called as derivative lower-end hinge point; the derivative lower-end hinge points of a group of N2 derivative chains having the same symmetrical characteristics form a derivative base platform; there are totally N1 derivative base platforms; the derivative base platform is symmetrical with the original base platform, and the symmetry includes identity symmetry, translational symmetry, rotational symmetry, reflectional symmetry, gliding reflection symmetry, as well as scale symmetry. When necessary, the derivative base platforms are represented by B1, B2, B3.

Detailed description to the derivative base platform will be seen from the section of detailed description to the original base platform.

(c) The auxiliary derivative chains having the same symmetrical characteristics form a group of auxiliary derivative chains, and each group of auxiliary derivative chains include N2 auxiliary derivative chains; there are totally N1 groups of derivative chains.

(d) Each group of auxiliary derivative chains are connected to a movable platform to form a parallel mechanism, the movable platform being called as derivative movable platform (15.1), and the parallel mechanism being called as derivative parallel mechanism; N1 groups of auxiliary derivative chains are connected to N1 derivative movable platforms; the derivative movable platform is the same, similar or substantially the same with the original movable platform; the derivative movable platform is symmetrical with the original movable platform; there are N1 derivative movable platforms, and there are also N1 derivative parallel mechanisms; the derivative parallel mechanism is also symmetrical with the original parallel mechanism; the symmetry between the derivative movable platform and the original movable platform includes translational symmetry, rotational symmetry, reflectional symmetry, gliding reflection symmetry, as well as scale symmetry; the symmetry between the derivative parallel mechanism and the original parallel mechanism also includes translational symmetry, rotational symmetry, reflectional symmetry, gliding reflection symmetry, as well as scale symmetry.

Detailed description to the derivative movable platform and the symmetry between it and the original base platform will be seen from the section of detailed description to the original base platform the symmetry between it and the derivative movable platform.

By means of the requirements (a), (b), (c) on the original parallel mechanism and the requirement (a) on the derivative parallel mechanism, it ensures that one driving system can drive all the parallel mechanisms.

By means of the requirements (d), (e) on the original parallel mechanism and the requirements (b) (c), (d) on the derivative parallel mechanism, it ensures the symmetry between the original parallel mechanism and the derivative parallel mechanism.

As to the layout and preferred solutions of the input end axes of the first kinematic pair:

The input end axes of the first generalized kinematic pair have only two orientation manners: perpendicular to the base platform plane and parallel to base platform plane (comprising coinciding). For a 2-DOF multiple-movable-platform parallel robot or planar parallel mechanism which has only two original chain s, the orientations of the input end axes of two active pairs form relatively simple combinations, that is, there are three combination patterns: two axes both perpendicular to the original base platform plane; two axes both parallel to or coinciding with the original base platform plane; one of the two axes parallel to or coinciding with the original base platform plane, the other perpendicular to the original base platform plane. However, if the parallel mechanism has relatively more DOFs, more original chain s results in more active pairs, and the input end axes have a lot of combined orientation patterns. In general, some simple and useful patterns may be selected for real engineering practice. For example, a pattern in which the axes are star-like, a pattern in which the axes are tangent lines of the same circle (ellipse) or tangent lines of concentric circles in the same plane, a pattern in which the axes are parallel with each other, or a pattern in which all or some of the axes are coinciding. Some important preferred solutions will be described now:

Preferred solution 1 of active pair axes: star-like layout. In the case that not all the input end axes of the first generalized kinematic pair are parallel, a pattern in which the axes arranged to be star-like is preferred. In the star-like pattern, two or more input end axes of the active pair intersect at one point, or a generalized kinematic pair is disposed along each axis, or two generalized kinematic pairs having a coincident axis are disposed along one axis, or two generalized kinematic pairs having axes parallel with each other are disposed on opposite sides of one axis. The star-like pattern comprises Y-shaped pattern. A preferred solution is described below:

In a multiple-movable-platform parallel robot according to the invention, the input end axes of the first kinematic pair in the original chain are within the base platform plane, and at least three active pairs have their axes intersecting at one point. It can be understood with reference to Embodiment 8 and Embodiment 28.

A multiple-movable-platform parallel robot formed in star-like layout may form reflectional symmetry, translational symmetry, scale translation symmetry, scale reflection symmetry, etc. It can also form rotational symmetry.

Preferred solution 2 of active pair axes: ring-like layout. In the combination pattern of the input end axes of the active pairs, in the case that not all the axes are parallel, a preferred solution is that all the axes are tangent lines of the same circle (ellipse) or tangent lines of concentric circles in the same plane.

In a multiple-movable-platform parallel robot according to the invention, the input end axes of the active pair (i.e., the first kinematic pair input end of the original chain) are within the base platform plane and the axes are tangent lines of the same circle or ellipse or tangent lines of concentric circles in the same plane. In this case, the symmetry of the movable platform is rotational symmetry or reflectional symmetry. Examples can be seen from Embodiments 27, 29.

Preferred solution 3 of active pair axes: the axes are in parallel layout; in the input end axes, in a pattern in which many or all of the axes are parallel, a preferred solution is that all the axes are parallel or coincide with the base platform plane.

In a multiple-movable-platform parallel robot according to the invention, the input end axes of the active pairs are parallel to or coincide with the base platform plane and are parallel with or coincide with each other. Examples can be seen from Embodiments 5, 13, 15, 17, 19.

Preferred solution 4 of active pair axes: in a layout in which the axes are perpendicular to the base platform plane, for the input end axes, in a layout pattern in which many or all of the axes are perpendicular to the base platform plane, a preferred solution is that all the axes are perpendicular to base platform plane.

In a multiple-movable-platform parallel robot according to the invention, all the input end axes of the active pairs are perpendicular to the base platform plane. It can be understood with reference to Embodiments 7, 9, 12, 25.

There are also a lot of other combination patterns of the active pair input end axes, so the user can determine the concrete combination pattern based on real usage requirements.

For achieving a grasping or cutting operation, the movable platform of the multiple-movable-platform parallel robot may be mounted with a manipulator, for example, grasping tool, cutting tool, suction cup, electro-magnet, graver, paint brush, 3D printer, dexterous hand, laser head, spray gun, component parts, etc. A movable platform may be mounted with a plurality of manipulators. In this way, the following new parallel robot technical solution is generated:

According to the invention, a multiple-movable-platform parallel robot is characterized in that each moving platform is mounted with a manipulator.

In order to prevent unintentional errors of the multiple-movable-platform during a cutting operation, which errors may result in discarded components, a detecting sensor, for example a pressure or displacement sensor for sensing pressure or distance, is mounted to a moving platform of the multiple-movable-platform parallel robot. The remaining moving platforms are mounted with a grasping tool, a cutting tool or other manipulators. The corresponding manipulating element on the moving platform equipped with the detecting sensor is a concrete body, and when an instruction from the detecting sensor indicates that the concrete body may be hurt, the operation instruction is stopped to prevent wrong operation. In this way, the following new parallel robot technical solution having safety protection function is generated:

The multiple-movable-platform parallel robot can also perform profile machining to a complex-shaped component part. The machining comprises performing component scaling or variant. There is one moving platform mounted with a probe or sensor, and a component part which has already been machined or to be profiled is mounted to a corresponding working table on this moving platform. A probe or sensor is used for sensing the machining boundary of the component part. When the probe contacts the component part or the sensor detects a critical distance, the platform is no more advanced, and manipulators on other movable platforms conduct profiling operation. The probe is a rigid contact which cannot move anymore once it contacts a rigid object. For example, such an operation may be grinding a turbine blade of an aircraft engine which has a complex shape.

In this way, the following new parallel robot technical solution having safety protection function or having profile following function is generated:

According to the invention, a parallel machine tool robot is characterized in that: one moving platform is mounted with a probe or detecting sensor, and the remaining moving platforms are mounted with a manipulator. It can be understood with reference to Embodiment 19.

In the case that the primary output end and the auxiliary output end, the original movable platform and the derivative movable platform, or the derivative chains and the downstream original chain s of the multiple-movable-platform parallel robot have scaled symmetrical or special structural layout, the derivative movable platform can achieve a type of scaling function. For achieving the scaling function, there are two preferred solutions.

According to the invention, a scaling parallel robot is characterized in that: the multiple-movable-platform parallel robot is a symmetrical double-moving-platform parallel mechanism, the pair of the original movable platform and the derivative movable platform and/or the pair of the primary output end and the auxiliary output end are scaled symmetrical with each other, and the derivative chain is the same or substantially the same with the original chain. It can be understood with reference to Embodiment 26, 28.

According to the invention, a scaling robot is characterized in that: the multiple-movable-platform parallel robot is a double-moving-platform parallel robot, the input end axes of the active pairs are within the base platform plane, and the axes are tangent lines of the same circle or coincide with the radius of the circle, or are tangent lines of two concentric circles on the same plane or coincide with the radii of the circles; the multiple-output kinematic pair comprises a double-output kinematic pair; all the primary output ends are at the inner side of the circle or ellipse, and all the auxiliary output ends are at the outer side of the circle or ellipse; the auxiliary derivative chain is the same or substantially the same with the downstream original chain; the original movable platform is scaled symmetrical with the derivative movable platform scaled symmetrical. The inner and outer sides mentioned here are not limited to be within the base platform plane. During working, the ranges of inner and outer sides cover the sections above and below the base platform plane which are smaller than the radius of the circle. This scaling robot can also be used in scaled profile machining. For example, based on a smaller turbine blade, a larger turbine blade can be produced by scaled profile machining. Thus, a profiling parallel robot having scaling function is generated. It can be understood with reference to Embodiment 27.

In the case that a low-DOF parallel mechanism acts as a generating element, the original chain s are generally some types of special chains having relatively complex structure. For simplifying the structure, a passive chain can be added as a redundant chain. After a passive chain is added as a redundant chain, the selection flexibility of the original chain s is increased. Examples include using unrestraint 6-DOF chains. In this way, the following technical solution is generated:

According to the invention, in the multiple-movable-platform parallel robot, the original parallel mechanism is a low-DOF parallel mechanism; the original parallel mechanism comprises, in addition to the original chain, a redundant chain connecting the original base platform with the derivative base platform; the redundant chains is a passive chain; the number of DOF of the redundant chain is more than or equal to two, and is less than six; the original chain is an unrestraint 6-DOF chain.

Walking parallel robot pattern: a multiple-movable-platform parallel robot can be used as a walking parallel robot. The technical problem in prior art, that is, the walking parallel robot cannot walk after it is turned over by 180 degrees, is solved. It can be understood with reference to Embodiment 29, 30.

According to the invention, in a double-sided walking parallel robot, the original parallel mechanism of each multiple-movable-platform parallel robot is a parallel leg mechanism; each multiple-movable-platform parallel robot comprises a original parallel mechanism and a derivative parallel mechanism, the original parallel mechanism being reflectional symmetrical with the derivative parallel mechanism; one multiple-movable-platform parallel robot is called as Leg A, and the other is called as Leg B; the original parallel mechanism of Leg A and the original parallel mechanism of Leg B or the derivative parallel mechanism of Leg B are located at the same side to form a single-sided parallel walking robot; the derivative parallel mechanism of Leg A and another parallel mechanism of Leg B are located at another side to form another single-sided parallel walking robot; the original base platforms of Leg A and Leg B are located in a plane, and the two original base platforms are fixedly connected to each other form a hip joint; all the four movable platforms are of a foot arch structure, which is called as movable platform foot arch; the movable platform foot arch is provided with toes.

The original parallel mechanism of Leg A is composed of the original base platform of Leg A, the original chain of Leg A and the original movable platform foot arch of Leg A; and the original parallel mechanism of Leg B is composed of the original base platform of Leg B, the original chain of Leg B and the original movable platform foot arch of Leg B. Each movable platform foot arch is provided with toes.

The two parallel leg mechanisms are arranged in one of the following ways:

(1) One of the two multiple-movable-platform parallel robots at the left side, and the other one at the right side;

(2) One of the two multiple-movable-platform parallel robots is larger, and the other one is smaller, the smaller one being within the larger one; two movable platforms foot arches located at the same side of the original base platform have different sizes or have different heights or have different sizes and heights;

(3) The two multiple-movable-platform parallel robots are disposed in a cross manner; two movable platforms foot arches (25.2) located at the same side of the original base platform have different sizes or have different heights or have different sizes and heights.

The terms larger and smaller used here may refer to the whole body or to a partial portion, for example, for comparing the sizes of two foot arches.

The double-sided walking parallel robot solves the problem that the walking parallel robot cannot walk after it is turned over by 180 degrees; however, there may be a new problem: the robot cannot walk when it is standing-by-side or the robot cannot recover its walking ability. For solving these problems, the following solution is proposed.

According to the invention, the double-sided walking parallel robot, the smaller one of the two double-moving-platform parallel robots is within the larger one; two movable platforms foot arches located at the same side of the original base platform have different sizes or have different heights or have different sizes and heights.

The hip joints on the base platform plane are provided with a returning ring which is larger than base platform; the returning ring is in the form of a circular ring, for connecting link rods with the hip joints together; the returning ring and the hip joints share the same center; the radius of the returning ring is larger than $L/\cos\theta$, and the radius of the returning ring is not smaller than the larger one of the radius of the circumscribed circle of the toes and the radius of the circumscribed circle of the hip joints;

wherein in the expression $L/\cos\theta$, L is the distance from the mid-point between two neighboring toes to the center of the original base platform, the mid-point between two neighboring toes being call in a simplified way as mid-point of toes; and when drawing a connecting line from the mid-point of toes to the center of the original base platform, $\theta$ is the angle between a connecting line and the original base platform plane.

As to the selection of the radius of the returning ring, the above solution means that a determined double-sided walking parallel robot has three radii: the radius of the circumscribed circle of toes (if there are two different radii, the larger one is selected), the radius of the circumscribed circle of the hip joints, and the radius calculated from expression $L/\cos\theta$. The radius of the returning ring is selected as the maximum one of the three radii.

In a design procedure, the requirements in selection of two neighboring toes are not strict. By using different selection methods, different recovering abilities can be obtained. The hip joints shall comprise moving elements on the base platform plane; for example, in Embodiment 33 shown in FIG. 88, a circle drawn according to the radius of the hip joints shall encircle the areas of dashed lines.

As to the size of the returning ring, the following condition shall be taken into consideration: when a certain point on the returning ring contacts the ground (horizontal ground surface), there are also two toes contacting the ground to form a triangle; now the projection point of the weight center of the robot on the horizontal ground surface is outside the triangle. The returning ring has two functions. First, when the robot is standing-by-side, the returning ring can help the double-sided walking parallel robot to return to a normal upstanding state (or a reversed state) (like a tumbler); second, when the robot is standing-by-side and cannot return to a normal upstanding state, the returning ring can be used as a rolling ring. By changing the position of the weight center of the double-sided walking parallel robot, rolling can be achieved.

As to the selection of the radius of the returning ring, the above solution means that a double-sided walking robot has three radii: the radius of the circumscribed circle of toes, the radius of the circumscribed circle of the hip joints, the radius calculated form expression $L/\cos\theta$. The radius of the returning ring can be selected as the maximum one of the three radii. It can be understood with reference to Embodiments 30, 31

A new problem created after a returning ring is added is that the overall size of the walking parallel robot becomes larger and the passing-through ability becomes worse. For solving this new problem, a method is to reduce the height of the walking parallel robot in the case that the radius of the returning ring is determined. For example, the overall height of the walking parallel robot is smaller than 60% of the diameter of the returning ring, so the radius of the returning ring can be made to be the smallest one. Another method for solving the above problem consists in the following solution.

According to the invention, in the double-sided walking parallel robot, the returning ring is substituted by N3 (N3≥2) segments of arched rods; opposite ends of each arched rod is formed with a slot, the slot extending in the direction of a tangent line of the returning ring; neighboring arched rods are overlapping with each other; the N3 arched rods form the returning ring; the rod elements for connecting the hip joints with the arched rods are substituted by N3 contracted mechanisms; each contracted mechanism is one of the following serial mechanisms: PR mechanism (the axis of the rotatable pair is perpendicular to the axis of the sliding pair), CR mechanism (the axis of the rotatable pair is perpendicular to the axis of the cylinder pair), HR mechanism (the axis of the rotatable pair is perpendicular to the axis of the helical pair), RR mechanism (the axes of the two rotatable pairs are parallel with each other), RRR mechanism (the axes of the three rotatable pairs are parallel with each other); from one or more of above mechanisms, N3 serial mechanisms are selected as a group of contracting mechanisms; the axes of the rotatable pairs of the contracted mechanism are perpendicular to base platform plane; one end of each rotatable pair of the contracted mechanism movably fits with slots in two neighboring arched rods so that the rotatable pair is slidable in the slots, and the other end of the rotatable pair is connected with a hip joint.

For example, an RR serial mechanism may be used. The axis of the rotatable pair is perpendicular to the base platform plane; a rotatable pair is connected to a hip joint at a location near its center. Another rotatable pair is connected to the slots of two neighboring arched rods. The slots of the two neighboring arched rods form movable fit with the rotatable pair at the end of the serial mechanism RR. The rotatable pair is slidable in the slots of the arched rods. Near the rotatable pair of the hip joint is a driving pair. The RR mechanism can be rotated around the rotatable pair on the base platform. After the driving pair is rotating, the arched rods can be contracted. The diameter of the walking parallel robot is reduced, and the passing-through ability is increased. The contraction mechanism can also be substituted by other structures having similar functions.

The expanded arched rods form a circle; this circle may be concentric with the center of the base platform, or is offset therefrom.

A rolling torque can be formed by means of this offset, so that a driving force is provided to the walking robot which is standing-by-side.

In order to increase the ability that the walking robot keeps the moving platform in a horizontal state and has a larger step length when the robot is walking on a slanted road or is walking upstairs, the following solution is proposed.

According to the invention, in the double-sided walking parallel robot, each parallel mechanism comprises two original parallel mechanisms and two derivative parallel mechanisms; on each movable platform (foot arch), at least one toe is mounted with a generalized sliding pair. The angle between the axis of this generalized sliding pair and the normal line of the toes plane is not larger than 30 degrees. The slanted axis can be used for adjusting the distance between toes or reducing interference. This generalized sliding pair includes a rotatable pair, a cylinder pair, or a helical pair.

There are many patterns of walking parallel robots; most walking robots disclosed in patent references CN 201010292424.1 and CN 03826959.7 can be used in the present invention.

There are some patterns of combined downstream chains: the connection manners between the chains and the movable platform can be classified into three types according to the relations of neighboring derivative chains: double-straight-line shaped, inverted V-shaped, or X-shaped. In the double-straight-line shaped type, two neighboring derivative chains are directly connected with the movable platform, each chain being equipped with a movable platform hinge point; the number of the movable platform hinge points equals to the number of the active chains. Examples can be seen from Embodiments 1, 7. In the second type, or inverted V-shaped type, two or three chains are connected with the movable platform via a composite hinge; two neighboring chains are inverted V-shaped, and the inverted V-shaped chains are jointed to one point at the connection to the movable platform; the number of the movable platform hinge points is smaller than the number of the active chains. Two or the three derivative chains are arranged in an inverted V-shape. Examples can be seen from Embodiments 18, 27. In the third type, two derivative chains are first combined into one derivative chain, and are then connected with the movable platform. The combined derivative chain is X-shaped, as simply called as X-shaped chains. In the third type, the number of the hinge points connected with the movable platform is reduced, the number of the derivative chains near the movable platform is reduced, and the partial interference space of the chains near the movable platform is reduced, and thus a distinctive pattern is formed, which can be used in walking parallel robots. The third type is suitable to be used in a parallel mechanism in which the number of DOF is more than 3. There is also a pattern in which three derivative chains are combined into one. The third type forms the following new pattern:

According to the invention, the symmetrical multiple-movable-platform symmetrical parallel robot is characterized in that: it comprises only one derivative parallel mechanism; the derivative parallel mechanism is reflectional symmetrical with the original parallel mechanism; the number of the original chain s is at least three to at most seven; the third generalized kinematic pair of the original chain comprises a double-output kinematic pair; the output ends of the double-output kinematic pair are reflectional symmetrical with each other; at least one pair of neighboring original chain s share a double-output kinematic pair, with the original two downstream original chains being combined into a downstream original chain and then being connected with the original movable platform, and the original two auxiliary derivative chains being combined into an auxiliary derivative chain and then being connected with the derivative movable platform; the derivative parallel mechanism is reflectional symmetrical with the original parallel mechanism.

In a 6-DOF original parallel mechanism, if there are three pairs of original chain s be combined, there will be only three downstream original chain s connected with a single original movable platform. Meanwhile, if three pairs of auxiliary derivative chains are combined, there will be only three auxiliary derivative chains connected with a single derivative movable platform. The original parallel mechanism takes the 6-DOF parallel mechanism proposed by Ben-Horin as a prototype. Three planar 2-DOF dollies are substituted by 2-translational-DOF planar parallel mechanisms (for example, 2-RRR, 2-RPR, 2PRR). Three rods having fixed lengths and the kinematic pairs connected with them remain unchanged.

The pattern in which two original chain s share one double-output kinematic pair can be used in constructing a 5-DOF multiple-movable-platform parallel robot, or constructing a 4-DOF multiple-movable-platform parallel robot. It can also be used in constructing a walking parallel robot. It can be understood with reference to Embodiments 32, 33.

According to the invention, a double-sided walking parallel robot is characterized in that: it comprises two multiple-movable-platform parallel robots, and the original parallel mechanisms of two multiple-movable-platform parallel robot are each a parallel leg mechanism; the two original base platforms are arranged on a plane and are fixedly connected with each other; the projections of the double-output kinematic pairs of the two multiple-movable-platform parallel robots onto the base platform plane are located in different sector spaces; the movable platform has a foot arch structure; the foot arch is provided with toes; two movable platforms foot arches located at the same side of the original base platform plane have different sizes or have different heights or have different sizes and heights.

Actually, it is feasible only if the projections of the double-output kinematic pairs of the two multiple-movable-platform parallel robots onto the base platform plane are not overlapping each other; for the above solution that the projections are located in different sector spaces, the structure can be made relatively compact. Each double-output kinematic pair has an independent working space, which is not interfered by the components of another multiple-movable-platform parallel robot. It can be understood with reference to Embodiment 33.

The terms and related structures related to in the present invention will be described below.

(I) Further Description to the Original Base Platform

In accordance with the structures of the original parallel mechanisms, the original parallel mechanisms are classified into planar original parallel mechanisms and spatial original parallel mechanisms. Accordingly, the original base platforms are classified into two types described below.

The base platform plane of the planar parallel mechanism refers to the plane in which the parallel mechanism lies. In engineering field where the requirements are not strict, it may refer to a plane parallel with the plane in which the parallel mechanism lies. The base platforms of the planar parallel mechanisms may have two types: triangle shape and straight-line shape; no matter it is triangular or straight line shaped, it is always in the plane of the planar parallel mechanism, and thus is called as planar base platform.

The original base platforms of the spatial parallel mechanisms may be classified into three types: A, the active pair axis is perpendicular to or coincides with a plane, and the first kinematic pair of the original chain is therefore mounted to this plane. This plane is called as original base platform plane. This base platform is called as planar base platform. B, the active pair axis is parallel (not coincide) with a plane, and the first kinematic pair mounted to this plane via a mount. This plane is called as original base platform plane. This base platform is called as planar base platform. C, the angle between the active pair axis and a reference plane is within +/−20 degrees, and this reference plane is called as original base platform plane. This base platform is called as planar base platform.

An example of the third type is below: the active pair is a sliding pair, the axis of the sliding pair is curved into the form of a circle, and the base platform plane is curved into a cylindrical surface. The original parallel mechanism is located in a small sector of the cylindrical surface, for example, in a sector smaller than 90 degrees. In other sector spaces, several derivative parallel mechanisms are arranged in rotationally symmetrical with each other. For the sake of the change in the axis of the sliding pair, the original base platform plane is substituted by a reference plane. In this case, if a rotatable pair substitutes the ring-like sliding pair, it is not necessary to use the reference plane as the original base platform plane.

As to the original base platform, further description is made below: 1, a base platform, after symmetrical transformation, is a combination of the original base platform and the derivative base platform, and may be still a plane or may become a curved surface, for example, becomes a cylindrical surface. But for a single derivative parallel mechanism or original parallel mechanism, if the original base platform is located in a small sector of the cylindrical surface, it still meets the condition of the third type. 2, as to the mounting manner of the active pair, the input end of a reversed double-output kinematic pair or some other double-output kinematic pairs is mounted to a middle portion, and the middle portion is mounted to base platform plane. The input end of the multiple-output kinematic pair is at an end portion, and the end portion is mounted to the base platform plane directly or via a mount mounted.

(II) Further Description to the Generalized Kinematic Pair and the Expandable Kinematic Pair Generalized kinematic pairs include single-output kinematic pairs and multiple (double)-output kinematic pairs. The multiple (double)-output kinematic pair mentioned in the disclosure refers to a kinematic pair having two or more output ends and the output ends possessing certain symmetry. The multiple (double)-output kinematic pair will be called in a simplified way as multiple-output kinematic pair.

Single-output kinematic pairs include simple single-output kinematic pairs and complex single-output kinematic pairs; the multiple-output kinematic pairs include simple multiple-output kinematic pairs and complex multiple-output kinematic pairs.

Simple single-output kinematic pairs, generally called as kinematic pairs, include rotatable pair, sliding pair, Hooke joint, spherical pair, helical pair, cylinder pair, etc. A simple multiple-output kinematic pair is formed by adding an output end to a simple single-output kinematic pair. A complex single-output kinematic pair or a complex multiple-output kinematic pair is a kinematic pair which comprises a plurality of simple kinematic pairs or comprises various higher pairs and has a relatively complex structure.

Expandable generalized kinematic pair is a generalized kinematic pair to which a symmetrical output end can be added; if it needs to add a symmetrical output end expanding from this generalized kinematic pair, this generalized kinematic pair is an expandable generalized kinematic pair.

If there is an additional output end expands from a single-output kinematic pair, this generalized kinematic pair becomes a double-output kinematic pair, and the original generalized kinematic pair is an expandable generalized kinematic pair. If a further auxiliary output end is expanded out, this generalized kinematic pair becomes a three-output kinematic pair, and the original double-output kinematic pair is an expandable double-output kinematic pair, and so on. In this way, a multiple-output kinematic pair having N symmetrical output ends is obtained.

An expandable generalized kinematic pair or multiple-output kinematic pair is composed of an input end, an output end, an input-output converting device and expandable interface and connecting devices.

The first and the second generalized kinematic pairs each have only one input end; the third generalized kinematic pair may have two input ends only when two neighboring chains after the third generalized kinematic pair are combined into one auxiliary derivative chain. It is actually formed by combining two single-input and double-output kinematic pairs. It is actually still two single-input and double-output kinematic pairs, and in which an input end corresponds to an auxiliary derivative chain, but two input ends share one double-output kinematic pair.

When the original chain is set, the first, second and third generalized kinematic pairs in a chain are clearly set; meantime, the active pair and the active pair input end are also clearly set. For example, given the original chain is an RSS chain, the first, second and third generalized kinematic pairs are respectively R, S and S, the active pair and the active pair input end are R. Thus, in the following description, when the original chain is given, the first, second and third generalized kinematic pairs, the active pair and the active pair input end will not be described specifically, and will not be marked by reference numerals in the figures.

(III) Further Description to the Derivative Base Platform

The lower end point of the derivative chain is the hinge point between the derivative chain and the derivative base platform. The hinge points of N2 derivative chains form the derivative base platform. The derivative base platform has the same, similar or substantially the same shape with the original base platform. The derivative base platform is symmetrical with the original base platform, and the symmetry includes identity symmetry, translational symmetry, rotational symmetry, reflectional symmetry, gliding reflection symmetry as well as scale symmetry.

In most conditions, the original base platform and the derivative base platform have fixed geometric shapes. Examples can be seen from Embodiment 1, 7, 9, 25. In some conditions, for example, the active pair axes are within the base platform plane and are parallel with each other (with reference to Embodiments 17, 19), the active pairs are sliding pairs; now the active pair axes have various supporting patterns. The original base platform may have various shapes, for example, triangle, square, hexagon, etc. The derivative base platform also follows this way. Once the shape of the original base platform is set, the derivative base platform may be determined to have the same shape with the original base platform to establish the symmetry between them.

When the derivative base platforms in two or more derivative parallel mechanisms are equivalent symmetrical with the original base platform, there is actually only one base platform. Now, the number of the derivative base platforms equals to the number of the derivative parallel mechanisms.

(IV) Further Description to the Structure of the Symmetrical Multiple-Output Kinematic Pair The symmetrical multiple-output kinematic pair is a key structural component in the invention, which is also a new concept. The multiple-output kinematic pair falls into the scope of composite kinematic pairs. Individual multiple-output kinematic pairs mentioned in the disclosure, also called as multiple-pair component in some references, are actually also composite kinematic pairs. The symmetrical multiple-output kinematic pair mentioned in the disclosure is a composite kinematic pair having one or two input ends, and also having two or more outputs, and the output ends possess certain symmetry. Ordinarily, the symmetrical multiple-output kinematic pair has one input end, and in some individual conditions, it has two input ends (in the application that two kinematic pairs are combined). In the symmetrical multiple-output kinematic pairs mentioned in the disclosure, some of them are effected by adding symmetricities to existing composite kinematic pairs, while some of them are new kinematic pairs dedicatedly created for the invention; the symmetrical multiple-output kinematic pairs include multiple-output kinematic pairs formed by flexible kinematic pairs or compliable kinematic pairs. All of them are called in a simplified way as multiple-output kinematic pairs. The multiple-output kinematic pair is composed of an input end, two or more output ends, an input-output converting device, expandable interfaces and connecting devices.

In accordance with the axes of the input and output ends and the movement properties, the multiple-output kinematic pairs are classified into two types: fixed output kinematic pairs and varying output kinematic pairs. In accordance with structure complex degree, the multiple-output kinematic pairs may be further classified into two types: simple multiple-output kinematic pairs and complex multiple-output kinematic pairs.

The axis of a fixed output kinematic pair is not changed, and the movement property is also not changed. For example, the fixed output kinematic pair may be a simple rotatable pair or sliding pair. In general, a fixed output kinematic pair is a simple kinematic pair. A varying output kinematic pair is a kinematic pair in which the output end axis may vary or the movement property may vary or both may vary. In general, a varying output kinematic pair is a complex kinematic pair. The complex kinematic pairs, in accordance with the number of the input ends, may be classified into: complex single-output kinematic pair, complex double-output kinematic pair, and complex multiple-output kinematic pair. The structures of the three types are similar. One complex output end expanded from one complex single-output kinematic pair may form one complex double-output kinematic pair. Two complex single-output kinematic pairs connected in series may form one complex double-output kinematic pairs. A complex multiple-output kinematic pair may be formed by adding one or more output ends to a complex double-output kinematic pair. The simple kinematic pairs following a similar way: the output end of a simple single-output kinematic pair can be expanded, i.e. by adding an output end of the same type, to become a simple double-output kinematic pair. By further adding a kinematic pair to the output end, a kinematic pair with three or more output ends is formed, which becomes a simple multiple-output kinematic pair. In general, a complex multiple-output kinematic pair is a varying output kinematic pair.

Simple multiple-output kinematic pairs are described below: a particular example of simple multiple-output kinematic pairs is a simple double-output kinematic pair. Simple double-output kinematic pairs are classified into two types. The first type is homo-directional double-output kinematic pair, as can be understood with reference to Kinematic Pair No. 4 (FIG. 4). The second type is reverse (opposite) double-output kinematic pair, as can be understood with reference to Kinematic Pair No. 1 (FIG. 1). A simple multiple-output kinematic pair can be obtained by adding an output end to a simple single-output kinematic pair or a simple double-output kinematic pair. In general, a simple multiple-output kinematic pair is a fixed output kinematic pair.

Complex multiple-output kinematic pairs are described below: no matter it is single-output or multiple-output, complex kinematic pairs include: 1, a complex kinematic pair axis with the direction and movement both unchanged; 2, a complex kinematic pair with only the movement type changed but the movement (axis) direction unchanged; 3, a complex kinematic pair with only the axis direction changed but the movement type unchanged; 4, a kinematic pair in which the movement direction and the movement type are both changed; 5, a kinematic pair in which the axis location is changed but the axis direction is unchanged. The latter types of complex multiple-output kinematic pairs are varying-output complex kinematic pair.

The complex varying output kinematic pair has an input-output converting box, which can be implemented by means of gear pair, cam pair, linkage or slanted surface, guiderail, worm rod, parallelogram mechanism, sarrus mechanism and the like. Complex varying output kinematic pairs will be described below emphatically.

1. In ordinary conditions, the complex kinematic pair with the axis direction and movement type both unchanged can be substituted by a simple kinematic pair, and will not be described more.

2. The complex kinematic pair in which only the movement type is changed but the movement direction is unchanged will be called in a simplified way as movement-type-varying complex kinematic pair.

The complex kinematic pairs in which only the movement type is changed but the movement direction is unchanged are mainly helical pair type. Translational movement is converted into rotational movement or vice versa, which is generally achieved by a helical pair. That is, it is implemented by means of PHR or RHP (R represents rotatable pair, H represents helical pair, P represents sliding pair, as used in the context hereafter). It can be understood with reference to Kinematic Pair No. 8 (FIG. 8). For a certain type of parallel mechanisms, a unitary driving manner, with completely rotatable pair driving or completely sliding pair driving, can be formed by using RHP or PHR. Using the unitary form of the driving pairs, the structure can be simplified, and the control can be simplified.

By using gear pairs (including gear racks) or other means, the function that the movement type is changed but the movement direction is unchanged can also be achieved, but the structure is relatively complex.

3. The complex kinematic pair in which only the movement direction is changed but the movement type is unchanged will be called in a simplified way as direction-varying complex kinematic pair.

The changing of the direction-varying complex kinematic pair can be effected via gear pair, cam pair, linkage or slanted surface, guiderail, worm rod and the like, in which gear pair is preferred. Gear pair and cam pair are generally represented by RGR and PGP. G represents one or more gear pairs (generally bevel gear) or cam pairs. Gear pairs also include movable-tooth transmission, timing belt driven by worm gear, etc. Gear pairs can be understood with reference to Kinematic Pair Nos. 14, 24 (FIGS. 14, 24). Linkages can be understood with reference to Kinematic Pair No. 18 (FIG. 18).

4. The complex kinematic pair in which the movement direction and the movement type are both changed will be called in a simplified way as double-changed complex kinematic pair.

Double-changed complex kinematic pairs include gears, for example, Kinematic Pair No. 16 (FIG. 16); tetragons, for example, Kinematic Pair No. 29 (FIG. 20); parallel mechanisms, for example, Kinematic Pair No. 13 (FIG. 13); composite pairs, for example, Kinematic Pair No. 55 (FIG. 55); linkages; cam pairs.

5. In the complex kinematic pair in which the location of the output end axis is changed, the axis direction is not changed, and the axis location is translationally moved. For example, Kinematic Pair No. 32 (FIG. 32) shows that the axis of the rotatable pair is translationally moved, and Kinematic Pair No. 33 (FIG. 33) shows that the axis of the sliding pair is translationally moved.

The function of the complex multiple-output kinematic pair is mainly effected by means of an input-output converting box (device). The input-output converting box is a simple mechanical movement converting device, and belongs to commonly known technique. There are various concrete structures for it, which will be described after classified in accordance with its symmetry.

(V) The Symmetry of the Symmetrical Multiple-Output Kinematic Pair and Classified Description Now, various multiple (double)-output kinematic pairs related to in the invention will be described in detail in accordance with the symmetry of the output end of the multiple-output kinematic pair. The multiple-output kinematic pairs are classified in accordance with the symmetry of the output end into: reflectional symmetry type, translational symmetry type, rotational symmetry type, gliding reflection symmetry type and scale symmetry type.

In accordance with the definition above, symmetrical multiple-output kinematic pairs fall within the scope of composite kinematic pairs. A symmetrical multiple-output kinematic pair is a composite kinematic pair having one or two input ends and two or more output ends, with the output ends possessing certain symmetry. Each multiple-output kinematic pair has the same components. That is, it is composed of an input end 1, a movement converting device 2, a primary output end 3, an auxiliary output end 3.1, and an expandable interface 4. In the drawings and the following description, the components will not be described unless necessary, and only the movement converting device or the like are referred to. For some figures, there is neither reference numeral nor reference to the other portion of the description.

It is noted that, for a determined multiple-movable-platform parallel robot, the expandable interface 4 of the multiple-output kinematic pair may be not necessary. However, on the one hand, in the method of the invention, if a multiple-movable-platform parallel robot is expandable for conducting nest symmetrical transformation, an expandable interface is necessary; on the other hand, for a multiple-output kinematic pair or a single-output kinematic pair, even if an expandable interface portion is included, no more component is added. Thus, for purposes of providing more general meaning, each multiple-output kinematic pair is described as comprising an expandable interface.

For convenient description, a sequential number is given to each symmetrical multiple-output kinematic pair. For example, the translationally symmetrical multiple-output kinematic pair illustrated in FIG. 1 is numbered as No. 1, and is called as No. 1 translationally symmetrical multiple-output kinematic pair, or simplified as Kinematic Pair No. 1 or translational pair No. 1; the translationally symmetrical multiple-output kinematic pair illustrated in FIG. 2 is numbered as No. 2, and is called as No. 2 translationally symmetrical multiple-output kinematic pair, simplified as Kinematic Pair No. 2 or translational pair No. 2; and so on. There are 57 symmetrical multiple-output kinematic pairs, the numbers of which are the same as the numbers of the figures.

The multiple-output kinematic pairs are classified in accordance with their output ends as: reflectional symmetry type, translational symmetry type, rotational symmetry type, gliding reflection symmetry type, identity symmetry type and scale symmetry type. Now various multiple-output kinematic pairs will be described with reference to the drawings in accordance with symmetry.

Reflectional symmetry type: FIG. 1 to FIG. 20 show reflectional symmetry type double-output kinematic pairs.

Kinematic Pair No. 1 (FIG. 1): FIG. 1 shows a reflectional symmetry type double-output kinematic pair composed of rotatable pairs. It is composed of an input end 1, a movement converting device 2 (in the larger circle in this figure), a primary output end 3, an auxiliary output end 3.1, and an expandable interface 4; two gears 2.1 mashing with each other form the movement converting device 2; wherein one gear axis is the input end 1; two output ends are on opposite sides of a horizontal symmetrical line between the two gears. The two output ends are reflectional symmetrical with each other. The gear axis is an expandable interface 4.

Kinematic Pair No. 2 (FIG. 2): FIG. 2 shows another reflectional symmetry type double-output kinematic pair formed by rotatable pairs. Two gears 2.1 mashing with each other form the movement converting device 2, wherein one gear axis is the input end 1, the two output ends swing up and down about a line connecting the centers of the two gears, the two output ends are reflectionally symmetrical with each other, one is primary output end 3, and the other is auxiliary output end 3.1. The gear axis is an expandable interface 4. The movement directions of the two output ends are opposite to each other.

Kinematic Pair No. 3 (FIG. 3.1, FIG. 3.2): FIG. 3.1 is a third reflectional symmetrical type double-output kinematic pair formed by rotatable pairs. The function of it is the same with the reflectional symmetrical type double-output kinematic pair of FIG. 1. FIG. 3.2 is the structural view of the movement converting device 2 of the kinematic pair. The movement converting device 2 is composed of two coaxial bevel gears 2.2 and one intermediate gear 2.4. In the two coaxial bevel gears 2.2, one is active, and the other is passive; two coaxial bevel gears are meshing with the intermediate gear 2.4; two output ends are connected to the two bevel gears. The two output ends 3 and 3.1 have opposite movement directions. For convenient expression in the figure, the output ends are scaled symmetrical with each other.

Kinematic Pair No. 4 (FIG. 4): FIG. 4 is a fourth reflectional symmetrical type double-output kinematic pair composed of a rotatable pair. The axis of the rotatable pair is the input end 1; two output ends are reflectionally symmetrical with each other, one is the primary output end 3, and the other is the auxiliary output end 3.1. A connecting line between the two output ends is parallel with the axis of the rotatable pair. The expandable interface 4 is also a rotatable pair axis (dashed line in the figure). The two output ends have the same movement direction.

Kinematic Pair No. 5 (FIG. 5): FIG. 5 is a fifth reflectionally symmetrical type double-output kinematic pair composed of a rotatable pair. The axis of the rotatable pair is input end 1; the two output ends are at opposite sides of the input end to be reflectionally symmetrical. A connecting line between the two output ends is perpendicular to the axis of the rotatable pair. The expandable interface 4 is the axis of the rotatable pair. The two output ends 3 and 3.1 have the same movement direction. This double-output kinematic pair is also a rotationally symmetrical double-output kinematic pair, having a rotation angle range of 180 degrees.

Kinematic Pair No. 6 (FIG. 6): FIG. 6 is a reflectionally symmetrical type double-output kinematic pair composed of one sliding pair. Left side is the input end 1; the two output ends are reflectionally symmetrical with each other, one is the primary output end 3, and the other is the auxiliary output end 3.1. A connecting line between the two output ends is perpendicular to the axis of the sliding pair. The expandable interface 4 is on the axis of the sliding pair. The two output ends have the same movement direction.

Kinematic Pair No. 7 (FIG. 7): FIG. 7 is a reflectionally symmetrical type double-output kinematic pair composed of two opposing sliding pairs. Axes of the two sliding pairs coincide with each other, and the movement converting device 2 achieves movement coupling (mechanical or electrical coupling). The two output ends are located on the axes of the two sliding pairs, one at left side, and the other at the right side; the two output ends are reflectionally symmetrical with each other, one is the primary output end 3, and the other is the auxiliary output end 3.1. The input end 1 is located at middle. The two output ends have opposite movement directions. The expandable interface is on the axis of sliding pair.

Kinematic Pair No. 8 (FIG. 8): FIG. 8 is a reflectionally symmetrical type double-output kinematic pair composed of two PHR mechanisms. The two PHR mechanisms are reversely opposing to each other to share one rotatable pair, and all the kinematic pairs have a coincident axis. The rotatable pair is an active pair, and is the input end 1. The two output ends are located on the axes of the two sliding pairs, a primary output end 3 at the left side, and an auxiliary output end 3.1 at the right side; the two output ends are reflectional symmetrical with each other, and the two output ends have opposite movement directions. The movement converting device 2 is effected by two RHs. The axis of the sliding pair is the expandable interface 4.

Kinematic Pair A No. 9 (FIG. 9.1): FIG. 9.1 is a first reflectional symmetrical type double-output kinematic pair formed by two parallelogram kinematic pairs. It is composed of an input end 1, a movement converting device 2, a primary output end 3, an auxiliary output end 3.1, and an expandable interface 4. The movement converting device 2 is effected by two parallelogram mechanisms 5. The two parallelogram kinematic pairs are on the same plane. The two parallelogram kinematic pairs share two pairs of rotatable pairs, and share two middle horizontal rod elements; two side rods 2.5 are collinear, and two parallelogram kinematic pairs are reflectional symmetrical with each other.

Kinematic Pair B No. 9 (FIG. 9.2): FIG. 9.2 is a variant of FIG. 9.1. The side rod 2.5 of the lower parallelogram kinematic pair is longer, and the two parallelogram kinematic pairs form a scaled reflectional symmetrical type double-output kinematic pair.

Kinematic Pair No. 10 (FIG. 10): FIG. 10 is a second reflectional symmetrical type complex double-output kinematic pair formed by two parallelogram kinematic pairs. Two parallelogram kinematic pairs 5 are on the same plane. Two pairs of rotatable pairs of the two parallelogram kinematic pairs are meshed by gear pairs; the movement converting device 2 is effected by two parallelograms and two pairs of gear pairs. The expandable interface 4 is gear axis. Two parallelogram kinematic pairs are reflectional symmetrical with each other.

Kinematic Pair A No. 11 (FIG. 11.1): FIG. 11.1 is a third reflectional symmetrical type complex double-output kinematic pair formed by two parallelogram kinematic pairs. Two parallelogram kinematic pairs 6 are on the same plane, one at the left side and the other at the right side. Diagonal lines of the two parallelograms are collinear and are thus called as middle axis; neighboring apexes on the middle axis of the two parallelograms share one rotatable pair. A sliding pair is connected between two apexes on the left parallelogram middle axis, the sliding pair being an active pair. The input end 1 is at the right side of the active pair, the left side apex is the primary output end 3, and the right side apex is the auxiliary output end 3.1. The two output ends are reflectional symmetrical with each other. A further possible pattern can be formed by substituting the parallelogram in Kinematic Pair A No. 11 with a rhombus one.

Kinematic Pair B No. 11 (FIG. 11.2): FIG. 11.2 is a variant of FIG. 11.1. The linkage of the left parallelogram kinematic pair is longer, and the two parallelogram kinematic pairs form a scaled reflectional symmetrical type double-output kinematic pair. A further possible pattern can be formed by substituting the parallelogram in Kinematic Pair B No. 11 with a rhombus.

Kinematic Pair A No. 12 (FIG. 12.1): FIG. 12.1 comprises one RH mechanism and two parallelogram mechanisms. The axis of the rotatable pair in the RH mechanisms coincident with the axis of the helical pair; upper and lower sides of the H pair are respectively connected with a parallelogram kinematic pair 5; two parallelogram kinematic pairs 5 are on a plane; the axes of all the rotatabe pairs in the two parallelogram kinematic pairs are perpendicular to the axis of the helical pair; the rotatable pair fitting with the helical pair is the input end 1. The helical pair and the two parallelogram kinematic pairs form the movement converting device 2. The two output ends 3 and 3.1 are located one two outside horizontal sides of two parallelogram kinematic pairs.

Kinematic Pair B No. 12 (FIG. 12.2): FIG. 12.2 is a variant of FIG. 12.1: the side rod 2.5 of the lower parallelogram kinematic pair is longer; the output ends of the two parallelogram kinematic pairs are scaled reflectional symmetrical with each other.

Kinematic Pair No. 13 (FIG. 13): FIG. 13 is a reflectional symmetrical type complex double-output kinematic pair composed of two Sarrus mechanisms 7. The two Sarrus mechanisms 7 comprise an upper one and a lower one; the two middle pairs of rotatable pairs are shared by the two Sarrus mechanisms, the middle horizontal rod is shared by the two Sarrus mechanisms 7, and the two middle side rods 2.6 are collinear. In the two middle rotatable pairs, one acts as the input end; the primary output end 3 is on the upper Sarrus mechanism, the auxiliary output end 3.1 is on the lower Sarrus mechanism, and the two output ends are reflectional symmetrical with each other. If the two Sarrus mechanisms have different sizes, by enlarging the dimensions of the lower Sarrus mechanism structure in scale, the output ends of the two Sarrus mechanisms will be scaled reflectional symmetrical with each other.

Kinematic Pair No. 14 (FIG. 14): FIG. 14 is a reflectional symmetrical type complex double-output kinematic pair composed of rotatable pairs and gear pairs. It is composed of an input end 1, a movement converting device 2 (in the larger circle in this figure), a primary output end 3, an auxiliary output end 4, and an expandable interface 5. The horizontal axis is an active pair axis, the active pair axis is connected with two bevel gears 2.2, one meshed with an upper bevel gear 2.2 to form an upper primary output end 3, and the other bevel gear is coupled with another bevel gear via an intermediate gear 2.4 to form a lower auxiliary output end 3.1. These meshing gears form the movement converting device 2. Two output ends are on opposite sides of the active gear axis. The primary output end 3 is reflectional symmetrical auxiliary output end 3.1. The gear axis of the active gear is the expandable interface 4. If the primary output end 3 or the auxiliary output end 3.1 of Kinematic Pair No. 14 is cancelled, Kinematic Pair No. 14 becomes an arbitrary-direction-varying single-output kinematic pair. By connecting two or more arbitrary-direction-varying single-output kinematic pairs in series, a translationally symmetrical multiple-output kinematic pair is formed.

Kinematic Pair No. 15 (FIG. 15): FIG. 15 is also a reflectional symmetrical type complex double-output kinematic pair composed of rotatable pairs and gear pairs. FIG. 15 has a mechanism similar to FIG. 14, but has a slightly changed structure: the two output ends 3 and 3.1 have a coincident axis, and the output end axis is perpendicular to the active pair axis; one intermediate gear is removed, and two active bevel gears 2.2 are opposed to each other. Other aspects can be seen from FIG. 14. If the primary output end 3 or the auxiliary output end 3.1 of Kinematic Pair No. 15 is cancelled, Kinematic Pair No. 14 becomes an orthogonal direction-varying single-output kinematic pair. By connecting two or more orthogonal direction-varying single-output kinematic pairs in series, a translationally symmetrical multiple-output kinematic pair is formed.

Kinematic Pair No. 16 (FIG. 16): FG. 16 is a reflectional symmetrical type complex double-output kinematic pair formed of one gear and two gear racks. It is composed of an input end 1, a movement converting device 2 (gear rack transmission), a primary output end 3, an auxiliary output end 4, and an expandable interface 5. Two gear racks 2.3 comprise an upper one and a lower one. A gear 2.1 is meshed between them. The rotatable pair on which the gear is mounted is the input end 1; in the two gear racks, one is the primary output end 3, and the other is the auxiliary output end 3.1. The two output ends are reflectional symmetrical with each other. The two output ends perform opposite translational movements. If two gear racks are driven by the same gear, the two output ends will have opposite movement directions and the same speed. If the two gear racks are not parallel with each other, the angle between the axes of the two output ends may be of any degrees; the two output ends form rotational symmetry. If the two gear racks are driven by two coaxial gears having different radii, the two output ends will have opposite movement directions and different speeds; the two output ends form scaled reflection symmetry.

Kinematic Pair No. 17 (FIG. 17): FIG. 17 is formed by connecting in series an RHP complex kinematic pair to each of the two output ends of the complex double-output kinematic pair of FIG. 14; each the output end of the complex double-output kinematic pair shares one rotatable pair with the input end of the RHP complex kinematic pair. The output ends are still s reflectional symmetrical with each other. Input is rotation, and output is translation; the directions and the movement properties of the output ends are all changed. The complex double-output kinematic pair of FIG. 15 can be modified in a similar way.

Kinematic Pair No. 18 (FIG. 18): FIG. 18 is formed by connecting in series an PHR complex kinematic pair to the input end of Kinematic Pair No. 15 (the complex double-output kinematic pair in FIG. 15); the input end of Kinematic Pair No. 15 and the output end of the RHP complex kinematic pair share one rotatable pair. The output end of Kinematic Pair No. 15 is fixed. The input end becomes translational, the output ends are still rotational, and the directions and the movement properties of the output ends are all changed. The complex double-output kinematic pair of FIG. 14 can be modified in a similar way.

Kinematic Pair No. 19 (FIG. 19): FIG. 19 is formed by conducting reflectional symmetrical treatment to a PRRP linkage 2.7. The output ends and the input end are all sliding pairs. The two output ends are reflectional symmetrical with each other.

Kinematic Pair No. 20 (FIG. 20): FIG. 20 is a reflectional symmetrical type double-output kinematic pair composed of two RHP mechanisms. The two RHP mechanisms are reversely opposing to each other to share one sliding pair, and all the kinematic pairs have a coincident axis. The sliding pair is an active pair, and is the input end 1. The two output ends are located on the axis of sliding pair, one is the primary output end 3 at the left side, and the other is the auxiliary output end 3.1 at the right side; the two output ends are reflectional symmetrical with each other, and the two output ends have the same movement direction. The movement converting device 2 is effected by two PHs. The axis of the sliding pair is the expandable interface 4.

The reflectional symmetrical double-output kinematic pairs can also be regarded as a rotationally (rotated by 180 degrees) symmetrical multiple-output kinematic pair.

Translationally symmetrical type: FIG. 21-Figure 32 show translationally symmetrical type multiple-output kinematic pairs.

Kinematic Pair No. 21 (FIG. 21): FIG. 21 is a translationally symmetrical type simple multiple-output kinematic pair composed of a sliding pair. The axis of the sliding pair is provided with three output ends. The primary input end 3 is translationally symmetrical with two auxiliary output ends 3.1, 3.2.

Kinematic Pair No. 22 (FIG. 22): FIG. 22 is a translationally symmetrical type simple multiple-output kinematic pair composed of rotatable pairs. The axis of the rotatable pair is provided with three output ends. The primary input end 3 is scaled translationally symmetrical with two auxiliary output ends 3.1, 3.2.

Kinematic Pair No. 23 (FIG. 23): FIG. 23 is a translationally symmetrical type multiple-output kinematic pair composed of gears and a gear rack. The axis of the gear rack 2.3 has two gears 2.1; the left gear is provided with a primary output end 3, and the right gear is provided with an auxiliary output end 3.1. The two output ends are translationally symmetrical with each other.

Kinematic Pair No. 24 (FIG. 24): FIG. 24 is translationally symmetrical type complex multiple-output kinematic pair composed of gear pairs. This is a complex arbitrary-direction-varying multiple-output kinematic pair. A circular gear box is the movement converting device 2. A pair of meshing bevel gears 2.2 provides a primary output end 3. The right side circular gear box is another complex direction-varying single-output kinematic pair, and a pair of meshing bevel gears provides another output end 3.1. The two gear boxes are movement converting devices 2. Two complex direction-varying single-output kinematic pairs are rigidly connected in series by the active pair axes; the active pair axes are collinear; the two output ends are translationally symmetrical with each other. The rigid connection portion (block in dashed line in the figure) is an expandable interface connecting device 4.1. If the axes are relatively long, the expandable interface connecting devices can be connected by a coupler. The left side circular gear box is a complex arbitrary-direction-varying single-output kinematic pair (the structure of it can be understood with reference to FIG. 14); the input end axis and the output end axis intersect at one point; the angle between the input end axis and the output end axis may be of any degrees (does not comprise 0 degree or 180 degrees).

Kinematic Pair No. 25 (FIG. 25): FIG. 25 is a special pattern of FIG. 24: the axes of two output ends are perpendicular to the input end axis and are parallel with each other. The two output ends are translationally symmetrical with each other. It is called as complex orthogonal direction-varying multiple-output kinematic pair, having the same reference numerals with FIG. 24. The left side circular gear box is a complex orthogonal direction-varying single-output kinematic pair (the structure of them can be understood with reference to FIG. 15): the input end axis and the output end axis intersect at one point, and the angle between the input end axis and the output end axis is 90 degrees.

Kinematic Pair No. 26 (FIG. 26): FIG. 26 comprises two serially connected RH mechanisms. The two serially connected sliding pairs (or cylinder pairs) are parallel with each other, and a helical pair is connected to a sliding pair. Two output ends expand from the two sliding pairs. The rotatable pair is the input end. The two output ends are located on two sliding pairs, one at left side, and the other at the right side; one is the primary output end 3, and the other is the auxiliary output end 3.1; the two output ends are reflectional symmetrical with each other. The two output ends have the same movement direction. The axis of the rotatable pair and the axis of the sliding pair form the expandable interface 4. When two helical pairs are different with each other, the two output ends are scaled symmetrical with each other.

Kinematic Pair No. 27 (FIG. 27): FIG. 27 is a first scaled translationally symmetrical type double-output kinematic pair formed by two parallelogram kinematic pairs 5. The two parallelograms 5 are coplanar, and comprise an upper one and a lower one; two middle pairs of rotatable pairs are shared by two parallelogram kinematic pairs; the middle horizontal rods are shared by two parallelogram kinematic pairs; two side rods 2.5 are collinear; two parallelogram kinematic pairs 5 form the movement converting device 2; two parallelogram kinematic pairs are translationally symmetrical with each other. A rotatable pair on the lowermost horizontal rod element is the input end 1 (fixed end), the output end on the middle horizontal rod element is the primary output end 3, and the output end on the uppermost horizontal rod element is the auxiliary output end 3.1; the primary output end is scaled translationally symmetrical auxiliary output end. That is, the displacement of the auxiliary output end is larger than the displacement of the primary output end by determined times. Axes of the two rotatable pairs on the lowermost horizontal rod element form an expandable interface. Axes of the two rotatable pairs on the middle horizontal rod element can also act as an expandable interface.

Kinematic Pair A No. 28 (FIG. 28.1): FIG. 28.1 is a second translationally symmetrical type multiple-output kinematic pair formed by parallelogram kinematic pairs. Three parallelogram kinematic pairs 6 are on the same plane. They are the left one, the middle one and the right one. The diagonal lines of three parallelograms 6 are collinear, called as middle axis. neighboring apexes on the middle axis of two parallelograms share one rotatable pair. A sliding pair is connected between two apexes on the middle axis of the left parallelogram, and the input end 1 is at the left side of the sliding pair. viewed in a direction from left to right, the second apex on the middle axis is the primary output end 3. The third and fourth apexes are auxiliary output ends 3.1, 3.2. The auxiliary output ends are scaled translationally symmetrical with the main output end.

Kinematic Pair B No. 28 (FIG. 28.2): FIG. 28.2 is a translationally symmetrical type multiple-output kinematic pair formed by rhombuses. Diagonal lines of the rhombus are perpendicular to each other, and two pairs of neighboring sides equal to each other. The left side is a rhombus, and the right side is a rhombus or parallelogram. The rhombuses and parallelograms are on the same plane. The diagonal lines are collinear, as called as middle axis; neighboring apexes on the middle axes of two rhombuses share one rotatable pair. A sliding pair is connected between the apexes on two sides of the same length on the rhombus middle axis; the left side is sliding pair the input end 1. viewed in a direction from left to right, the second apex on the middle axis is the primary output end 3. The third and fourth apexes are auxiliary output ends 3.1, 3.2. The auxiliary output ends are scaled translationally symmetrical with the main output end. This multiple-output kinematic pair has completely the same function with Kinematic Pair A No. 28 and has a similar structure, so they are classified into the same type. Kinematic Pair B No. 28 can also be composed completely of rhombuses. The rhombus can also act as a reflectional symmetrical kinematic pair, as can be understood with reference to FIG. 11.1.

Kinematic Pair No. 29 (FIG. 29): FIG. 29 is a third translationally symmetrical type double-output kinematic pair formed by parallelogram kinematic pairs. The planes of two parallelograms 5 are parallel with each other (not coplanar), with one at front and the other at back. The lower two pairs of rotatable pairs of the two parallelograms 5 are mounted to two parallel axes; the output ends are respectively mounted to the upper horizontal rod elements of the two parallelograms; the front one is the primary output end 3, and the back one is the auxiliary output end 3.1. The auxiliary output end is translationally symmetrical with the main output end. If the side rods of the front and back parallelograms have different lengths, the auxiliary output end is scaled translationally symmetrical with the main output end. The lower axes of the two rotatable pairs are expandable interfaces 4.

Kinematic Pair No. 30 (FIG. 30): FIG. 30 is a fourth translationally symmetrical type multiple-output kinematic pair formed by a parallelogram kinematic pair 5. The lower horizontal rod of the parallelogram is fixed, a rotatable pair on the lower horizontal rod element is the input end 1 (fixed end), and the upper horizontal rod element is provided with three output ends, one being the primary output end 3, and the other two being auxiliary output ends 3.1, 3.2.

Kinematic Pair No. 31 (FIG. 31): FIG. 31 is translationally symmetrical type complex double-output kinematic pair composed of Sarrus mechanisms 7. Two Sarrus mechanisms 7 comprise an upper one and a lower one. Two middle pairs of rotatable pairs are shared by the two Sarrus mechanisms, and two middle rod elements 2.6 are collinear. In the lowermost two rotatable pairs, one acts as the input end; the primary output end 3 is on the lower Sarrus mechanism, the auxiliary output end 3.1 is on the upper Sarrus mechanism, and the two output ends are scaled translationally symmetrical with each other.

Kinematic Pair No. 32 (FIG. 32): FIG. 32 is a gear box composed of translational type complex double-output kinematic pair. The gear box is the movement converting device 2, the left side rotatable pair is the input end, and the axis of this rotatable pair is connected with a main input end. The axis of the right side rotatable pair is connected with an auxiliary output end 3.1. The two output ends are translationally symmetrical with each other. The two output ends perform translational movements in the same direction. The primary output end is parallel with the auxiliary output end but is not collinear with it. The movement converting device 2 is composed of a gear set. The two output ends form translationally symmetry or scaled translational symmetry.

Kinematic Pair No. 33 (FIG. 33): FIG. 33 is a translational type complex double-output kinematic pair composed of a gear set and two gear racks. The two gear racks 2.3 comprise an upper one and a lower one, with a middle gear set 2.1 meshed therebetween. The rotatable pair on which the gear is mounted is the input end 1, the lower gear rack is connected with the primary output end 3, and the upper gear rack is connected with the auxiliary output end 3.1. The two output ends are translationally symmetrical with each other. The two output ends perform translational movements in the same direction. The movement direction of the primary output end is parallel with the auxiliary output end but is not collinear with it. The movement converting device 2 (gear rack transmission) forms a speed variator by means of a gear set. The two output ends are translationally symmetrical with each other. If two gear racks have different movement speeds, the two output ends form scaled translationally symmetry.

Kinematic Pair No. 34.1 (FIG. 34.1): FIG. 34.1 is a complex double-changed arbitrary-direction multiple-output kinematic pair, which is formed on the basis of FIG. 25 by connecting in series an (RHP) complex kinematic pair to the two output ends respectively. The rotatable pair of the output end of FIG. 25 here is coaxial with the rotatable pair of (RHP), and actually there is the same pair. Two output ends are translational output. The two output ends are translationally symmetrical with each other. The complex kinematic pair formed by combination of the left side circular gear box and the (RHP) complex kinematic pair is a complex arbitrary double-changed single-output kinematic pair: the input end axis and the output end axes intersect at one point; the angle between the input end axis and the output end axes may be of any degrees (does not comprise 0 degree or 180 degrees). The above translational transformation can be conducted for multiple times to form multiple-output kinematic pairs.

Kinematic Pair No. 34.2 (FIG. 34.2): FIG. 34.2 is a complex double-changed orthogonal multiple-output kinematic pair, as a special pattern of Kinematic Pair No. 34.1: the output end axes are parallel with each other and are perpendicular to the input end axis. The complex kinematic pair formed by combination of the left side circular gear box and the (RHP) complex kinematic pair is a complex orthogonal double-changed single-output kinematic pair: the input end axis and the output end axes intersect at one point, and the angle between the input end axis and the output end axes is 90 degrees. The above translational transformation can be conducted for multiple times to form multiple-output kinematic pairs.

Kinematic Pair No. 35 (FIG. 35): FIG. 35 is a translationally symmetrical type multiple-output kinematic pair composed of an RHP mechanism. All the kinematic pairs have a coincident axis. The rotatable pair is the input end 1; the rotatable pair is an active pair and is the input end 1. Two output ends are located on the axis of the sliding pair, one being the primary output end 3 at the left side and the other being the auxiliary output end 3.1 at the right side; the two output ends are translationally symmetrical with each other, and the two output ends have the same movement direction. The movement converting device 2 is achieved by an RH mechanism. The axis of the sliding pair is the expandable interface 4.

Rotationally symmetrical type: FIG. 41-Figure 50 show rotationally symmetrical type multiple-output kinematic pairs.

Kinematic Pair No. 5 (FIG. 5) is not only a reflectional symmetrical kinematic pair, but also a rotationally symmetrical kinematic pair.

Kinematic Pair No. 36 (FIG. 36): FIG. 36 is a rotationally symmetrical kinematic pair having a plurality of output ends. A ring-like rotatable pair comprises a plurality of output ends uniformly disposed on the same radius, and the angles between neighboring output ends are the same (although it is also feasible if they are different); one is the primary output end 3, and the remaining ones are auxiliary output ends 3.1, 3.2, 3.3, 3.4, 3.5. The primary output end is rotationally symmetrical auxiliary output ends.

An application of Kinematic Pair No. 36 is that: a plurality of same type Kinematic Pairs No. 41 are mounted around the same axis (called as mid-axis); all the output ends are on a cylindrical surface the axis of which is the mid-axis. The cylindrical surface is divided into three or more same sector spaces; each ring-like rotatable pair has only one output end on each sector, so there are many same output ends; each sector space is mounted with a parallel mechanism, with parallel mechanisms in different sector spaces being rotationally symmetrical with each other.

Another application of Kinematic Pair No. 36 is that: a plurality of Kinematic Pairs No. 36 having different radii are mounted around the same axis (called as mid-axis); the output ends of different ring-like rotatable pairs are on circles having different radii. The radius of the circle on which the output ends of the lowermost ring-like rotatable pair lie is the largest one, while the radius of the circle on which the output ends of the uppermost ring-like rotatable pair lie is the smallest one. For other ring-like rotatable pairs, in an upward direction, the radius of the circle on which the output ends lie become smaller in sequence. All the output ends are on a plane which is perpendicular to the mid-axis. This plane is coplanar with or above the uppermost ring-like rotatable pair plane. This plane is divided into three or more same sector spaces; each ring-like rotatable pair has one output end on each sector, so there are many same output ends; each sector space is mounted with a parallel mechanism, with parallel mechanisms in different sector spaces being rotationally symmetrical with each other.

Kinematic Pair No. 37 (FIG. 37): FIG. 37 is a rotationally symmetrical kinematic pair formed by a circular-ring-shaped sliding pair having a plurality of output ends. The circular ring is supported on a sliding track; the one circular-ring-shaped sliding pair has a plurality of output ends uniformly disposed on the same radius; the angles between neighboring output ends are the same (although it is also feasible if they are different). One is the primary output end 3, and the remaining ones are auxiliary output ends 3.1, 3.2, 3.3, 3.4. The primary output end is rotationally symmetrical auxiliary output ends.

Kinematic Pair No. 37 has the same function with Kinematic Pair No. 36, so the two are interchangeable. For example, the two applications of Kinematic Pair No. 36 can also be used in Kinematic Pair No. 42. However, the axis of Kinematic Pair No. 37 is changeable, while the axis of Kinematic Pair No. 36 is unique. After Kinematic Pair No. 37 substitutes Kinematic Pair No. 36 and acts as an active pair, its axis is changed. The original base platform is also changed, but still meets the basic requirement that the original base platform is planar.

Kinematic Pair No. 38 (FIG. 38): FIG. 38 is a formed by transformation of a rotation-type translationally symmetrical multiple-output kinematic pair (FIG. 22). At the mid-point between two output ends, the straight-line axis becomes bent lines, where a coupler is mounted, the coupler being an expandable interface connecting device 4.1. For example, a pair of meshing bevel gears forms a coupler (represented in the figure by a small trapezoid). When there are a plurality of output ends, the axes are still on a plane. The primary output end 3 is rotationally symmetrical auxiliary output ends 3.1, 3.2. The output end movement plane is perpendicular to the axis of the rotatable pair.

Kinematic Pair No. 39 (FIG. 39): FIG. 39 is a rotationally symmetrical kinematic pair formed by sliding pairs and having a plurality of output ends. FIG. 39 is formed by transformation of a translationally symmetrical multiple-output kinematic pair (with reference to FIG. 21). At the mid-point between two output ends, the straight-line axis becomes bent lines, or where a coupler is mounted, the coupler being an expandable interface connecting device 4.1. For example, a pair of meshing gear and gear rack forms a coupler (represented in the figure by a small trapezoid, with reference to Kinematic Pair No. 16). When there are a plurality of output ends, the axes are still on a plane. The primary output end 3 is rotationally symmetrical auxiliary output ends 3.1, 3.2. The output end conducts translational movements.

Kinematic Pair No. 40 (FIG. 40): FIG. 40 is formed by transformation of a complex direction-varying rotation-type translationally symmetrical multiple-output kinematic pair (FIG. 25). At the mid-point between two output ends, the straight-line axis becomes bent lines, where a coupler is mounted, the coupler being an expandable interface connecting device 4.1. For example, a pair of meshing gear and gear rack form a coupler (represented in the figure by a small trapezoid). When there are a plurality of output ends, the axes of the rotatable pairs are still on a plane. The primary output end is rotationally symmetrical auxiliary output ends. The output end movement plane is parallel with the axis of the rotatable pair.

Kinematic Pair No. 41 (FIG. 41): FIG. 41 is formed on the basis of Kinematic Pair No. 15 (FIG. 15) by adding two output ends. The added output ends are in the original output end plane, and the angles between them and the primary output end are respectively 90 degrees and 270 degrees. For the four output ends, the angle between every two neighboring output ends is 90 degrees. The input-output converting device is added by two pairs of bevel gears. The output end movement plane is parallel with the active pair axis. Two or more Kinematic Pairs No. 41 connect the active pair axes via a coupler to form a complex kinematic pair having eight or more output ends.

Gliding reflection symmetrical type: FIGS. 61-65 show gliding reflection symmetrical type double-output kinematic pairs.

Kinematic Pair No. 42 (FIG. 42): FIG. 42 is a gliding reflection symmetrical type simple double-output kinematic pair formed by rotatable pairs. The primary output end 3 is gliding reflection symmetrical with the auxiliary output end 3.1.

Kinematic Pair No. 43 (FIG. 43): FIG. 43 is a gliding reflection symmetrical type simple double-output kinematic pair formed by sliding pairs. The primary output end 3 is gliding reflectional symmetrical with the auxiliary output end 3.1.

Kinematic Pair No. 44 (FIG. 44): FIG. 44 is a gliding reflectional symmetrical type complex double-output kinematic pair formed by complex arbitrary-direction-varying rotatable pairs.

Kinematic Pair No. 45 (FIG. 45): FIG. 45 is formed by transformation to Kinematic Pair No. 34.1. by performing reflection transformation to the auxiliary output end of Kinematic Pair No. 34.1, the output end 3.1 is changed to be below the active pair axis to form a gliding reflectional symmetrical type complex double-output kinematic pair. This complex double-output kinematic pair has a plurality of expandable interfaces.

Kinematic Pair No. 46 (FIG. 46): FIG. 46 is a gliding reflectional symmetrical type double-output kinematic pair formed by gear-gear rack complex kinematic pairs.

Kinematic Pair No. 47 (FIG. 47): FIG. 47 has a structure similar to FIG. 26. by performing reflection transformation to the output end 3.1 of FIG. 26, the output end 3.1 is changed to be below the axis to become a scaled gliding translation symmetrical double-output kinematic pair.

Equivalent symmetrical type: FIG. 71-Figure 75 show equivalent symmetrical type double-output kinematic pairs; equivalent symmetry means having two coincided output ends. In other words, one output end can be connected to two rod elements (dashed line in the figure). Kinematic Pair Nos. 71 to 75 all have this feature and will not be described one by one.

Kinematic Pair No. 48 (FIG. 48): FIG. 48 is an equivalent symmetrical type double-output kinematic pair formed by rotatable pairs. In Embodiment 4, this double-output kinematic pair is used.

Kinematic Pair No. 49 (FIG. 49): FIG. 49 is an equivalent symmetrical type double-output kinematic pair formed by a sliding pair; two output ends coincide to create equivalent symmetry. In other words, one output end can be connected to two rod elements (dashed line in the figure). In Embodiment 4, this double-output kinematic pair is used.

Kinematic Pair No. 50 (FIG. 50): FIG. 50 is a translationally symmetrical type multiple-output kinematic pair composed of an RHP mechanism. All the kinematic pairs have a coincident axis. The rotatable pair is the input end 1; the rotatable pair is an active pair, and is the input end 1. Two output ends are located on the axis of the sliding pair, one primary output end 3 at the left side, one auxiliary output end 3.1 at the right side; the two output ends are translationally symmetrical with each other, and the two output ends have the same movement direction. The movement converting device 2 is effected by two RHs. The axis of the sliding pair is the expandable interface 4.

Kinematic Pair No. 51 (FIG. 51): FIG. 51 is translationally symmetrical type multiple-output kinematic pair composed of an RHP mechanism. All the kinematic pairs have a coincident axis. The rotatable pair is the input end 1; the rotatable pair is an active pair, and is the input end 1. The two output ends are located on the axis of the sliding pair, one primary output end 3 at the left side, one auxiliary output end 3.1 at the right side; the two output ends are translationally symmetrical with each other, and the two output ends have the same movement direction. The movement converting device 2 is effected by two RHs. The axis of the sliding pair is the expandable interface 4.

Kinematic Pair A No. 52 (FIG. 52.1): FIG. 52.1 is an equivalent symmetrical type double-output kinematic pair formed by a Hooke joint. The fixed axis of the Hooke joint is a horizontal axis, and two output ends expand from a swing axis of the Hooke joint (swinging in a vertical plane). The two output ends 3, 3.1 coincide to form equivalent symmetry.

Kinematic Pair B No. 52 (FIG. 52.2): FIG. 52.2 is an equivalent symmetrical type double-output kinematic pair formed by another Hooke joint. The fixed axis of the Hooke joint is a vertical axis, and two output ends expand from a swing axis of the Hooke joint (swinging in a horizontal plane). The two output ends 3, 3.1 coincide to form equivalent symmetry.

Kinematic Pair C No. 52 (FIG. 52.3): FIG. 52.3 is an equivalent symmetrical type double-output kinematic pair formed by a spherical hinge. The spherical hinge is formed by three orthogonal rotatable pairs. The fixed axis of the spherical hinge is a vertical axis, and output ends expand from the third rotatable pair. The third rotatable pair swings in a vertical plane. The two output ends 3, 3.1 coincide to form equivalent symmetry.

Composite multiple-output kinematic pairs: a composite multiple-output kinematic pair has a plurality of multiple-output kinematic pairs obtained by subsequently conducting symmetrical transformation; or the number of output ends of a complex multiple-output kinematic pair kinematic pair formed by a plurality of multiple-output kinematic pairs connected in series is three or more.

Kinematic Pair No. 53 (FIG. 53): FIG. 53 is a complex multiple-output kinematic pair obtained by adding an output end to Kinematic Pair No. 2 (FIG. 2). By expanding the axis of two bearings of Kinematic Pair No. 2, and adding an output end to the axis at the same side, it becomes a complex multiple-output kinematic pair. In FIG. 53, there are totally six output ends. One is the primary output end 3, and the remaining ones are auxiliary output ends 3.1 to 3.5. The auxiliary output ends are obtained by conducting symmetrical transformation to the primary output end by a plurality of times. There are many methods for forming the five auxiliary output ends: 1. In the three output ends above the axis, the right two are obtained by translational transformation; the right two auxiliary output ends are translationally symmetrical with the main output end; the lower three output ends are formed by reflection transformation to the upper three output ends. 2. The above three output ends are obtained by translational transformation, and the lower three output ends are 180-degree rotationally symmetrical with the upper three output ends. 3. The two bottom-right output ends are obtained by gliding reflection transformation to the upper-left main output end, and the two upper-right output ends are obtained by gliding reflection transformation to the bottom-left output ends. The bottom-left auxiliary output ends are obtained by reflection transformation to the main output end.

Kinematic Pair No. 54 (FIG. 54): FIG. 54 is formed by further conducting translational transformation one time to two complex double-changed reflectional symmetrical kinematic pairs shown in FIG. 15. That is, two Kinematic Pairs No. 14 are connected in series to form a complex kinematic pair having four output ends. This kinematic pair comprises reflection transformation, translational transformation, rotational transformation, as well as gliding reflection transformation.

Kinematic Pair No. 55 (FIG. 55), FIG. 55 is formed by further conducting reflection transformation one time to the complex double-changed translationally symmetrical kinematic pair shown in FIG. 34.2. A complex kinematic pair having four output ends is formed. When conducting reflection transformation, the structure of the gear pair can be understood with reference to the structure of Kinematic Pair No. 15. This kinematic pair comprises reflection transformation, translational transformation, rotational transformation, as well as gliding reflection transformation.

Kinematic Pair No. 56 (FIG. 56) is formed on the basis of Kinematic Pair No. 38 by adding an output end. At the right side of the primary output end 3 of Kinematic Pair No. 38, a translational output end 3.1 is added, and the original two auxiliary output ends become 3.2, 3.3. The primary output end 3 is translationally symmetrical auxiliary output end 3.1; the primary output end 3 is rotationally symmetrical auxiliary output end 3.2. By applying a plurality of Kinematic Pairs No. 56, robots having multiple symmetricities can be generated.

Kinematic Pair No. 57 (FIG. 57) is formed on the basis of Kinematic Pair No. 40 by adding an output end. At right side of the primary output end of the Kinematic Pair No. 40, a translational output end 3.1 is added, and the original two auxiliary output ends become 3.2, 3.3. Thus, a kinematic pair with four output ends is obtained. If there is a reflectional symmetrical output end at the side below the primary output end of Kinematic Pair No. 57, and there is a reflectional symmetrical auxiliary output end at the side below each auxiliary output end, Kinematic Pair No. 57 will have eight output ends. In the eight output ends, seven auxiliary output ends are symmetrical with the main output end. It comprises reflection symmetry, translational symmetry, rotational symmetry and gliding reflection symmetry. By suitably design the dimensions of the output end the structure, scaled symmetry will be created. Thus, by applying a plurality of Kinematic Pairs No. 57, robots having multiple symmetricities can be generated.

The above multiple-output kinematic pairs are illustrated as having two or a few output ends. Actually, symmetrical transformation can be conducted in sequence to these kinematic pairs. In this way, more output ends can be obtained. Some different multiple-output kinematic pairs disclosed above can also be connected in series to form more output ends, and thus to form multiple-output kinematic pairs which are more complex.

There are a variety of symmetrical multiple-output kinematic pairs, and it is not able to list them one by one. All the multiple-output kinematic pairs that follow the definition of the invention fall within the protection scope of the invention.

(VI) About Chains and Derivative Chains

As to chains: the number of chains mentioned in the disclosure is the number of chains expanded from the base platform, is also the number of the active pairs, called as the number of active chains; the number of derivative chains connected with the movable platform may be the same or different, and the number of derivative chains connected with the movable platform is smaller than or equals to the number of active chains. A chain is generally composed of a kinematic pair and linkages. However, in various references, when the chains are expressed customarily by capital letters for kinematic pairs, only capital letters are expressed while the linkages are not; the disclosure uses this expression manner.

As to auxiliary derivative chains and the expansion of auxiliary derivative chains: the auxiliary derivative chains comprise three types: large-sized auxiliary derivative chains, middle sized auxiliary derivative chains, small-sized auxiliary derivative chains. A large-sized auxiliary derivative chain is connected to the output end of the first kinematic pair; the large-sized auxiliary derivative chain is the same or substantially the same derivative chain with the original chain s, and thus is called as large-sized auxiliary derivative chain. Most embodiments are about large-sized auxiliary derivative chains. A small-sized auxiliary derivative chain is a derivative chain connected with the third generalized kinematic pair. It comprises two less kinematic pairs than the original chain, is the derivative chain having the minimum number of kinematic pairs, and thus is called as small-sized auxiliary derivative chain. Not all the multi-platform symmetrical parallel robots have a small-sized auxiliary derivative chain. Sometimes a small-sized auxiliary derivative chain itself is a linkage, for example, Embodiment 11 (FIG. 68), and thus it is unitarily called as auxiliary derivative chain in the disclosure. The auxiliary derivative chain comprises only one linkage, and is related to the belonging relationship of a boundary kinematic pa. If a boundary kinematic pair belongs to a downstream derivative chain, the downstream derivative chain of Embodiment 11 is a single kinematic pair chain. A middle sized auxiliary derivative chain is a derivative chain connected with the second generalized kinematic pair. It has one less kinematic pair than the large-sized auxiliary derivative chain, and has one more kinematic pair than the small-sized auxiliary derivative chain, and thus is called as middle sized auxiliary derivative chain. It can be understood with reference to Embodiment 10 (FIG. 67). A multiple-movable-platform parallel robot may comprise one type, or two types or three types of auxiliary derivative chains. The auxiliary derivative chain is the same or similar.

In the same derivative chain, the upstream derivative chain corresponding to the large-sized auxiliary derivative chain is the smallest one, and only is a multiple-output kinematic pair, for example, Embodiment 1. Similarly, the upstream derivative chain corresponding to the small-sized auxiliary derivative chain is the largest one, and has three generalized kinematic pairs, for example, Embodiment 11. Similarly, the upstream derivative chain corresponding to the middle-sized auxiliary derivative chain has two generalized kinematic pairs, for example, Embodiment 10.

As to expression that the auxiliary derivative chain (also called as downstream derivative chain) is the same or substantially the same with the downstream original chain s: same refers to be composed of the same kinematic pairs, having the same connecting sequence, and the lengths of the components connecting the kinematic pairs being also the same. Substantially the same refers to be composed of the same kinematic pairs, having the same connecting sequence, but the lengths of the components connecting the kinematic pairs being somewhat different from each other. Assembling it is required that the components of robots or parallel machine tool robots have the same length, the walking parallel robots may also be substantially the same or the same.

The symmetry between the auxiliary derivative chain and the downstream original chain, the symmetry between the auxiliary derivative chain and the downstream original chain and the symmetry between the auxiliary derivative chain and the downstream derivative chain are the same as the symmetry of the primary output end and the auxiliary output end where they are located at. The symmetricities are also classified into two types: strict symmetry and loose symmetry.

(VII) About Symmetricities

It is noted that the term symmetry used in the invention is not the same concept with the symmetry used in the field of parallel robot mechanisms. The symmetry used in the field of parallel robot mechanisms means that a parallel mechanism has the same chains, and thus it defines the instinct property of a parallel mechanism. The term symmetry used in the invention refers to the relationship of the original parallel mechanism and the derivative parallel mechanism, refers to the relationship of the original movable platform and the derivative movable platform, refers to the relationship of the primary output end and the auxiliary output end of a multiple-output kinematic pair, and refers to the relationship of the downstream original chain and the auxiliary derivative chain. Thus, it defines the nature the relationship of two parallel mechanisms.

The term symmetry used in the invention reflexes is in nature similar to the symmetry in the field of geometry, and is a type of transformation. However, it is not completely the same with the symmetry in the field of geometry. An example can be seen from Embodiment 1, its symmetrical double-output kinematic pairs act as the first kinematic pairs, and are active pairs. Theatrically, if they are symmetrical, the two active pairs both need driving; however, in engineering field, it may drive only one rotatable pair. As another example, the symmetry of a double-sided walking parallel robot may be loose symmetry. Most important characteristics of the term symmetry used in the invention is that, between the parallel mechanisms, there is a mechanical connection to provide a continuous and precise transmission path for energy, movement and information.

The term scaled symmetry used in the invention comes from a concept of fractal geometry. Scaled symmetry is symmetry with different dimensions, is symmetry after enlarged or shrunk, is symmetry formed from self-similarity, and is symmetry with similarity between one portion and another portion. In references, it is called as telescope symmetry or symmetry with self-similarity, or is called as scaled symmetry. The disclosure uses the term scaled symmetry. For example, for two similar triangles, although they have different sizes, they are scaled symmetrical. Scaled symmetricities are classified into scaled reflectional symmetry, scaled translational symmetry, scaled rotational symmetry and scaled gliding reflection symmetry.

The term symmetry used in the invention refers to symmetry at home position, and the symmetricities include reflectional symmetry, translational symmetry, rotational symmetry, gliding reflection symmetry and scale symmetry, and also include symmetry obtained by forming the above symmetry in sequence (multiplied) by limited times. Symmetricities between the original base platform and the derivative base platform and symmetricities between output ends further comprise equivalent symmetry.

The term symmetry used in the invention is a definition to a structure in an initial state. As to the symmetry in other times, the symmetry may be varied. For example, the symmetry at one time may be changed into other structural symmetry at different times. The symmetry may be overall symmetry or phase-change symmetry. Examples can be seen from the symmetricities in Embodiments 3, 4.

The term symmetricities used in the disclosure further include the symmetry between the upstream original chain and the downstream derivative chain. Such symmetry is not mentioned above. Actually, the symmetry between the upstream original chain and the downstream derivative chain is included in the symmetry between output ends and the symmetry between parallel mechanisms. The symmetry between the upstream original chain and the downstream derivative chain, and the symmetry includes equivalent symmetry, reflection symmetry, translational symmetry, rotational symmetry, gliding reflection symmetry and scaled symmetry.

The symmetricities mentioned in the disclosure comprise strict symmetry and loose symmetry. Assembling robots and parallel machine tools belong to strict symmetry, and walking parallel robots pertain to loose symmetry. Loose symmetry further comprises a condition that the translation distances are different. Scaled symmetricities also include strict symmetry and loose symmetry. Strict profiling or strict scaling profiling belong to strict symmetry, and verified profiling belongs to loose symmetry.

As to the symmetrical transformation of the original parallel mechanism, $H$ it is possible to perform symmetrical transformation in three directions (at the same time). (1) performing symmetrical transformation in the normal line direction of the base platform plane, for example, translational transformation in Embodiments 9, 10; (2) performing symmetrical transformation in a direction in the base platform plane, for example, translational transformation in Embodiments 15, 16; (3) performing symmetrical transformation along a plane which forms an angle with the base platform plane, for example, rotational transformation in Embodiment 21.

Three transformations or two transformations or one transformation can be conducted in sequence and repetitively. By conducting transformations along three directions at the same time, a lot of symmetrical parallel mechanisms can be created, and may even fill the whole Euclidean space.

(VIII) About Generating Element

The basis of the invention is a proper generating element. When a generating element is given, by applying the method disclosed in the invention, parallel mechanisms having all DOF combination patterns (57 types) can be obtained. The 57 types of DOF combinations, with different chain structures and different symmetrical manners, a large amount of multiple-movable-platform parallel robots can be generated. Embodiment of the disclosure are aimed at describing the invented methods and invented structures precisely and completely. For describing clearly and conveniently, on the one hand, the generating element is not selected form very simple parallel mechanisms. For example, 1-RS&1-RRR (1T1R) 2-DOF parallel mechanism will not be used as a generating element. On the other hand, four-arthropod parallel mechanisms having complex structures are also not selected, because it is not convenient to describe the method and structure. In the selection of generating elements, two-arthropod parallel mechanisms and planar parallel mechanisms are general used. That is, the mechanism shall be used for fully describing the structure and method, but the structure shall not be too complex. As supplementary to generating element embodiments, some relatively typical generating elements are given below, which comprises multi-arthropod parallel mechanisms.

The 5-RRR (RR) 5-DOF symmetrical parallel mechanism proposed in Reference "Advanced Spatial mechanisms" (Zhen Huang, Higher Education Press, 2006.5, simplified as Reference 1 below), the three-dimensional cylindrical movement parallel mechanisms proposed in Reference "Model Synchronization of Parallel Mechanisms" (Xianwen Kong, etc., China Machine Press, 2013.11, simplified as Reference 2 below), and the 5-DOF parallel mechanisms proposed in Reference 2 can be used as generating elements. Since the active pair axis is parallel to or perpendicular to the original base platform plane, they can be sued as generating elements directly. When the parallel mechanism proposed in Reference 1 is used as a generating element, it has two translational transformation manners. One manner is that: by properly enlarging the regular pentagonal where the first kinematic pair of the original chain are located, relatively sufficient interference space can be provided to the chains, so translational transformation can be conducted in a direction perpendicular to the original base platform plane. This manner can be seen from Embodiments 9, 10 and 11. Another manner is that: when the input end of the original chain is connected in series with an orthogonal direction-varying multiple-output kinematic pair (see Kinematic Pair No. 25 below), translational transformation can be conducted on the original base platform plane, as can be seen from Embodiments 15, 16.

Reference 2 (C pair can be substituted by PR pair) proposed three translational parallel mechanisms. Some of them can be used as generating elements directly. Some of them can be used as generating elements by connecting in series a complex direction-varying or complex double-changed multiple-output kinematic pair. For example, by connecting in series a Kinematic Pair No. 17, reflectional symmetrical transformation can be achieved. by connecting in series a Kinematic Pair No. 34, translationally symmetrical transformation can be achieved.

The parallel mechanisms proposed in Reference "Discuss on Mechanism DOF" (Zhen Huang, etc., Science Press, 2011.8, simplified as Reference 3 below), the parallel mechanisms proposed in Reference "Mathematic Basis of Robot Mechanisms" (Jingjun Yu, etc., China Machine Press, 2008.7, simplified as Reference 4 below), and the parallel mechanisms proposed in Reference "Development in Modern Mechanisms" (Huijun Zou, Feng Gao, Higher Education Press, 2007.4, simplified as Reference 5 below) can all be used as generating element directly, wherein the mechanisms disclosed in Reference 5 have been used in embodiments of the invention (Embodiment 9, 7, 19). Reference 4 and Reference 5 comprise many parallelogram kinematic pairs. Mechanisms disclosed in of Reference 3 of Reference 1 have similar structures and can also be used for conducting symmetrical transformation.

The three-dimensional spherical rotation parallel mechanism proposed in Reference 2 can be used as a generating element. In most three-dimensional spherical rotation parallel mechanisms, by applying Kinematic Pair No. 14 reflection multiple-movable-platform parallel robots can be achieved, and by applying Kinematic Pair No. 24, translational multiple-movable-platform parallel robots can be achieved.

The translational three-rotational parallel mechanism proposed in Reference 2 and the 5-DOF parallel mechanism proposed in Reference 2 can both be used as generating elements. By connecting in series Kinematic Pair No. 14, reflection multiple-movable-platform parallel robots can be achieved, and by connecting in series Kinematic Pair No. 24, translational multiple-movable-platform parallel robots can be achieved.

Most of the three-translational and one-rotational parallel mechanisms proposed in Reference 2 can be directly used as generating elements for conducting reflection transformation. The rotatable pair is a generating element for an active pair, and translational transformation can be achieved by connecting in series a Kinematic Pair No. 25. With the cooperation of Kinematic Pair No. 40, rotational transformation can be achieved. Sliding pair is the generating element for an active pair, and translational transformation can be achieved by connecting in series a Kinematic Pair No. 34; with reference to Kinematic Pair No. 40 and Kinematic Pair No. 25, rotational transformation can also be achieved by them.

For any parallel mechanism, if the first kinematic pair of each chain is an active pair and is the unique active pair of this chain, this parallel mechanism can be used as a generating element. All of them can be used for generating derivative parallel mechanisms having various symmetrical characteristics.

Based on the property of the symmetry, the newly generated derivative parallel mechanism can also be used as a generating element to form a new derivative parallel mechanism. The derivative base platform can also expand from the auxiliary output end. As an example that can be seen from Embodiment 15, the right side derivative parallel mechanism can be used as the original parallel mechanism to conduct reflection transformation. In this way, a reflection—the derivative parallel mechanism is obtained, and this derivative parallel mechanism is the sliding reflection-parallel mechanism of the original parallel mechanism. Embodiment 20 can also be formed by conducting transformation of the derivative parallel mechanism of Embodiment 2 by rotating it by 90 degrees. It can be understood with reference to the description to Embodiment 12.

(IX) Other Instructions

1. Unification and standardization of active pairs: for the same multiple-movable-platform parallel robot, it is preferred that the active pairs are of the same type of kinematic pairs. In this way, it is convenient to produce and control, and convenient to achieve standardization. If the kinematic pairs are not of the same type, a varying output kinematic pair can be connected in series, so that the input kinematic pairs become the same type.

2. Numbering of generalized kinematic pairs: the kinematic pairs are numbered from the base platform, the kinematic pair mounted to the base platform is the No. 1 kinematic pair; the kinematic pair connected with No. 1 kinematic pair is No. 2; and so on.

3. Definition of the orientation of the original parallel mechanism: assuming that the original parallel mechanism base platform is in a planar horizontal state, and the definition to upper, lower, left and right is based on this horizontal position. That is, even if it is rotated, the base platform is still regarded as horizontal, and the original description to upper, lower, left and right is still effective. When the original parallel mechanism is located above the base platform, the lower end of the original chain refers to the end of the original chain that is connected with the base platform, and the upper end of the original chain, or called as tip end, refers to the end of the original chain that is connected with the moving platform.

4. For convenient expression, in the embodiments of the disclosure, the movable platform in many cases is in the form of a triangular movable platform; especially, in a 6-DOF parallel mechanism, a triangular movable platform is also used. Actually, in other possible patterns, various other types of movable platforms can be used, like point movable platform, line segment type movable platform, planar movable platform and table-like moving platform. For example, the movable platform of a parallel machine tool robot can be of a two-layer movable platform.

5. Differences and interconnections between expandable kinematic pairs, multiple-output kinematic pairs and boundary kinematic pairs: expandable kinematic pair refers to a kinematic pair before it expands from the auxiliary output end; after expanding from the auxiliary output end, it becomes a multiple-output kinematic pair, and an auxiliary output end can further expand from this multiple-output kinematic pair, and thus this multiple-output kinematic pair is still an expandable kinematic pair. A boundary kinematic pair must be a multiple-output kinematic pair, but is used under different conditions; when a downstream derivative chain is mentioned, is corresponds to a boundary kinematic pair. For a determined derivative parallel mechanism, the three concepts do not need to be distinguished. The components of the three all comprise an expandable interface, without loss of generality.

6. Two parallel leg mechanisms of a double-sided walking parallel robot: the two pairs of base platform planes are parallel to or located on a plane; the expression "are parallel to or located on a plane" is an expression used in engineering field. Actually, two pairs of base platform planes are substantially parallel with each other and relatively near each other; thus, when they are fixedly connected together, a double-sided walking parallel robot can be formed. Here "relatively near" means that the distance between the two original base platform planes is smaller than one fifth or less of the height of the double-sided walking parallel robot. When there is provided with a height difference, the heights of the inner and outer legs can be coordinated or the interference between chains can be reduced.

Operation procedure: it is classified into two conditions: time sharing operation and simultaneous operation.

Examples of simultaneous operation may be made to an assembling robot and a profiling parallel machine tool.

The operation procedure of a multiple-movable-platform parallel robot will be described with the 3T0R assembling robot of Embodiment 16 (FIG. 73) as an example. In the multiple-movable-platform parallel robot, there are totally one set of driving systems and one set of control system, the same original chain s and the same original movable platform. For a given object position, by applying a mathematic model for kinetics, the displacement of the active pair of the original parallel mechanism is calculated; in accordance with this displacement, the driving system is provided with an instruction via the control system; the active pair is moved to a given position; the original movable platform moves to the object position. Meanwhile, the derivative movable platforms are all moved to their object positions. The derivative movable platform achieves the same operation with the original movable platform same. The operation of the parallel machine tool is similar to that of the assembling robot.

The operation of the profiling parallel machine tool is described below. On the operation table of the original parallel mechanism on which the probe is mounted, a finished element (called as standard part) has already been mounted, a blank for an element to be machined (called as blank below) is mounted to an operation table of another derivative parallel mechanism; a cutting tool is mounted to the movable platform of said another derivative parallel mechanism. A control (manual or automatic control) probe moves to be closer to the standard part slowly, and the cutting tool moves to be closer to the blank slowly and starts the machining and cutting to the blank; the probe contacts the standard part, the cutting tool stops to be advanced. Changing the probe position, moving it slowly to approach the standard part, and starting the machining to another portion of the blank. The machining to the blank is finished when the probe has contacted with all portions of the standard part.

Time sharing operation will be described with the double-sided walking parallel robot as an example.

Normal upstanding state: when the movable platforms of two original parallel leg mechanisms (foot arches) are at a lower position, the two leg mechanisms are alternatively lifted up (foot moving phase) and put down (foot standing phase) to finish a walking action. Although another pair of parallel leg mechanisms are also moved, they do not finish any operation, i.e., they are "idle".

Reversed state: when the walking parallel robot is turned over by 180 degrees resulted in an unforeseen condition, two derivative parallel mechanisms are located at a lower position, and two original parallel mechanisms are located at an upper position. In this way, two derivative parallel leg mechanisms are alternatively lifted up and put down to finish a walking action. Two original parallel leg mechanisms are in "idle" state.

Standing-by-side state: when the base platform plane is in a state of nearly perpendicular to the horizontal plane (this is also an unforeseen state), and it cannot recover the normal upstanding state or recover the reversed state, neither of the parallel leg mechanisms on opposite sides of the base platform plane can finish a walking action. Now, the side ring of the walking parallel robot reaches the ground, and the toes contact with a side wall (or a supporting object). A method can be used for changing the weight center of the walking parallel robot; for example, the weight center can be changed by leg movement, the weight center can be changed by changing the position of the center of the ring by means of a contracted returning ring; thus, the robot achieves rolling, or toes moving, applying a force to the side wall or supporting object, and so achieves the rolling of the walking parallel robot so that it comes back to the normal upstanding or reversed state. In this way, the walking parallel robot can move in various conditions. Thus, the walking parallel robot can finish a walking task in various states.

Significances and advantages of the invention will be described below:

The invention may be mainly used in the field of industrial robots; it can perform welding, machining and assembling, handling, panting, detecting, stacking, punching, membrane applying, scrubbing, grinding and polishing, and laser treating and other complex operations to a plurality of operation objects at one time.

The invention provides the following meaningful work: 1. There provides a method for generating a multiple-movable-platform parallel robot for parallel mechanism that meet some requirements. The method is applicable in some existing parallel mechanisms, and can perform one or two symmetrical operations. For example, existing Delta mechanisms, if not modified, can only be used for conducting reflectional symmetrical transformation, but cannot be used for conducting translationally symmetrical transformation on a base platform plane. 2. There provides an orthogonal direction-varying and orthogonal double-changed multiple-output kinematic pair and a corresponding method; in this method, the orthogonal direction-varying and orthogonal double-changed multiple-output kinematic pair is connected in series to the input end of the original chain of the generating element; by the generating element, many types of symmetrical transformations can be conducted. The transformations include four basic symmetrical transformations and scaled symmetrical transformation. Examples can be seen from Embodiment 15, in which translational transformation in another direction can be conducted. 3. There provides an arbitrary-direction-varying and arbitrary double-changed multiple-output kinematic pairs and a corresponding method; in this method, the arbitrary-direction-varying and arbitrary double-changed multiple-output kinematic pair is connected in series to the input ends of some parallel mechanism chains; after connection in series, these parallel mechanisms become generating elements which can be used for conducting many types of symmetrical transformations. By means of this idea, an original parallel mechanism that does not meet the requirements can be converted into a original parallel mechanism that meets the requirements to achieve symmetrical transformation. In this way, any parallel mechanism, in which all the first kinematic pairs are active pairs or only the first kinematic pair is an active pair, can be used as the original parallel mechanism. Examples can be seen from Embodiment 16, in which translational transformation can be conducted for a Delta parallel mechanism. 4. There provides the structure and device of a scaled multiple-movable-platform parallel robot, and thus it becomes possible that the generating element is used for conducting many types of scaled symmetrical transformations, and a possible pattern is provided for achieving multi-dimensional scaling and machining. Examples can be seen from Embodiment 25. 5. There provides the concept and structure of a scaled symmetrical multiple-output kinematic pair, in which operational patterns of generating elements for conducting many types of scaled symmetrical transformations are increased. For example, Kinematic Pair No. 26, Kinematic Pair No. 27. 6. There provides the concept, structure and examples of symmetrical multiple-output kinematic pair, by means of which, conditions for generating various multiple-movable-platform parallel robots are created.

In summary, the invention has the following advantages: relatively broad applications and a low error rate; easy to be repaired; simple structure; convenience in standardization; high productivity; relatively low cost. For example, the invention, when applied in parallel machine tools or assembling robots, two or more parts can be machined at the same time by means of one set of driving system and one set of control system; the working efficiency is increased significantly; conditions for parallel assembling line are also created. If the invention is applied in profiling parallel machine tools, one or more products exactly the same with a real body can be produced by profiling in accordance with the real body. If the invention is applied in scaling parallel machine tools, one or more enlarged or shrunk products can be produced in accordance with the real body. If the invention is applied in walking parallel robots, by means of one set of driving system and one set of control system, the robot can still walk in the condition that the robot is turned over by 180 degrees, so the ability of coping with complex conditions is increased greatly.

BRIEF DESCRIPTION OF FIGURES

FIG. 1 to FIG. 57 are schematic views of Kinematic Pair No. 1 to Kinematic Pair No. 57. Corresponding relations between them are listed below: FIG. 1 is a schematic view of Kinematic Pair No. 1; FIG. 2 is a schematic view of Kinematic Pair No. 2; FIG. 3.1 and FIG. 3.2 are schematic views of Kinematic Pair No. 3; FIG. 4 is a schematic view of Kinematic Pair No. 4; FIG. 9.1 and FIG. 9.2 are schematic views of Kinematic Pair No. 9; FIG. 57 is a schematic view of Kinematic Pair No. 57.

FIG. 58 to FIG. 88 are schematic views of 33 embodiments.

FIG. 58 to FIG. 65 are schematic views of reflectional symmetrical type Embodiment 1 to Embodiment 8. FIG. 58 is a schematic view of Embodiment 1; FIG. 59 is a schematic view of Embodiment 2; FIG. 60 is a schematic view of Embodiment 3; FIG. 61 is a schematic view of Embodiment 4; FIG. 62 is a schematic view of Embodiment 5; FIG. 63 is a schematic view of Embodiment 6; FIG. 64 is a schematic view of Embodiment 7; FIG. 65 is a schematic view of Embodiment 8.

FIG. 66 to FIG. 76 are schematic views of translationally symmetrical type Embodiment 9 to Embodiment 19. FIG. 66 is a schematic view of Embodiment 9; FIG. 67 is a schematic view of Embodiment 10; FIG. 68 is a schematic view of Embodiment 11; FIG. 69 is a schematic view of Embodiment 12; FIG. 70 is a schematic view of Embodiment 13; FIG. 71 is a schematic view of Embodiment 14; FIG. 72 is a schematic view of Embodiment 15; FIG. 73 is a schematic view of Embodiment 16; FIG. 74 is a schematic view of Embodiment 17; FIG. 75 is a schematic view of Embodiment 18; FIG. 76 is a schematic explosive view of Embodiment 19.

FIG. 77 to FIG. 78 are schematic views of rotationally symmetrical type Embodiment 21 to Embodiment 22. Embodiment 20 has the same schematic view with FIG. 59 (Embodiment 2); FIG. 77 is a schematic view of Embodiment 21; FIG. 78 is a schematic view of Embodiment 22.

FIG. 79 and FIG. 80 show rotationally symmetrical type embodiments. FIG. 79 is a schematic view of Embodiment 23; FIG. 80 is a schematic view of Embodiment 24.

FIG. 81 to FIG. 84 are schematic views of scaled symmetrical type Embodiment 25 to Embodiment 28. FIG. 81 is a schematic view of Embodiment 25; FIG. 82 is a schematic view of Embodiment 26; FIG. 83 is a schematic view of Embodiment 27; FIG. 84 is a schematic view of Embodiment 28.

FIGS. 85.1 and 85.2 and FIG. 86 are schematic views of double-sided symmetrical type walking parallel robot Embodiment 29 and Embodiment 30. FIG. 85.1 is a schematic top view of Leg A and Leg B of Embodiment 29; FIG. 85.2 is a schematic top view of Leg A and Leg B of Embodiment 29 mounted with fixed returning rings. FIG. 86 is a schematic top view of adjustable returning ring portions of a double-sided walking parallel robot of Embodiment 30. Embodiment 31 has a view shown in FIG. 86.

FIG. 87 is a schematic explosive view of reflectional symmetrical type Embodiment 32 in which downstream chains are combined. FIG. 88 is a schematic top view of walking parallel robot Embodiment 33 in which downstream chains are combined.

LIST OF REFERENCE NUMERALS AND SIGNS

Figure 19:
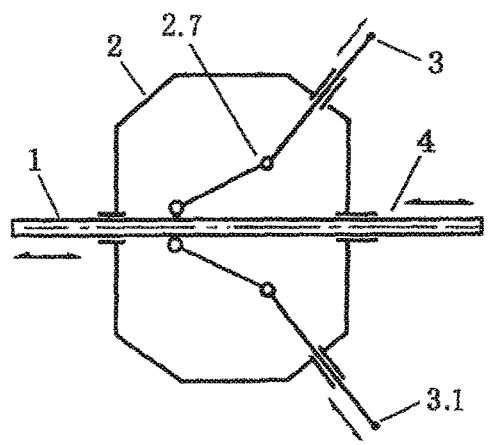
Figure 20:
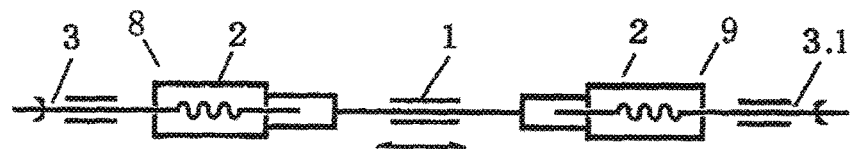
FIG. 20 is a schematic view of Kinematic Pair No. 20, and so on. Ultimately

Reference numerals of multiple-output kinematic pairs: input end of multiple-output kinematic pair (simplified as input end) 1; movement converting device of multiple-output kinematic pair (simplified as converting device) 2; gear 2.1; bevel gear 2.2; gear rack 2.3; intermediate gear 2.4; parallelogram side rod 2.5; Sarrus mechanism side rod 2.6; linkage mechanism 2.7; primary output end of multiple-output kinematic pair (simplified as the main output end) 3; auxiliary output end of multiple-output kinematic pair (simplified as the auxiliary output end), or the first auxiliary output end is represented by 3.1, and when the same multiple (double)-output kinematic pair has a plurality of output ends, represented respectively by 3.2, 3.3, 3.4, 3.5; in the same derivative parallel mechanism, if the expanding points of the symmetrical multiple-output kinematic pairs are different, the symmetrical multiple-output kinematic pairs are different, and the primary output ends are also different; the primary output ends are represented respectively by 3a, 3b, 3c, corresponding auxiliary output ends are represented respectively by 3a.1, 3b.1, 3c.1; expandable interface device of multiple (double)-output kinematic pair (simplified as interface device) 4, interface connecting devices 4.1; parallelogram A-type mechanism 5, with output end on one side; 6, parallelogram B-type mechanism 6, with output end on a rotatable pair; Sarrus mechanism 7; RHP movement-converting complex kinematic pair 8; PHR movement-converting complex kinematic pair 9; single-input and single-output (or double-output) output complex kinematic pair 10 with direction-varying gears (like the structure of Kinematic Pair No. 14);

Reference numerals in embodiments: original parallel mechanism 11; derivative parallel mechanism or first derivative parallel mechanism 11.1; second derivative parallel mechanism 11.2; third the derivative parallel mechanism 11.3; and so on; original base platform 12; hinge point of original base platform represented by reference numeral B0; there is only one original base platform; active pair of or active pair input end in original chain 12a; when all the active pairs are the same, 12a represents the active pairs (or the input ends of the active pair); the derivative base platform 12.1; when there are a plurality of derivative base platforms, first derivative base platform 12.1, second derivative base platform 12.2, third the derivative base platform 12.3; and so on; hinge points of derivative base platform are represented directly by reference numerals B1, B2, B3, but most reference numerals are not marked in the figures; original chain s 13; when the original chain s of the original parallel mechanism are different, they are distinguished by left, middle and right or are represented by reference numeral 13a; derivative chain 13.1; when there are a plurality of derivative parallel mechanisms, the derivative chains in different derivative parallel mechanisms are distinguished by derivative chain 13.1 and derivative chain 13.3, and so on; if the derivative chains of the same derivative parallel mechanism are different, they are distinguished by left, middle and right or are represented by reference numeral 13a.1; downstream original chain s or downstream main rod element 14; if the downstream original chain s of the original parallel mechanism are different, they are distinguished by left, middle and right, or represented by reference numeral 14a; auxiliary derivative chain or downstream derivative rod element or downstream derivative chain 14.1; when there are a plurality of derivative parallel mechanisms, the auxiliary derivative chains or downstream auxiliary derivative chains are distinguished by downstream auxiliary derivative chain 14.1, downstream auxiliary derivative chain 14.2, downstream auxiliary derivative chain 14.3, and so on; if the auxiliary derivative chains of the same derivative parallel mechanism are different, they are distinguished by left, middle and right, or are represented by reference numeral 14a.1, or are only described without any reference numeral; original movable platform 15; there is only one original movable platform; derivative movable platform 15.1; when there are a plurality of derivative movable platforms, they are distinguished by derivative movable platform 15.1, derivative movable platform 15.2, derivative movable platform 15.3, and so on; symmetrical multiple-output kinematic pair 16; expandable kinematic pair 16a; boundary kinematic pair 16b; if the expanding points of the symmetrical multiple-output kinematic pairs of the same derivative parallel mechanism are different, they are represented by 16.1, 16.2 and16.3; for a walking parallel robot, Leg A multiple-output kinematic pair 16.4; for a walking parallel robot, Leg B multiple-output kinematic pair 16.5; manipulator 17; detecting sensor or probe 18; servo-motor 19; servo-motorized push rod 20.

Reference numerals of double-sided walking parallel robots: Leg A 31.1; Leg A original parallel mechanism 21.1; Leg A derivative parallel mechanism 21.3; Leg B 31.2; Leg B original parallel mechanism 21.2; Leg A original base platform 22.1; Leg A original base platform 22.1; Leg B original base platform 22.2; Leg B original base platform 22.2; hip joint (four base platforms, as two pairs, fixedly connected together) 23; Leg A chain 34.1; Leg A original chain 24.1; Leg B chain 24.2; Leg B original chain 34.2; Leg A foot arch 25.1; Leg A original movable platform foot arch 25.1; Leg B foot arch 25.2; Leg B original movable platform foot arch 25.2; Leg A toe 26.1; Leg A original movable platform toe 26.1; Leg B toe 26.2; Leg B original movable platform toe 26.2; returning ring 27, 28; link rod 28, 29; arched rod 29, 30; contracted mechanism 30;

Common or shared multiple-output kinematic pair 31; when there are two multiple-movable-platform parallel robots, the common multiple-output kinematic pairs are represented by 31a, 31b; common primary output end 32, common auxiliary output end 32.1; common downstream original chain 33; common auxiliary derivative chain 33.1.

DETAILED DESCRIPTION OF THE EMBODIMENTS

Now some typical embodiments will be described with reference to the drawings, including typical embodiments of reflectional symmetrical type, translationally symmetrical type, rotationally symmetrical type, gliding reflectional symmetrical type, scaled symmetrical type, and other composite symmetrical type multiple-movable-platform parallel robot.

In all the embodiments, the derivative base platform is symmetrical with the original base platform; each auxiliary output end is symmetrical with the main output end; the auxiliary derivative chain is symmetrical with the downstream original chain; the derivative movable platform is symmetrical with the original movable platform. It is the same in each of the embodiments. Thus, for saving words, we will describe this feature only for some typical multiple-movable-platform parallel robots and when it is necessary, and will not describe it repetitively.

In all the embodiments, a multiple-movable-platform parallel robot "comprises a original parallel mechanism 11 and one (or more) derivative parallel mechanism 11.1; the original parallel mechanism comprises a original base platform 12, an original chain 13 and an original movable platform 15; the derivative parallel mechanism comprises a derivative base platform 12.1, the derivative chain 13.1 and a derivative movable platform 15.1." The above expression between the quotation marks as well as the reference numerals used here are applied in the same manner in all the embodiments. Thus, for saving words, they will not be cited and described repetitively except for some typical embodiments.

Generalized kinematic pairs on an original chain will be numbered in a sequence of from bottom to top. For a given original chain, the kinematic pairs and their reference numerals are determined, and the active pair and the active pair input end are determined accordingly. For example, when it mentions simply that "the original chain is an RUS-chain", it means equally that "the first generalized kinematic pair is a rotatable pair, the second generalized kinematic pair is a Hooke joint, and the third generalized kinematic pair is a spherical pair", and it indicates at the same time that "the active pair is a rotatable pair, which is a simple kinematic pair." If there is a complex kinematic pair, the complex kinematic pair will be expressed by its abbreviation within parentheses, with the first capital letter within the parentheses indicating the active pair input end. For example, a first generalized kinematic pair of chain (RGR) RR is (RGR), with the input end being the left one, a rotatable pair. It is evident that this rule applies for all cases. Thus, unless necessary, we will not point out each of the first generalized kinematic pair, the second generalized kinematic pair and the third generalized kinematic pair, and will not point out each of the active pair or the active pair input end, etc.

In the following description, one or two embodiments will be described in details for each type of embodiments. For example, relatively detailed description is made to Embodiment 1, Embodiment 7, Embodiment 17 and Embodiment 19, while other embodiments are only simply described.

In the embodiments, capital letters with the following meanings are used: P represents sliding (translational) pair, R represents rotatable pair or rotational DOF (degree of freedom), T represents translational DOF, H represents helical pair, U represents Hooke joint, U* represents pure-translational universal joint, S represents spherical (ball) pair. Capital letters appeared in some drawings have the same meanings. In addition, in the drawings, B0 represents original base platform, B1, B2 and B3 represent various derivative base platform.

(I) Reflectional Symmetrical Type Embodiments (Embodiments 1 to 8)

Embodiment 1

Figure 58:
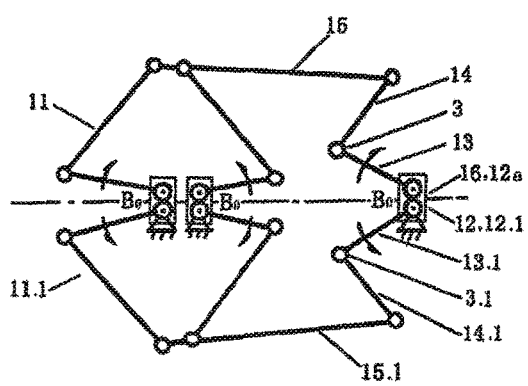

Embodiment 1 (FIG. 58) shows a first type of reflectional symmetrical type plane multiple-movable-platform parallel robot in which the original parallel mechanism is 3-RRR (2T1R). The robot comprises a original parallel mechanism 11 and a derivative parallel mechanism 11.1. The original parallel mechanism 11 comprises an original base platform 12, original chain s 13 and an original movable platform 15. The derivative parallel mechanism 11.1 comprises a derivative base platform 12.1, a derivative chain 13.1 and a derivative movable platform 15.1. The original base platform 12 is linear type base platform B0B0B0, having an original base platform planar the plane of the original parallel mechanism.

The original parallel mechanism 11 is above the dotted line illustrated in this figure. The original parallel mechanism 11 has a structure described below: the original base platform 12 is a linear type base platform, and the original base platform plane is within the plane of the parallel mechanism. The original chain 13 is an RRR chain, and the original movable platform 15 is a line segment type movable platform. The first generalized kinematic pair of the original chain 13 is a rotatable pair R, the rotatable pair being formed as an active pair 12a, and the first generalized kinematic pair comprises a double-output kinematic pair 16 (with reference to Kinematic Pair No. 1, FIG. 1), the double-output kinematic pair 16 having a primary output end 3 connected to a downstream original chain 14. The downstream original chain 14 is an RR chain. The downstream original chain is connected to the original movable platform 15.

The derivative parallel mechanism 11.1 is below the dotted line illustrated in this figure. The derivative parallel mechanism has a structure described below: the derivative base platform 12.1 is reflectional symmetrical with (can also be regarded as equivalent symmetry) the original base platform 12. The derivative chain 13.1 is an RRR chain, and the auxiliary derivative chain 14.1 is an RR chain. The auxiliary derivative chain 14.1 has the same structure with the downstream original chain 14, and the two are symmetrical with each other. The double-output kinematic pair 16 has an auxiliary output end 3.1 connected with the auxiliary derivative chain 14.1. The auxiliary output end 3.1 is reflectional symmetrical with the primary output end 3. The derivative movable platform 15.1 is a line segment type movable platform. The derivative movable platform 15.1 is reflectional symmetrical with the original movable platform 15.

Embodiment 2

Embodiment 2 (FIG. 59) shows a first type of reflectional symmetrical type plane-symmetrical double-platform parallel robot in which the original parallel mechanism is 3-PRR (2T1R). The main difference between it and Embodiment 1 is that they have different first generalized kinematic pairs, that is, Embodiment 1 has a rotatable pair and Embodiment 2 has a sliding pair. The axis of the rotatable pair of Embodiment 1 is perpendicular to the base platform plane, while the axis of the sliding pair of Embodiment 2 is within the base platform plane. Embodiment 2 is characterized in that the active pair 12.1 has a coincident axis, and the active pair is composed of three square tubes disposed one around another in movable fit. The smallest square tube is the active pair 12a of the right side chain with opposite ends of it being supported to form a sliding pair, upper and lower sides of the right part of the smallest square tube are provided with two output ends 3 and 3.1, and the two output ends are reflectional symmetrical with each other; the middle square tube is relatively shorter and is mounted around the smallest square tube, the middle square tube is the active pair of the middle chain, upper and lower sides of the right part of it are provided with two output ends 3 and 3.1, and the two output ends are reflectional symmetrical with each other; the largest square tube is the shortest one and is mounted around the middle square tube, the middle square tube is the active pair of the left side chain, upper and lower sides of the right part of it are provided with two output ends 3 and 3.1, and the two output ends are reflectional symmetrical with each other. The three primary output ends 3 above the axis of the three square tubes are connected with three downstream original chain s 14 (RR chain), and the three downstream original chain s 14 are connected to an original movable platform 15. The three auxiliary output ends 3.1 below the axis of the three square tubes are connected with three auxiliary derivative chains 14.1 (RR chain), and the three auxiliary derivative chains 14.1 are connected to a derivative movable platform 15.1. The derivative movable platform 15.1 is reflectional symmetrical with the original movable platform 15. Other aspects can be understood with reference to Embodiment 1 and will not be described repetitively.

Embodiment 3

Figure 60:
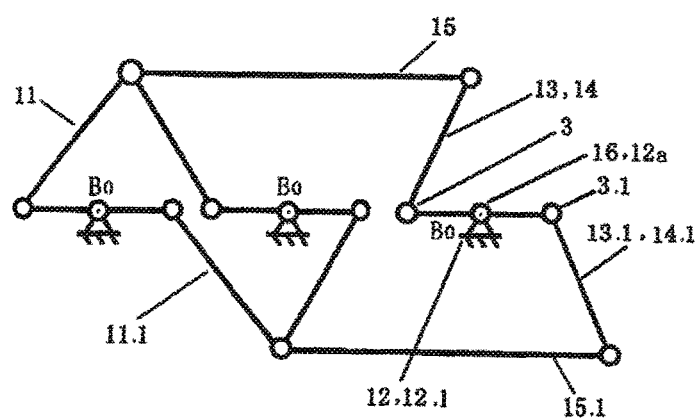

Embodiment 3 (FIG. 60) shows a second type of reflectional symmetrical type plane multiple-movable-platform parallel robot in which each original chain 13 is an RRR chain. Embodiment 3 may be regarded as a variant of Embodiment 1. Compared with Embodiment 1, the main difference between them is that they have different double-output kinematic pairs. In Embodiment 1, reflectional symmetrical double-output kinematic pairs are in the form of compasses as shown in FIG. 1, while in Embodiment 3, reflectional symmetrical double-output kinematic pairs are in the form of a straight rod as shown in FIG. 5. Structural change resulted from their different double-output kinematic pairs is that the lower derivative parallel mechanism is shifted to the right side by a distance. Other aspects can be understood with reference to Embodiment 1 and will not be described repetitively.

Embodiment 4

Figure 61:
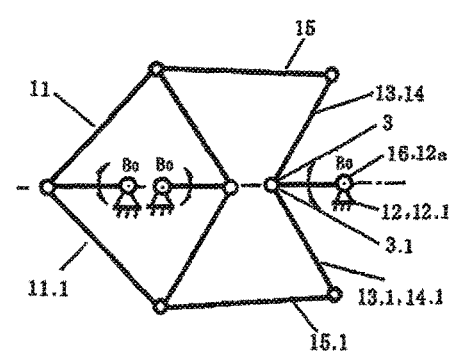

Embodiment 4 (FIG. 61) shows a third type of reflectional symmetrical type plane-symmetrical multiple-movable-platform symmetrical parallel robot in which each original chain 13 is an RRR chain. This embodiment may also be regarded as a variant of Embodiment 1. Compared with Embodiment 1, the main difference between them is that they have different double-output kinematic pairs. In Embodiment 1, Kinematic Pair No. 1 is used, while in Embodiment 4, equivalent symmetrical Kinematic Pair No. 48 (FIG. 48) is used, and the movable platform is a two-point line segment type movable platform. The present embodiment has symmetry characteristics during movement different from that of Embodiment 1. Other aspects can be understood with reference to Embodiment 1 and will not be described repetitively.

Embodiment 5

Figure 62:
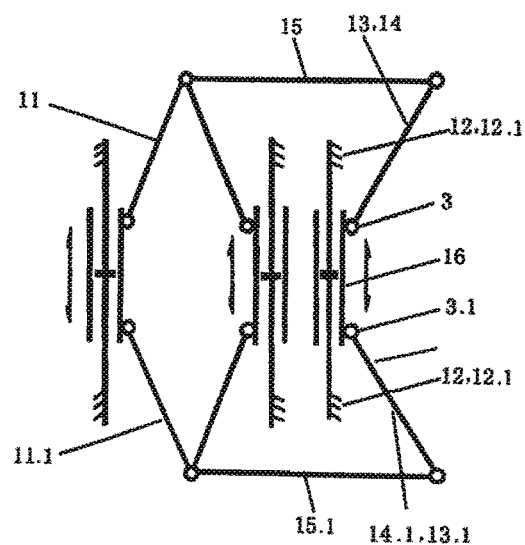

Embodiment 5 (FIG. 62) shows a reflectional symmetrical type plane-symmetrical multi-platform symmetrical parallel robot in which each chain is a PRR chain. This embodiment may be regarded as a variant of Embodiment 2. Compared with Embodiment 2, the main difference between them is that the double-output kinematic pair has a different mounting manner and the active pair axis is arranged in a different way. In Embodiment 2, the sliding pairs have a coincident axis and the output end moves in a left-right direction, while in Embodiment 5, the axes of the sliding pairs are parallel with each other, and the output end moves in an up-down direction. Two neighboring chains at the left side form an inverted V-shaped chain group and is connected with the movable platform via a composite hinge. The three-point line segment type movable platform is substituted here by a two-point line segment type movable platform, but the two types of platforms have no difference in function and thus we do not distinguish them. The present embodiment has symmetry characteristics during movement different from that of Embodiment 1. Other structures can be understood with reference to Embodiment 2 and will not be described repetitively.

Embodiment 6

Embodiment 6 (FIG. 63) shows a reflectional symmetrical type plane multiple-movable-platform parallel robot in which the original parallel mechanism is 1-(RP) RR&1-PRR&1-RRR (2T1R). In this embodiment, the original chains are different from each other. The robot comprises a original parallel mechanism and a derivative parallel mechanism. The original parallel mechanism comprises a original base platform 12, an original chain 13 and an original movable platform 15. The derivative parallel mechanism comprises a derivative base platform 12.1, a derivative chain 13.1 and a derivative movable platform 15.1. The original parallel mechanism 11 of it is above the dotted line illustrated in this figure. The original base platform 12 is a linear type base platform, and the original base platform plane is within the original the plane of the parallel mechanism. (RH) of the original chain (RH) RR at left side is complex kinematic pair composed of a rotatable pair and a helical pair, (RH) is an active pair 12a, and the rotatable pair in (RH) is the active pair input end having an axis within the original base platform plane. The complex kinematic pair (RH) is a double-output kinematic pair comprising a primary output end 3 and an auxiliary output end 3.1. The primary output end is reflectional symmetrical auxiliary output end. The primary output end 3.1 of it is connected to a downstream original chain 14. The downstream original chain 14 is an RR chain. The auxiliary output end 3.1 is connected to a downstream derivative chain (auxiliary derivative chain) 14.1. The downstream derivative chain 14.1 is an RR chain. The upstream portion of the original chain is an RH complex kinematic pair, and the upstream portion of the derivative chain is also a complex kinematic pair, RH pair.

Figure 63:
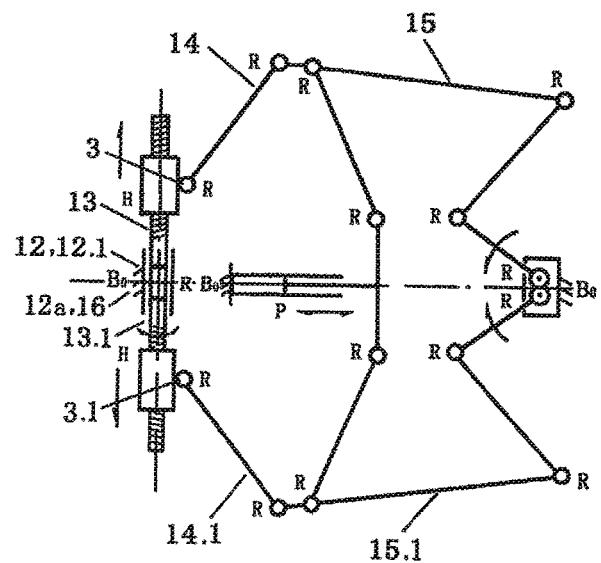

The original chain PRR in the middle of FIG. 63 is the same with the original chain of Embodiment 2, and can be understood with reference to Embodiment 2. The original chain RRR at the right side of FIG. 63 is the same with the original chain of Embodiment 1 and can be understood with reference to Embodiment 1.

Embodiment 7

Figure 64:
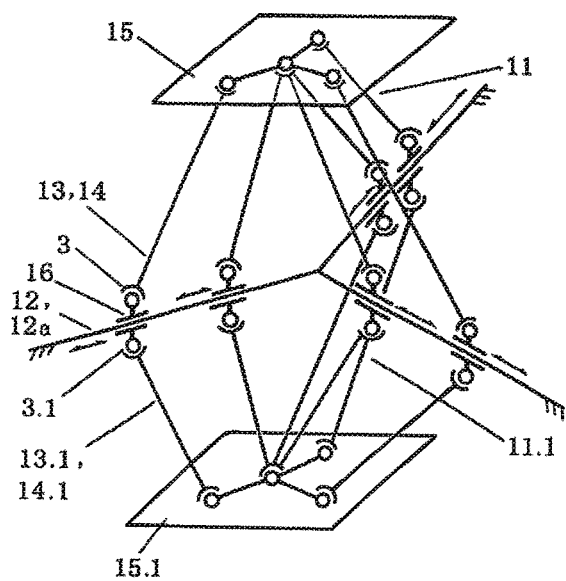

Embodiment 7 (FIG. 64) shows a reflectional symmetrical type spatial multiple-movable-platform parallel robot in which the original parallel mechanism is 6-RSS (3T3R). The robot comprises an original parallel mechanism 11 and a derivative parallel mechanism 11.1. The original parallel mechanism 11 is at the upper part of FIG. 64, and the derivative parallel mechanism 11.1 is at the lower part of FIG. 64.

The original parallel mechanism comprises a original base platform 12, original chain s 13 and an original movable platform 15. The original base platform 12 is a planar hexagonal base platform, and six original chain s 13 are RSS chains connected to the original movable platform 15. The original movable platform 15 is a planar hexagonal moving platform. The rotatable pair in each original chain 13 is an active pair 12a. The axis of each active pair 12a is perpendicular to the plane of the original base platform 12, and the active pair 12a are uniformly distributed at the six apexes of the regular hexagon of the original base platform 12. The rotatable pair R is a double-output kinematic pair 16, and is also a boundary kinematic pair and expandable kinematic pair; the double-output kinematic pair 16 is a double-output kinematic pair which is symmetrical in the movement in the same direction (with reference to Kinematic Pair No. 4, FIG. 4). The primary output end 3 is connected to a downstream original chain (SS chains) 14, and the downstream original chain is connected to the original movable platform 15.

The derivative parallel mechanism comprises a derivative base platform 12.1, derivative chains 13.1 and a derivative movable platform 15.1.

The derivative base platform 12.1 is reflectional symmetrical with the original base platform 12. The double-output kinematic pair 16 has an auxiliary output end 3.1 connected with an auxiliary derivative chain 14.1. The auxiliary derivative chain is also an SS chain. Two output ends of the double-output kinematic pair 16 are reflectional symmetrical with each other with respect to the base platform plan. The derivative movable platform 15.1 is a hexagonal movable platform is congruent to the original movable platform 15. The derivative movable platform 15.1 is reflectional symmetrical with the original movable platform 14. Below the base platform plane is a reflectional symmetrical derivative parallel mechanism 11.1. Six derivative chains 13.1 are connected to a derivative movable platform 15.1. The derivative movable platform 15.1 and the original movable platform 15 are reflectional symmetrical.

Embodiment 8

Figure 65:
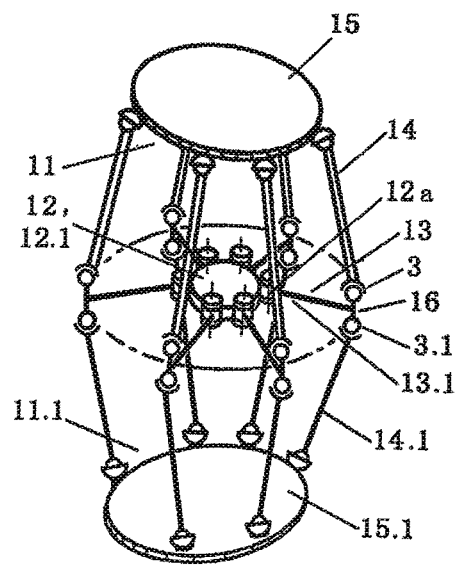

Embodiment 8 (FIG. 65) shows a reflectional symmetrical type spatial multiple-movable-platform parallel robot in which the original chains are of PSS type. The original parallel mechanism 11 of it is a 6-PSS (3T3R) 6-DOF parallel spatial mechanism.

The original base platform 12 is a planar base platform, and six original chain s 13 (PSS chains) are connected to an original movable platform 15. The original parallel mechanism is located above the original base platform plane, the sliding pairs P are the active pairs, the axes of the active pairs 12a are in the plane of the original base platform 12, and the axes are arranged in Y-shape (star-like). On each of the three derivative of the Y-shape, each derivative has two sliding pairs, one at the inner side and the other at the outer side. Each sliding pair has two output ends, the upper one being a primary output end 3, and the lower one being an auxiliary output end 3.1. The two output ends are reflectional symmetrical with each other. Above the base platform plane, there are six primary output ends 3, with three primary output ends on the outer side being connected with three downstream original chain s 14. The three downstream original chain s 14 are connected to the apexes of the triangle of the original movable platform 15. Three primary output ends on the inner side are connected with three downstream original chain s, and then the three downstream original chain s is connected with the original movable platform 15 via a composite spherical pair. The composite spherical pair is located at the center of the triangle of the original movable platform 15.

Below the plane of the original base platform 12, there are six auxiliary output ends 3.1, with three auxiliary output ends 3.1 on the outer side being connected with three auxiliary derivative chains 14.1. The three auxiliary derivative chains 14.1 are connected to the apexes of the triangle of the derivative movable platform 15. Three auxiliary output ends on the inner side are connected with three auxiliary derivative chains 14.1, and then the three auxiliary derivative chains 14.1 are connected with the derivative movable platform 15.1 via a composite spherical pair. The composite spherical pair is located at the center of the triangle of the derivative movable platform 15.1.

Six derivative chains 13.1 are connected to a derivative movable platform. The derivative movable platform is reflectional symmetrical with the original movable platform. below the base platform plane, there is a reflectional symmetrical derivative parallel mechanism. The derivative movable platform and the original movable platform are reflectional symmetrical. The two parallel mechanisms are reflectional symmetrical with each other.

(II) Translationally Symmetrical Type Multi-Platform Symmetrical Parallel Robot Embodiments (Embodiments 9-19)

Embodiment 9

Figure 66:
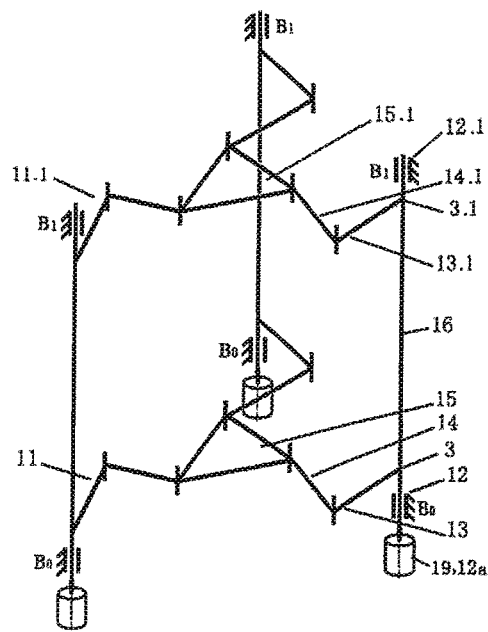

Embodiment 9 (FIG. 66) has an original parallel mechanism that is a 3-RRR (2T1R) planar parallel mechanism. This embodiment comprises an original parallel mechanism 11 and a derivative parallel mechanism 11.1. The original parallel mechanism is at the lower part of FIG. 66. The derivative parallel mechanism is at the upper part of FIG. 66. All the axes of the rotatable pairs are perpendicular to the base platform plane.

The original parallel mechanism comprises a original base platform 12, original chain s 13 and a original movable platform 15. The original base platform 12 is a triangular base platform (triangle B0B0B0) in the planar parallel mechanism plane, each original chain 13 is an RRR chain, the first rotatable pair is an active pair 12a, and the first rotatable pair comprises an expandable kinematic pair 16a which becomes a double-output kinematic pair 16 when an output end is expanded from it. The primary output end 3 is connected to a downstream original chain 14, and the axes of three active pairs are perpendicular to the plane of the base platform 12. Each active pair is driven by a servo motor 19. The original movable platform 12 is a triangular movable platform. The original base platform triangle is larger, while the triangle of the original movable platform 15 is smaller.

The derivative parallel mechanism 11.1 comprises a derivative base platform 12.1, derivative chains 13.1 and a derivative movable platform 15.1. The axis of each rotatable pair is perpendicular to the plane of the base platform 12. The derivative base platform 12.1 is a triangular base platform (triangle B1B1B1), and is translationally symmetrical with the original base platform 12; each original chain 13 is an RRR chain, the first rotatable pair is a multiple-output kinematic pair 16, the primary output end 3 is translationally symmetrical auxiliary output end 3.1. The primary output end 3.1 is connected to a downstream derivative chain 14.1. The downstream derivative chain 14.1 is the same with the downstream original chain 14, that is, being an RR chain. The derivative movable platform 15.1 is a triangular movable platform, and the derivative movable platform 15.1 is translationally symmetrical with the original movable platform 15. The direction of translation coincides with the axis of the rotatable pair. The direction of translation is perpendicular to the base platform plane (upwards).

Embodiment 10

Figure 67:
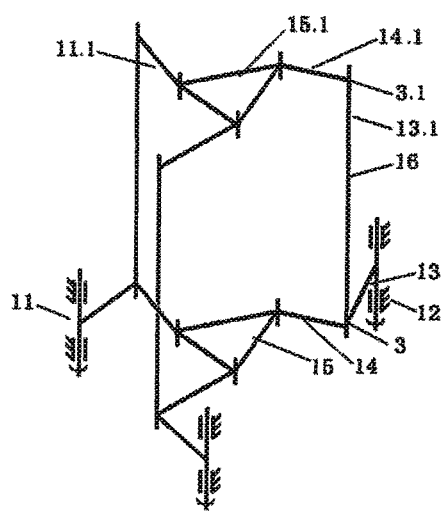

Embodiment 10 (FIG. 67) is a variant of Embodiment 9. In Embodiment 9, the multiple-output kinematic pair is the first generalized kinematic pair, the downstream original chain and the auxiliary derivative chain are each an RR chain, and this auxiliary derivative chain is a large derivative chain. In Embodiment 22, the multiple-output kinematic pair 16 is the second generalized kinematic pair, the downstream original chain 14 and the auxiliary derivative chain are each an R chain, and this auxiliary derivative chain is a middle-sized derivative chain. The original parallel mechanism 11 is at the lower part of FIG. 67. The derivative parallel mechanism 11.1 is at the upper part of FIG. 67.

Embodiment 11

Embodiment 11 (FIG. 68) is another variant of Embodiment 9. In Embodiment 9, the multiple-output kinematic pair is the first generalized kinematic pair. The multiple-output kinematic pair 16 of Embodiment 11 is the third generalized kinematic pair, the downstream original chain 14 and the auxiliary derivative chain 14.1 are each a rod element, the rod elements are connected with the movable platform. This auxiliary derivative chain 14.1 is a small derivative chain, and is a rod element (as shown in this Figure, is directly connected with the movable platform).

Figure 68:
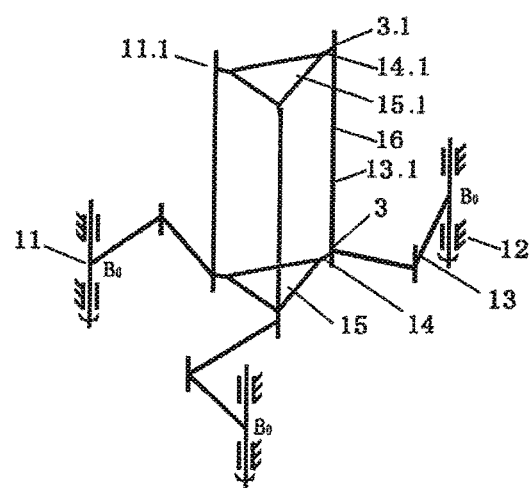

The original parallel mechanism is at the lower part of FIG. 68. The derivative parallel mechanism is at the upper part of FIG. 68.

All of Embodiments 9, 10 and 11 have a translationally symmetrical multi-platform planar parallel mechanism. The three embodiments are different with each other in that their multiple-output pairs have different locations and the expanding points of the derivative chains are different with each other. From Embodiments 9, 10 and 11, another type of multiple-movable-platform parallel robot can be derived. An auxiliary derivative chain (large derivative chain) is expanded from the first kinematic pair on one original chain, an auxiliary derivative chain (middle sized derivative chain) is expanded from the second kinematic pair on another original chain, and an auxiliary derivative chain (small derivative chain) is expanded from the third kinematic pair on the last original chain. The three derivative chains are connected to a derivative movable platform to form a derivative parallel mechanism. In this symmetrical multi-platform planar parallel robot, different structural characteristics of Embodiments 9, 10 and 11 are incorporated.

Embodiment 12

Figure 69:
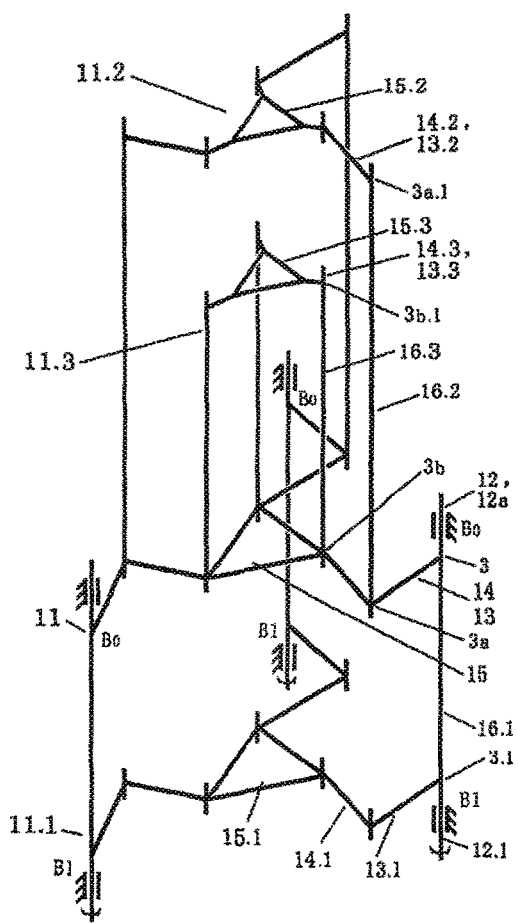

Embodiment 12 (FIG. 69) is an example in which the original parallel mechanism has three derivative parallel mechanisms. Three kinematic pairs on the original chain are each an expandable kinematic pair, each being a multiple-output kinematic pair having an expanded chain. This is resulted from the integration of Embodiments 9, 10 and 11. The three derivative parallel mechanisms are translationally symmetrical with the original parallel mechanisms.

The original parallel mechanism is the second planar parallel mechanism 11. The lowermost one is a derivative parallel mechanism 11.1, having a multiple-output kinematic pair 16.1 expanded from the first kinematic pair of the original chain. The original chain 13 and the derivative chain 13.1 have the same structure and are translationally symmetrical. The downstream original chain 14 and the auxiliary derivative chain 14.1 have the same structure and are translationally symmetrical.

The uppermost on is a derivative parallel mechanism 11.2 which has a multiple-output kinematic pair 16.2 expanded from the second kinematic pair of the original chain. The downstream original chain 14 is an R chain, the auxiliary derivative chain 14.2 is also an R chains, and the two are translationally symmetrical with each other. The two share the same upstream original chain.

The third one is a derivative parallel mechanism 11.3 which has a multiple-output kinematic pair 16.3 expanded from the third kinematic pair of the original chain. The downstream original chain is a rod element fixedly connected with the derivative movable platform directly. The auxiliary derivative chain 14.2 is a rod element which is translationally symmetrical with the downstream original chain. The two share the same upstream original chain.

The two upper planar parallel mechanisms illustrated in the figure of the present embodiment share the same original base platform with the original parallel mechanism.

For the two lower planar parallel mechanisms illustrated in the figure of the present embodiment, only by switching the reference numerals of them, the two upper derivative parallel mechanisms can be regarded as generated from the first derivative parallel mechanism. That is to say, the first derivative parallel mechanism 11.2 in the present embodiment can be used as a generating element for generating a new derivative parallel mechanism. This is resulted from the symmetrical transfer characteristics.

In the direction of translation, more derivative parallel mechanisms can be generated.

Embodiment 13

Embodiment 13 (FIG. 70) shows a first type of translationally symmetrical type plane-symmetrical double-moving-platform parallel robot in which the original parallel mechanism is 3-PRR (2T1R). The robot comprises a original parallel mechanism 11 and a derivative parallel mechanism 11.1. The original parallel mechanism comprises a original base platform 12, an original chain 13 and an original movable platform 16. The derivative parallel mechanism comprises a derivative base platform 12.1, a derivative chain 13.1 and a derivative movable platform 15.1.

Figure 21:
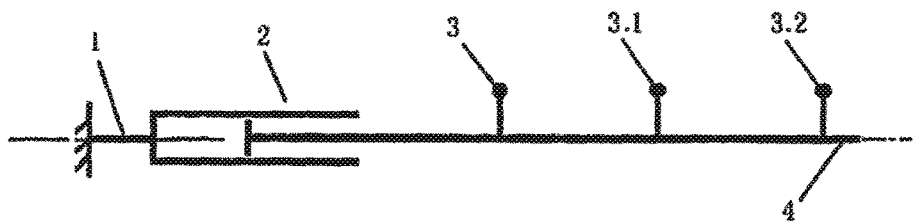
Figure 22:
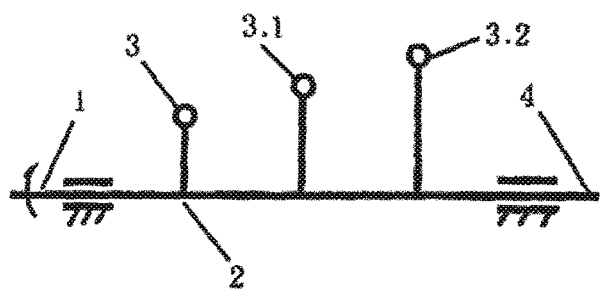
Figure 23:
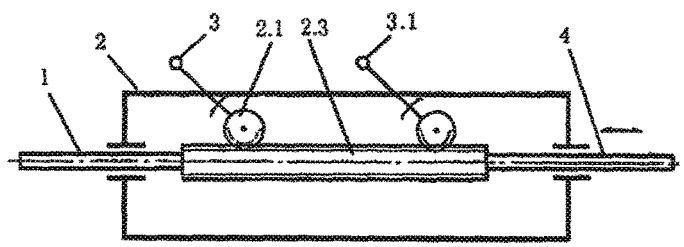
Figure 38:
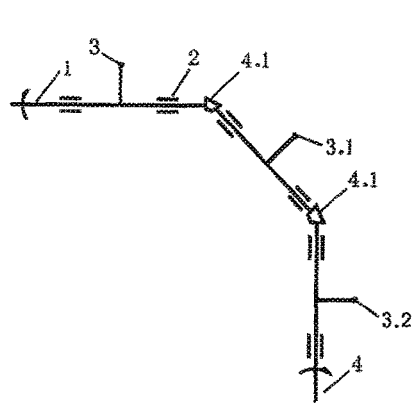
Figure 39:
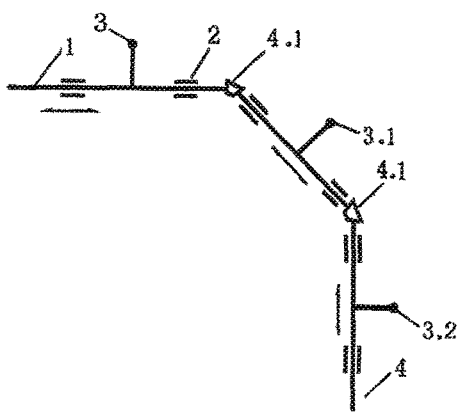
Figure 70:
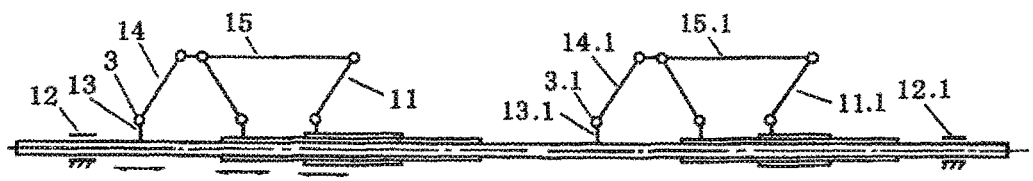

The original parallel mechanism is located at the left side in FIG. 70. The original parallel mechanism has a structure described below: the original base platform 12 is a linear type base platform, and the original base platform plane is within the plane of the parallel mechanism. The original chain 13 is a PRR chain, and the original movable platform 15 is a line segment type movable platform. The first generalized kinematic pair of chain PRR is a sliding pair P, this sliding pair being an active pair, and the active pair having a coincident axis. The first generalized kinematic pair comprises a double-output kinematic pair 16 (with reference to FIG. 21), the double-output kinematic pair 16 having a primary output end 3 connected to the downstream original chain 14. The downstream original chain 14 is an RR chain. The downstream original chain is connected to the original movable platform 15. The original movable platform is a line segment type movable platform, and the left side in FIG. 70 shows the original parallel mechanism. The right side in FIG. 70 shows a translationally symmetrical derivative parallel mechanism.

Figure 59:
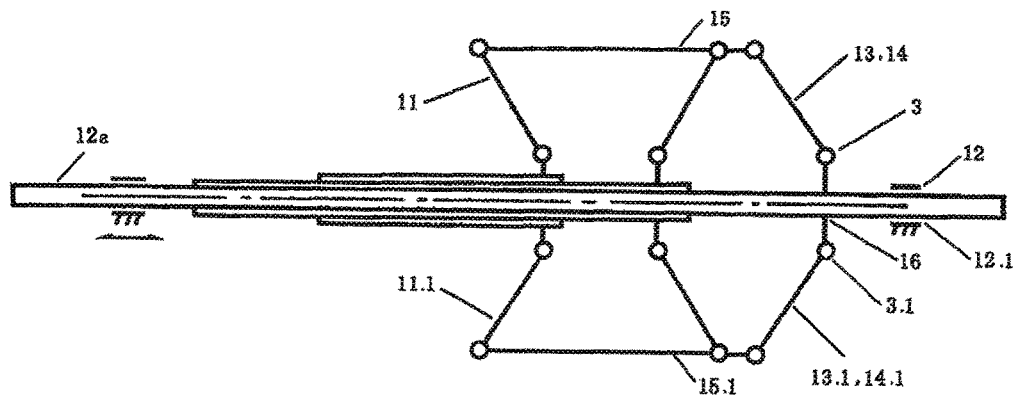

The active pair of Embodiment 13 is the same as the active pair of Embodiment 2, which is composed of three square tubes disposed one around another in movable fit, and the concrete structure of it can be understood with reference to Embodiment 2 (FIG. 59). The translationally symmetrical transformation of the active pair is achieved in the following way: there are three square tubes; the smallest square tube on the original parallel mechanism is directly connected with the square tube on the derivative parallel mechanism at a middle portion to form an integral body, and is supported at opposite ends, to be moveable synchronously; the middle square tube on the original parallel mechanism is connected with the middle square tube on the derivative parallel mechanism via two sides (not illustrated in this figure) where no output end is mounted, and thus the middle square tubes form an integral body to be moveable synchronously; the largest square tube on the original parallel mechanism is connected with the largest square tube on the derivative parallel mechanism via two sides (not illustrated in this figure) where no output end is mounted, and thus the largest square tubes form an integral body to be moveable synchronously.

The derivative parallel mechanism has a structure described below: the derivative base platform 12.1 is translationally symmetrical with the original base platform 12. The derivative chain 13.1 is a PRR chain, the auxiliary derivative chain 14.1 is an RR chain. The auxiliary derivative chain 14.1 is the same with the downstream original chain. The double-output kinematic pair 16 has an auxiliary output end 3.1 connected with the auxiliary derivative chain 14.1. The auxiliary output end 3.1 is reflectional symmetrical with the primary output end 3. The derivative movable platform 15.1 is a line segment type movable platform. The derivative movable platform is translationally symmetrical with the original movable platform.

Embodiment 14

Figure 71:
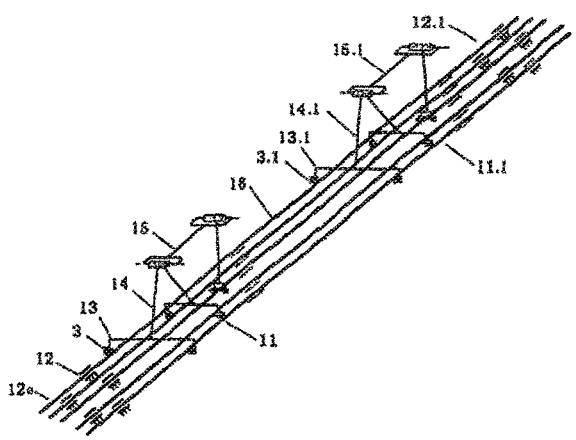

Embodiment 14 (FIG. 71) shows another type of planar parallel mechanism in which the original parallel mechanism (generating element) is 3-PRR (2T1R). Embodiment 14 is originally the same with Embodiment 13. The difference between them lies in the way of forming active pairs having a coincident axis. The parallel mechanism at the lower left side in FIG. 71 is the original parallel mechanism, and the parallel mechanism at the upper right side is the derivative parallel mechanism. Three active pairs have the following structures: three sliding pairs shown in the middle-to-lower portion in the figure are formed by five cylindrical pairs. The middle cylinder pair acts as a sliding pair, and the other two sliding pairs are each formed by two parallel cylinder pairs, having an axis defined by the symmetrical axis of the two cylinder pairs; the outermost two cylinder pairs each have a rotatable pair perpendicular to the axis of the cylinder pair at one end of the original parallel mechanism, with the two rotatable pairs being collinear, and the two co-axial rotatable pairs are connected with a rod element to form a sliding pair. Another two cylinders each have a rotatable pair perpendicular to the axis of the cylinder pair at one end of the original parallel mechanism with the two rotatable pairs being collinear, and the two co-axial rotatable pairs are connected with a rod element to form a sliding pair. Other aspects can be understood with reference to Embodiment 2.

Embodiment 15

Figure 72:
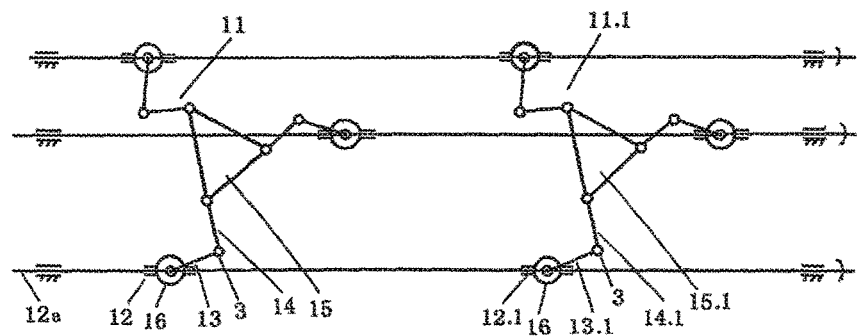

Embodiment 15 (FIG. 72) shows a multiple-movable-platform symmetrical planar parallel mechanism in which the original parallel mechanism is 3-(RGR) RR (2T1R) parallel mechanism. The left side in FIG. 72 shows the original parallel mechanism. This is a variant of Embodiment 9. The original parallel mechanism of Embodiment 9 is a 3-RRR (2T1R) parallel mechanism, having an active pair axis perpendicular to the original base platform plane. Embodiment 15 is distinguished in that: the first kinematic pair of the original chain is changed to a complex direction-varying kinematic pair (RGR) (with reference to Kinematic Pair No. 25) from the simple kinematic pair (rotatable pair) in the former embodiment; the expression "(RGR)" means that the mechanism within the parentheses is a kinematic pair which is an integral pair. The axes of the original chain input end are changed to be coincident with the base platform plane and are parallel with each other from to be perpendicular to the base platform plane in the former embodiment. Thus, translational transformation can be achieved on the original base platform plane to form a translationally symmetrical derivative parallel mechanism.

The original base platform 12 is a triangular base platform, the original chain 13 is (RGR) RR, and the original movable platform 15 is a smaller triangular movable platform. The first generalized kinematic pair is an orthogonal-direction-varying multiple-output complex kinematic pair (RGR) (with reference to FIG. 25), with an input end axes being perpendicular to an output end axis. The input end is an active pair 12a. The input end axes of the three active pairs are all in the plane of the original base platform 12, and are parallel with each other. The output ends of the orthogonal direction-varying complex kinematic pair (RGR) are parallel with each other and are perpendicular to the base platform plane; the primary output end 3 is connected to a downstream original chain 14, and the downstream original chain 14 is connected to the original movable platform 15. The derivative parallel mechanism 11.1 is formed by means of translational transformation of the original parallel mechanism 11 in the axis of the rotatable pair, with details that can be seen FIG. 72 and will not be described repetitively. Embodiment 15 can be incorporated with Embodiments 9, 10 and 11 to achieve translational transformation in two directions. In this way, more translationally symmetrical derivative parallel mechanisms in different directions can be formed.

Embodiment 16

Embodiment 16 (FIG. 73) shows a multiple-movable-platform parallel robot in which the original parallel mechanism is 3-(RGR) (4S) (3T0R) spatial parallel mechanism and which has two derivative parallel mechanisms. This original parallel mechanism 11 is actually an improved Delta mechanism. In the original Delta mechanism, the first kinematic pair axis coincides with one side of the triangle, and can act as a reflectional symmetrical original parallel mechanism based on which a reflectional symmetrical double-platform parallel robot can be obtained by means of structural synchronization, but no translationally symmetrical transformation can be made to it. Now we change the first kinematic pair (rotatable pair) of the original Delta mechanism to a complex direction-varying kinematic pair (RGR), the complex direction-varying kinematic pair (RGR) having input end axes that are parallel with each other and output end axes that coincide with that of the input ends of the original Delta mechanism, and the structure of the original Delta mechanism remain unchanged. Now the Delta mechanism, after being changed, may act as a translationally symmetrical transformed original parallel mechanism in the present embodiment.

Figure 73:
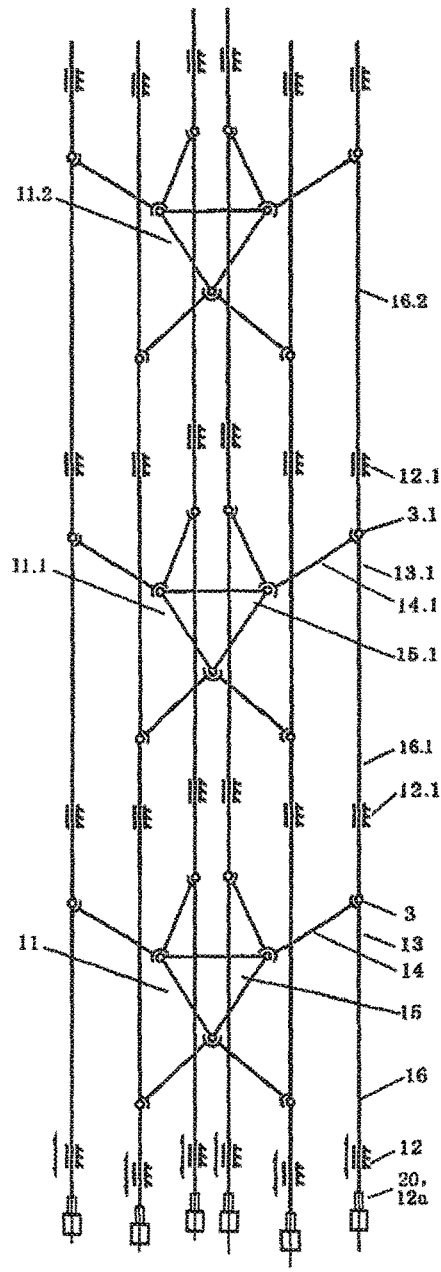

The lower part in FIG. 73 shows the original parallel mechanism (3-(RGR) (4S)) 11. The first generalized kinematic pair is a multiple-output complex direction-varying kinematic pair (RGR) 16, which can be understood with reference to Kinematic Pair No. 24 in FIG. 24. The complex direction-varying kinematic pair (RGR) 16 is an active pair. The input end axes 12a of the active pairs are parallel to the plane of the base platform 12 and are parallel with each other. By expanding an input end axes of the complex direction-varying kinematic pair (RGR), and performing translationally symmetrical transformation in the direction of this axis, an auxiliary output end 3.1 is formed. The translationally symmetrical transformation is performed to each complex direction-varying kinematic pair (RGR) to form three auxiliary output ends 3.1, the three auxiliary output ends are connected to a Delta mechanism, this Delta mechanism and the complex direction-varying kinematic pair which includes the auxiliary output end 3.1 form a derivative parallel mechanism 11.1 (the middle parallel mechanism in FIG. 73), and the derivative parallel mechanism 11.1 is translationally symmetrical with the original parallel mechanism 11. using the same generation method performed to the first derivative parallel mechanism 11.1, a second derivative parallel mechanism 11.2 is obtained by the same translational transformation.

FIG. 73 shows three parallel mechanisms, one original parallel mechanism and two derivative parallel mechanisms. The three parallel mechanisms act as generating elements at the same time, so that three new derivative parallel mechanisms are obtained by reflection transformation. In this way, a multiple-movable-platform parallel robot having five derivative parallel mechanisms are obtained.

Embodiment 17

Embodiment 17 (FIG. 74) shows a reflectional symmetrical type spatial multiple-movable-platform parallel robot in which the first type of a original parallel mechanism is 6-PSS (3T3R). The original parallel mechanism of it is a 6-PSS (3T3R) spatial parallel mechanism. It comprises a original parallel mechanism 11 and two derivative parallel mechanisms 11.1. The original parallel mechanism 11 is shown at the lower part in FIG. 74, and the two derivative parallel mechanisms 11.1 are shown at the middle and upper parts in FIG. 74.

The original parallel mechanism 11 comprises a original base platform 12, a original chain 13 and an original movable platform 15. The derivative parallel mechanism comprises a derivative base platform 12.1, a derivative chain 13.1 and a derivative movable platform 15.1.

The original base platform 12 is a planar base platform, the original chain 13 is a PSS chain, and six original chains 13 (PSS chains) are connected to an original movable platform 15. The original movable platform 15 is a triangular movable platform, the P pair is an active pair, and the active pair axes are within the base platform plane and are parallel with each other. The original parallel mechanism 11 is located above the original base platform plane, the axis of the active pair is in the plane of the original base platform 12, the axes of the six active pairs are parallel with each other (not coincide). The sliding pair is an active pair, the active pair is driven by a servo-motorized push rod 20, the active pair is a double-output kinematic pair 16, and the double-output kinematic pair 16 is a double-output kinematic pair which is translationally symmetrical in the movement in the same direction (with reference to FIG. 21). One of the output ends is the primary output end 3 which is connected to a downstream original chain 14, the downstream original chain is an SS chain, and the downstream original chain is connected to the original movable platform 15.

The derivative parallel mechanisms are described by using the middle derivative parallel mechanism 11.1 as an example.

The derivative base platform 12.1 is a planar base platform which is translationally symmetrical with the original base platform. The derivative chain 13.1 is an PSS chain, the derivative chain is the same with the original chain, the derivative chain is connected to the derivative movable platform 13.1, and the derivative movable platform is a triangular movable platform. The active pair axes are within the base platform plane and are parallel with each other. The double-output kinematic pair 16 has an auxiliary output end 3.1 which is translationally symmetrical with the primary output end 3, and the auxiliary output end is connected with the auxiliary derivative chain 13.1. The auxiliary derivative chain is also an SS chains. Six derivative chains 13.1 are connected to a derivative movable platform 15.1. The derivative movable platform 15.1 is a triangular movable platform congruent to the original movable platform 15. The derivative movable platform 15.1 is translationally symmetrical with the original movable platform 15.

Figure 74:
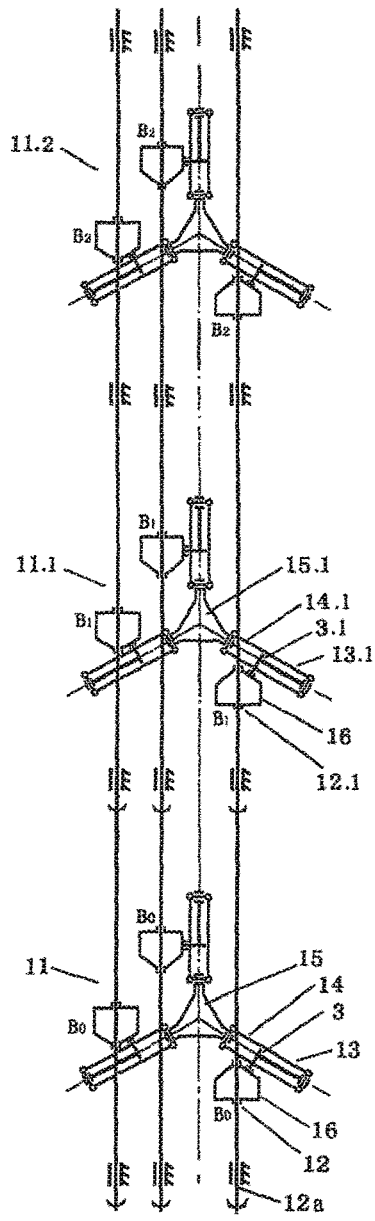

Embodiment 17 has two derivative parallel mechanisms, wherein the upper part in FIG. 74 further shows a translationally symmetrical derivative parallel mechanism 11.2. The generation method and the structure are the same with the middle derivative parallel mechanism of FIG. 74 and will not be described repetitively.

Embodiment 18

Figure 75:
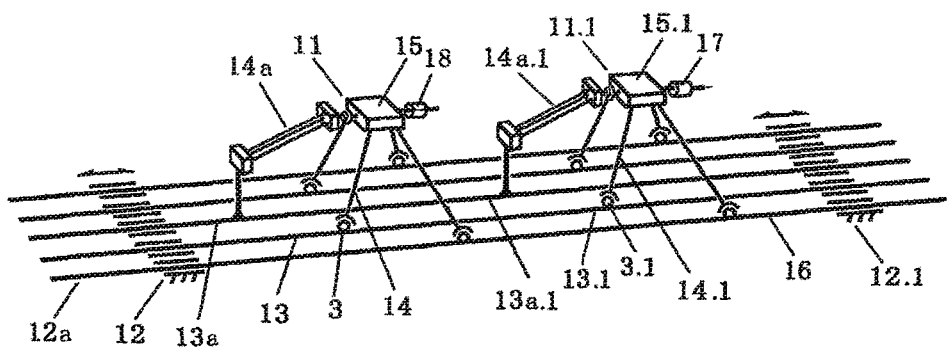

Embodiment 18 (FIG. 75) shows an original parallel mechanism 11 is a 6-RSS (3T3R) spatial parallel mechanism. The original base platform 12 is a planar hexagonal base platform (B0B0B0B0B0B0), the original chain 13 is an RSS chain, the original movable platform 15 is a planar triangular movable platform, the R pair is an active pair 12a, and the active pair axes are within the base platform plane and are parallel with each other. The R pair is a multiple-output kinematic pair having translationally symmetrical output ends. At the left side of FIG. 75, under the horizontal plane of the original base platform, there is a original parallel mechanism 11. At the right side of FIG. 75, under the horizontal plane of the base platform, there is a derivative parallel mechanism 11.1. The derivative base platform is also a planar hexagonal base platform (B1B1B1B1B1B1). Basic reference numerals in this figure are the same with those mentioned above, and the structure of them can be understood with reference to Embodiment 17 and will not be described repetitively.

Embodiment 19

Figure 76:
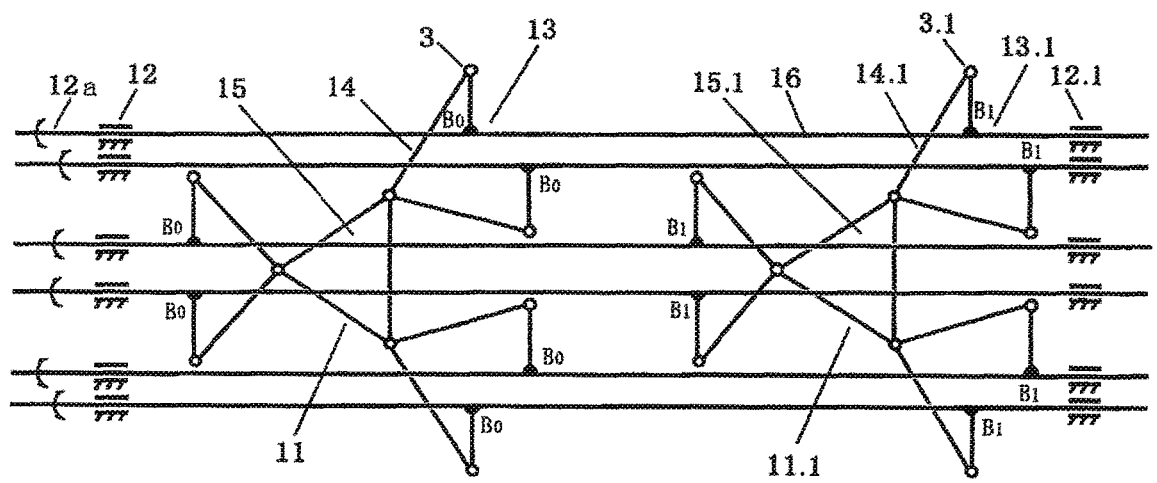

Embodiment 19 (FIG. 76) shows a horizontal parallel machine tool robot in which the original parallel mechanism is a 4-PSS&1-PU*U type 5-DOF (3T2R). There are two types of original chain s, one is PSS chain, the other is PU*U chain. The original base platform 12 is a planar base platform. The original chain s 13 comprise four PSS chains 13 and one PU*U chain 13a. The active pair 12a is a sliding pair. The axes of the active pairs are parallel with each other and are in the same plane. The sliding pair of the PU*U chain is located between other four active pairs. The active pair axis is co-planar with the original base platform plane. The sliding pair is a translational type multiple-output kinematic pair 16, and the original movable platform 15 is a pentagonal movable platform. The lower left side of the figure shows a original parallel mechanism 11. The upper right side of the figure shows a derivative parallel mechanism 11.1. The middle derivative chains on the derivative parallel mechanism are a PU*U derivative chain 13a.1 and an auxiliary derivative chain 14a.1. On the original movable platform, there is mounted with a sensor or probe 18 for sensing and detecting component boundary. On the derivative movable platform, there is mounted with a manipulator 17. The original parallel mechanism is translationally symmetrical with the derivative parallel mechanism. basic reference numerals in this figure are the same with those mentioned above and will not be described repetitively. This is a profiling parallel machine tool robot, which can also act as a safe parallel machine tool robot.

By further conducting translationally symmetrical transformation along the direction of the axis of the active pair, more derivative parallel mechanisms can be obtained to form a translational multiple-movable-platform parallel robot having more derivative parallel mechanisms.

(III) Rotationally Symmetrical Type Multi-Platform Symmetrical Parallel Mechanism Embodiments (Embodiment 20-23)

Embodiment 20

Embodiment 20 (with reference to FIG. 59) is a planar parallel mechanism in which the original parallel mechanism is 3-PRR (2T1R). The original parallel mechanism is completely the same with Embodiment 2. Actually, Embodiment 2 is also a type of rotationally symmetrical type multiple-movable-platform parallel robot, which is formed by rotating the original parallel mechanism around the axis of the sliding pair by 180 degrees. In the present embodiment, a derivative parallel mechanism is added; that is, at the same side of each square tube, a new auxiliary output end is expanded from a symmetrical location that is rotated by 90 degrees from the original output end; three auxiliary output ends are each connected with an auxiliary derivative chain, the three auxiliary derivative chains are connected to a derivative movable platform, and the derivative movable platform is rotationally symmetrical with the original movable platform. In this way, a new derivative parallel mechanism is obtained, the new derivative parallel mechanism being rotationally symmetrical with the original parallel mechanism. The new derivative parallel mechanism, together with the original derivative parallel mechanism, a symmetrical three-moving-platform parallel robot having two derivative parallel mechanisms are formed.

Embodiment 21

Figure 77:
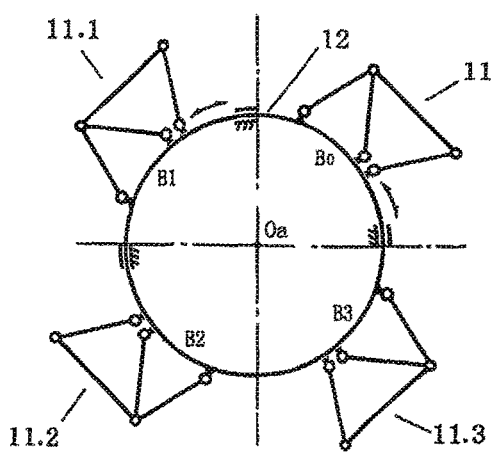

The original parallel mechanism of Embodiment 21 (FIG. 77) is a 3-PRR (2T1R) planar parallel mechanism. The generating element is the same as that of Embodiment 14 (FIG. 71). Embodiment 21 is formed as a variant based on Embodiment 14. Embodiment 21 is formed in the following way: 1, the axis of the sliding pair of Embodiment 14 is expanded, and two derivative parallel mechanisms 11.2 and 11.3 of the same type are added; together with the original derivative parallel mechanism 11.1, a symmetrical four-moving-platform parallel robot is formed. The distance between two neighboring parallel mechanisms is πD/4, and the length of the axis of the sliding pair πD. Drawing a straight line Oa, which is perpendicular to the active pair axis, under the base platform plane, and with this straight line as an axis, bending the base platform plane around this axis to form a cylinder having a radius of D/2, and connecting the five cylindrical pair axes as five circular rings. Four parallel mechanisms are located at the outer side of the cylinder. In this way, a rotationally symmetrical multiple-movable-platform parallel robot is obtained. The four parallel mechanisms each occupy a 90-degree sector space. FIG. 77 is a view of Embodiment 21 in the direction of axis Oa.

Embodiment 22

Figure 78:
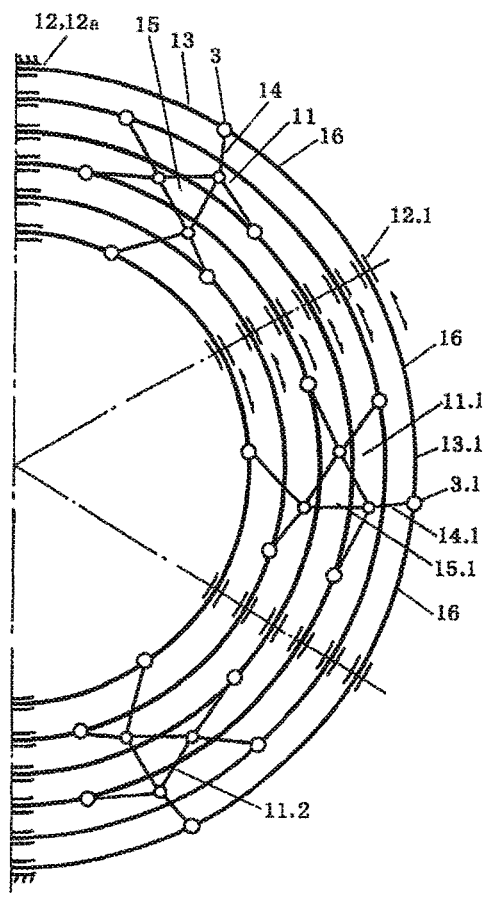

The original parallel mechanism of Embodiment 22 (FIG. 78) is a 6-PSS (3T3R) parallel mechanism. Embodiment 22 is formed as a variant from Embodiment 17. The active pair axis of Embodiment 17 is further expanded, and three derivative parallel mechanisms are added, so that there are totally six parallel mechanisms. The distance between two neighboring parallel mechanisms is πD/6, and the total length of the axis of the sliding pair is πD. At a side of six sliding pairs, drawing a straight line that is perpendicular to the base platform plane, and with this straight line as an axis, turning the axis of the inner side sliding pair into a circle having a radius of D/2, and turning the other five axes of the sliding pairs into five circles. The distance between the six circles remains to be the original distance when the axes are parallel with each other. In this way, a symmetrical six-platform parallel robot having a rotationally symmetrical configuration is obtained. The six parallel mechanisms are located respectively in six sector spaces. The six parallel mechanisms each occupies a 60-degree sector space. FIG. 78 is a top view of Embodiment 22. After variation, the base platform is still a planar platform; on the base platform plane, the active pair axes became concentric circular rings (see the Figure), the six circles are concentric, and the six circular rings are all within the base platform plane. The six circular rings have different radius, each circular ring being supported on its own sliding track. The circular ring is divided into six sectors, and each sector occupies 60 degrees. The upper right sector is the original parallel mechanism, and other sectors are the derivative parallel mechanisms.

Figure 40:
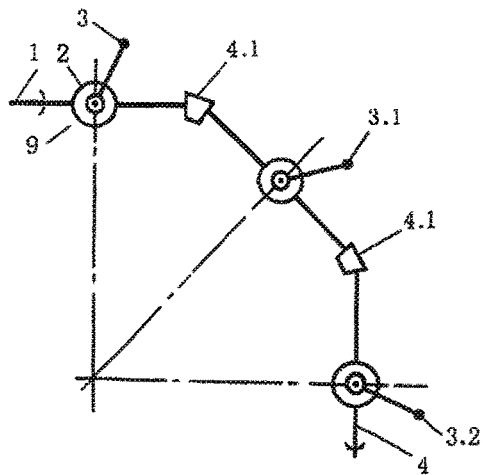
Figure 41:
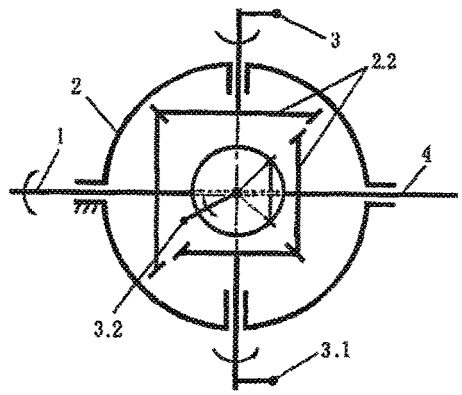
Figure 42:
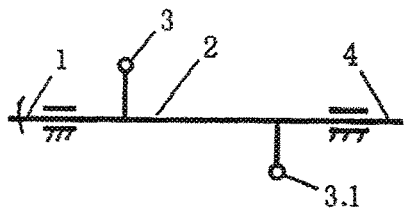
Figure 43:
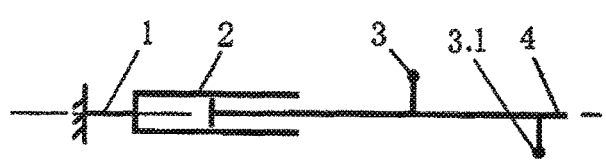
Figure 44:
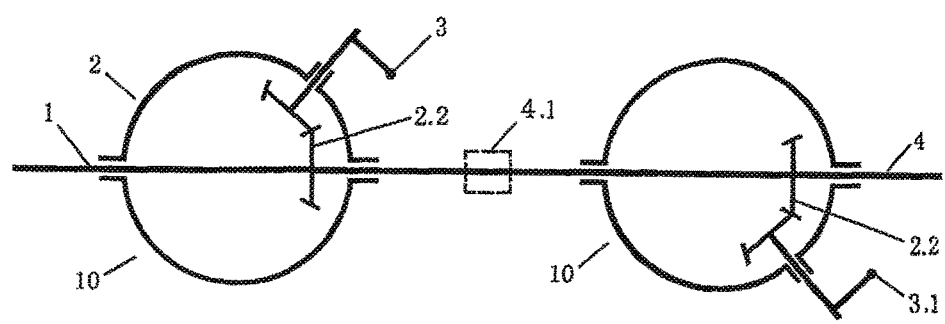
Figure 53:
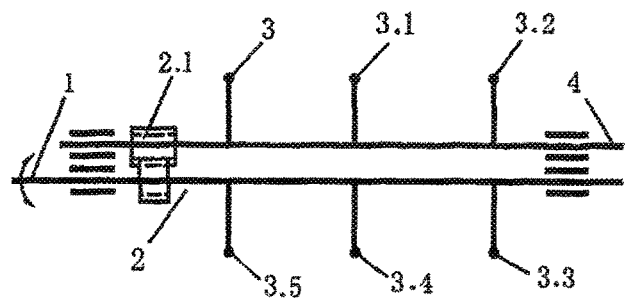
Figure 54:
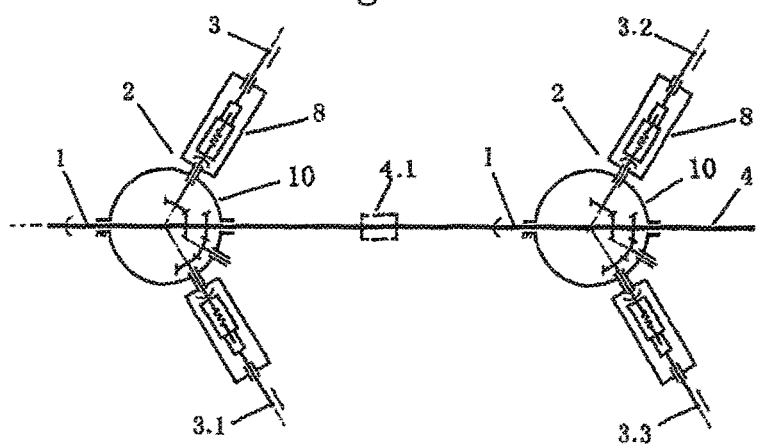
Figure 55:
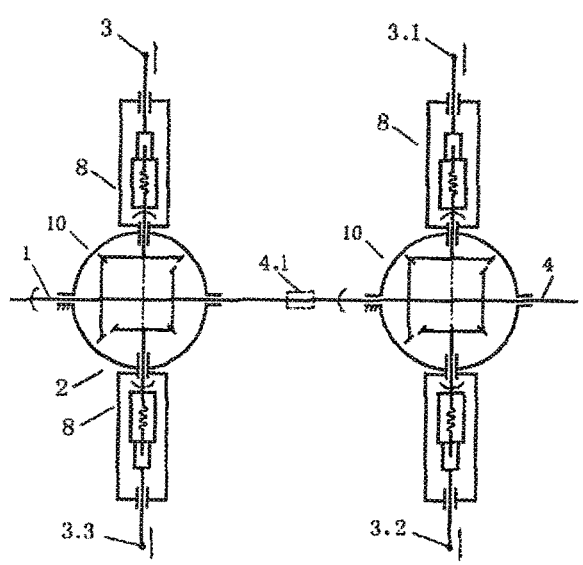
Figure 56:
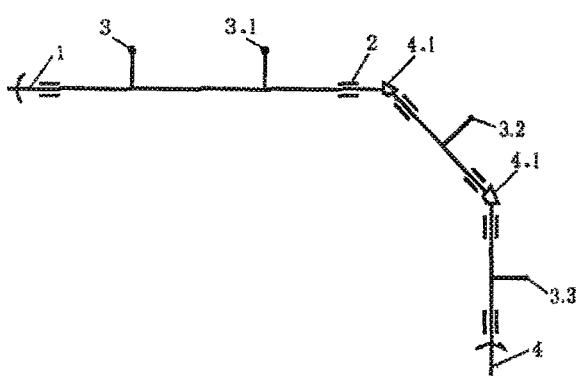
Figure 57:
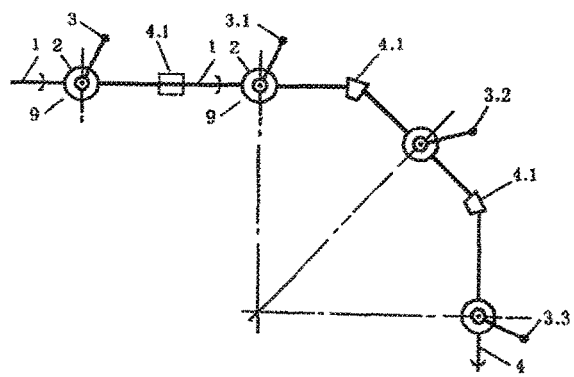

Embodiment 22 can also be formed from Kinematic Pair No. 40 shown in FIG. 40. The six circular rings become six regular hexagons.

The generating element of Embodiment 22 can also become a 6-RSS parallel mechanism. The double-output kinematic pair is substituted by Kinematic Pair No. 36 shown in FIG. 36.

(IV) Sliding Reflectional Symmetrical Type Multi-Platform Symmetrical Parallel Mechanisms Embodiments (Embodiments 23 and 24)

Embodiment 23

Figure 79:
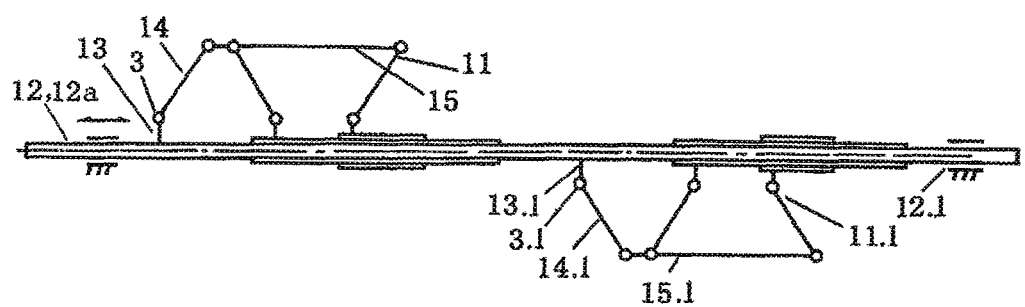

The original parallel mechanism Embodiment 23 (FIG. 79) is a 3-PRR planar parallel mechanism which is the same as the original parallel mechanism of Embodiment 13. Embodiment 23 is formed as a variant from Embodiment 13: the derivative parallel mechanism at the right side in FIG. 70 undergoes a reflection symmetrical transformation, the derivative parallel mechanism at the right side is moved to be under the axis, and the original derivative parallel mechanism at the upper right side is removed. In this way, a gliding reflectional symmetrical type multiple-movable-platform parallel robot is obtained. reference numerals can be understood with reference to Embodiment 13.

Embodiment 24

Figure 80:
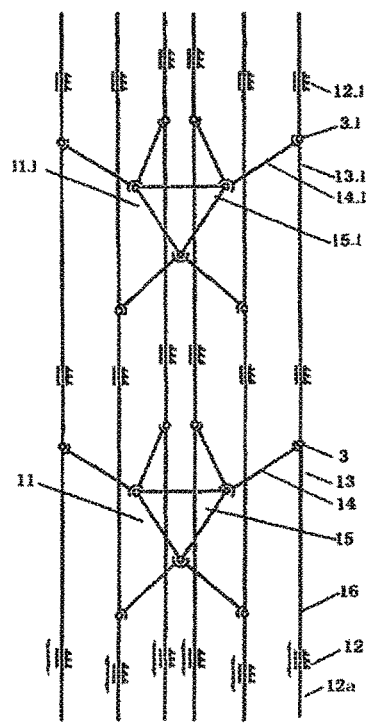

Embodiment 24 (FIG. 80): the original parallel mechanism of Embodiment 24 is a 6-PSSspatial parallel mechanism. Embodiment 24 is formed as a variant from Embodiment 17 (with reference to FIG. 74): the middle derivative parallel mechanism undergoes a reflectional symmetrical transformation, the middle derivative parallel mechanism is moved to be above the original base platform, the original derivative parallel mechanism is removed, and the uppermost derivative parallel mechanism 11.2 in the figure. In this way, a gliding reflectional symmetrical type multiple-movable-platform parallel robot is obtained.

(V) Scaled Multiple-Movable-Platform Parallel Robot Embodiments (Embodiments 25-28)

Embodiment 25

Figure 81:
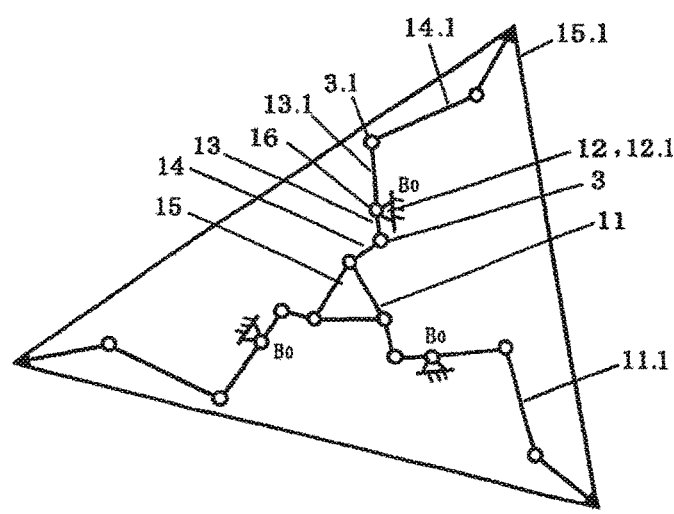

The original parallel mechanism of Embodiment 25 (FIG. 81) is a 3-RRR (2T1R) planar parallel mechanism. The original base platform 12 is a triangular base platform in the plane of the planar parallel mechanism, the original chain 13 is an RRR chain, the first rotatable pair is an active pair 12a, the axes of three active pairs are perpendicular to the original base platform plane, the active pair axis extends through the apex of the original base platform triangle B0B0B0, and the original movable platform 15 is a triangular movable platform. The triangle of the original movable platform is a smaller one, and the original base platform triangle is a larger one.

The first rotatable pair comprises a double-output kinematic pair 16, which is a reflectional symmetrical type double-output kinematic pair (with reference to Kinematic Pair No. 5, FIG. 5). Two output ends are on a straight line and are reflectional symmetrical with each other. The inner one is a primary output end 3, and the outer one is an auxiliary output end 3.1. The two output ends have different sizes (although they may alternatively have the same size). The inner smaller triangular movable platform is an original movable platform 12, the outer larger triangular movable platform is a derivative movable platform 15.1, and the derivative movable platform has the largest triangle. The original base platform 12 is equivalent symmetrical with the derivative base platform 12.1.

In order to avoid structural interference, the original base platform, the original movable platform and the derivative movable platform are disposed on three planes which are parallel with each other, with the original base platform being located at a middle location and the original movable platform and the derivative movable platform being located at opposite sides. The original movable platform is scaled symmetrical with the derivative movable platform.

Embodiment 26

Figure 82:
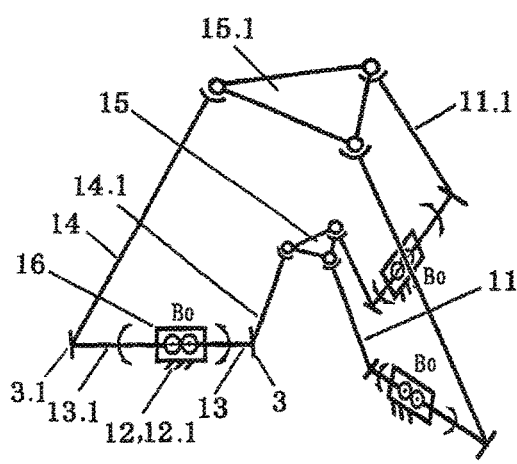

The original parallel mechanism of Embodiment 26 (FIG. 82) is a 3-RRS (1T2R) spatial parallel mechanism. The original base platform 12 is a triangular base platform, the original chain 13 is an RRS chain, the first rotatable pair is an active pair, the axes of three active pairs are in the plane of the original base platform B0B0B0, the axes of three active pairs are respectively parallel with the sides of the base platform triangle, the angle between the axes of three active pairs are 120 degrees, and the original movable platform 12 is a triangular movable platform.

The multiple-output kinematic pair 16 is a reflectional symmetrical type sliding pair (with reference to Kinematic Pair No. 2, FIG. 2), with two output ends that are reflectional symmetrical with each other. The primary output end 3 is at the inner side of the base platform triangle, and the auxiliary output end 3.1 is at the outer side of the original base platform triangle. The original base platform 12 is equivalent symmetrical with the derivative base platform 12.1. The smaller triangular movable platform above the original base platform plane is an original movable platform 15, and the larger triangular movable platform above the original base platform plane is a derivative movable platform 15.1. The auxiliary derivative chain is scaled symmetrical with the downstream original chain; the derivative movable platform is scaled translationally symmetrical with the original movable platform. The derivative parallel mechanism is scaled translationally symmetrical with the original parallel mechanism.

Embodiment 27

Figure 83:
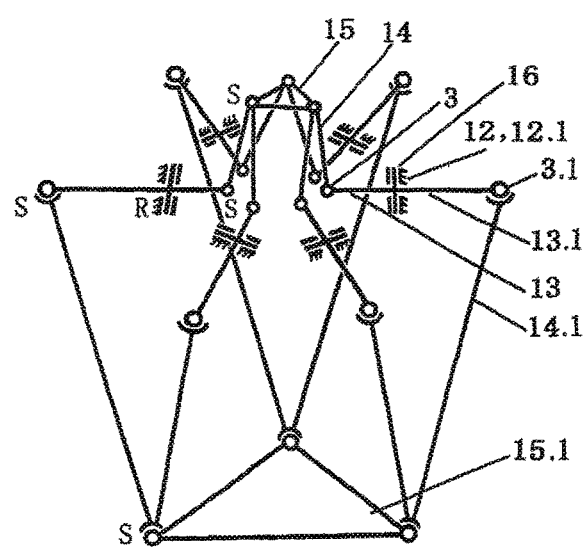

The original parallel mechanism of Embodiment 27 (FIG. 83) is a 6-RSS (3T3R) spatial parallel mechanism. The original base platform 12 is a planar regular-hexagonal base platform, the original chain 13 is an RSS chain, the first rotatable pair is an active pair, the axes of the six active pairs are within the base platform plane, the axes of the six active pairs respectively coincide with the six sides of the base platform regular-hexagonal, and the original movable platform 15 is a triangular movable platform.

The multiple-output kinematic pair 16 is a reflectional symmetrical type rotatable pair (with reference to Kinematic Pair No. 5, FIG. 5), with two output ends that are on a straight line and are reflectional symmetrical with each other. The primary output end 3 is at the inner side of the base platform hexagon, and the auxiliary output end 3.1 is at the outer side of the hexagon of the original base platform 12. The two output ends have different sizes (although output ends having the same size may also form a scaled multiple-movable-platform parallel robot). The original base platform 12 is equivalent symmetrical with the derivative base platform 12.1. Six primary output ends are respectively connected with six downstream original chain s (SS chains). The smaller triangular movable platform above the original base platform plane is a original movable platform 15, and the downstream original chain s are connected to a original movable platform.

The derivative parallel mechanism 11.1 is located below the original base platform 12. The larger triangular movable platform below the plane of the original base platform 15 is a derivative movable platform 15.1. Six auxiliary output ends are respectively connected with six auxiliary derivative chains (SS chains). The auxiliary derivative chains 14.1 are connected to a derivative movable platform 15.1. The auxiliary derivative chains are scaled symmetrical with the downstream original chain s; the derivative movable platform 15.1 is scaled reflectional symmetrical with the original movable platform 15.

At a home position, the primary output ends and the auxiliary output ends are all within the base platform plane. The derivative movable platform is scaled reflectional symmetrical with the original movable platform, and the derivative parallel mechanism is scaled reflectional symmetrical with the original parallel mechanism.

Embodiment 28

The original parallel mechanism of Embodiment 28 (FIG. 84) is a 3-PRS (1T2R) spatial parallel mechanism. The structure of it is similar to that of Embodiment 26. The difference between them is that they have different double-output kinematic pairs. Embodiment 26 uses Kinematic Pair No. 2, while Embodiment 28 uses Kinematic Pair No. 26. The original base platform 12 is a triangular base platform (the black triangle of FIG. 84), the original chain 13 is a PRS chain, the sliding pair is an active pair 12a, the axes of three active pairs are within the base platform plane, the axes of three active pairs are arranged in Y-shape, the angle between the axes of three active pairs is 120 degrees, and the original movable platform 12 is a triangular movable platform.

The multiple-output kinematic pair is a scaled translationally symmetrical type sliding pair (with reference to Kinematic Pair No. 26, FIG. 26), with two output ends that are scaled translational symmetrical with each other. For the sake of clear and simple expression, a straight line extending through two rectangles in this figure represents Kinematic Pair No. 26. Three primary output ends are respectively located at three apexes of a regular triangle, and three auxiliary output ends are also respectively located at three apexes of a regular triangle. The auxiliary output end triangle is the largest one, the primary output end triangle is next to it in size, and the original base platform triangle is the smallest one. The three triangles are co-planar. The three primary output ends 3 are respectively connected with three downstream original chain s 14, and the three downstream original chain s 14 are connected to an original movable platform 15; the three auxiliary output ends 3.1 are respectively connected with three auxiliary derivative chains 14.1, and the three derivative chains 13.1 are connected to a derivative movable platform 15.1. The auxiliary derivative chains are scaled symmetrical with the downstream original chain s; the original base platform is equivalently symmetrical with the derivative base platform. The smaller triangular movable platform above the original base platform plane is an original movable platform 15, and the larger triangular movable platform above the original base platform plane is a derivative movable platform 15.1. The derivative movable platform is scaled translationally symmetrical with the original movable platform. The derivative parallel mechanism is scaled translationally symmetrical with the original parallel mechanism.

(VI) Walking Parallel Robot Embodiments (Embodiments 29-31)

Embodiment 29

Embodiment 29 (FIG. 85.1, FIG. 85.2) is a double-sided walking parallel robot having a fixed returning ring. The robot comprises two reflectional symmetrical double-moving-platform parallel robots (one is called as Leg A, and the other one is called as Leg B) and one returning ring. Leg A 21.1 is a reflectional symmetrical with double-moving-platform parallel robot, and Leg B 21.2 is also a reflectional symmetrical with double-moving-platform parallel robot. Leg A and Leg B each have an original parallel mechanism, and the two original parallel mechanisms are each a 6-PSS parallel leg mechanism. Sliding pairs comprise an active pair and a double-output kinematic pair, and the primary output end is reflectional symmetrical auxiliary output end. The double-output kinematic pair of Leg A is represented by 16.4, and the double-output kinematic pair of Leg B is represented by 16.5. The axes of the active pairs coincide with respective sides of the hexagon.

Two original parallel mechanisms are located at the same side of the original base platform plane. Since the two parallel mechanisms at the same side of the original base platform are reflectionally symmetrical with the two parallel mechanisms at the opposite side, only the two parallel leg mechanisms at the same side of the original parallel mechanism will be described here for simplicity. Two parallel mechanisms located at the same side of the original base platform form a walking parallel robot.

The original base platform of Leg A is a smaller regular hexagon, and the original base platform of Leg B is a larger regular hexagon. The two regular hexagons are on a plane and are concentric with each other. The sides of the two regular hexagons are parallel with each other. In FIG. 85.1, Leg A is inside the smaller regular hexagon 22.1, and Leg B is outside the larger regular hexagon 22.2. The two regular hexagons are fixedly connected with to each other at their apexes to form hip joints 23. The length of the side of the larger regular hexagon is the radius Rc of the hip joint.

The parallel leg mechanism A is larger, and parallel leg mechanism B is smaller, with the smaller one within the larger one (FIG. 85.1). The movable platforms each form a foot arch, and each movable platform foot arch is equipped with three toes. The three toes are respectively located at the apexes of the corresponding equilateral triangle. Of the original movable platform Leg A is foot arch A, the foot arch A being smaller and forming an Y-shape convex foot arch 25.1 on which toes 26.1 are provided; the original movable platform of Leg B is foot arch B, the foot arch B being larger are forming a ring-like expanded convex foot arch 25.2 on which toes 26.2 are formed. In this figure, Ra represents the radius of the circumscribed circle of the three toes 26.2 on the outer legs, Rb represents the radius of the circumscribed circle of the three toes 26.1 on the inner legs. Ra is larger than or equal to Rb.

Two derivative parallel mechanisms are reflectional symmetrical with the original parallel mechanism. The symmetrical plane is the base platform plane.

The returning ring 27 is mounted to the hip joint 23 via a link rod 28 (FIG. 85.2). The returning ring 27 and the hip joints 23 share the same center.

Two derivative parallel mechanisms located at another side of the original base platform have similar structures and are not described repetitively.

The radius of the returning ring has three sets of suggested data. For each group of data, the radius of the returning ring is larger than the radius of the hip joints. The double-sided walking parallel robot having a fixed returning ring is suitable to be used in the case where the height of the double-sided walking parallel robot is smaller.

The first set of data: the radius of the circumscribed circle of the toe triangle is 50 cm. When the foot arch extends to a longest position, the distance from the toe to the base platform plane is 30 cm, the minimum height of the whole double-sided robot is about 40 cm, and the radius of the returning ring is 63 cm. In various standing-by-side states, the walking robot can always return to its vertical upstanding state.

The second set of data: the radius of the circumscribed circle of the toe triangle is 50 cm. When the foot arch extends to a longest position, the distance from the toe to the base platform plane is 30 cm; if the radius of the returning ring is 63 cm, the walking robot can return to its vertical upstanding state even in the worst condition. For a configuration having a radius of the returning ring of 50 cm (minimum value), when the walking robot is standing-by-side, walking robot can return to its vertical upstanding state only if the parallel leg mechanism is shortened to a certain degree. Although the ability of returning to vertical upstanding state is relatively weak, the structure is more compact and flexible and the passing through ability is relatively high.

The third set of data: the radius of the circumscribed circle of the toe triangle is 50 cm. When the foot arch extends to a longest position, the distance from the base platform plane to the toes is smaller than 26 cm, and the minimum height of the whole double-sided robot is about 36 cm; then, only the radius of the returning ring is set to be the minimum value of 50 cm, the walking robot can always return to its vertical upstanding state in various conditions. In the configuration having these dimensions, the structure is compact and flexible, the ability of returning to vertical upstanding state is relatively high, and the passing-through ability is relatively high.

For the double-sided walking parallel robot having the fixed returning ring, if the foot arch of the outer leg is in the form of a Y-shape convex foot arch, the mechanism will become more compact.

Embodiment 30

Embodiment 30 (FIG. 86, a partial view) is a double-sided walking parallel robot having an adjustable returning ring.

The returning ring is composed of three arched rods 29, opposite ends of each arched rod are formed with slots extending in the direction of the tangent line of the circle. The three arched rods are overlapped with each other. The base platform and the returning ring are connected by three CR serial mechanism 30. The cylinder pair of the CR serial mechanism 30 is connected to the hip joint 23, and the rotatable pair is connected to slot in the arched rod 29; the rotatable pair movably fits with slots in two neighboring arched rods so that the rotatable pair is slidable in the slots in the arched rods; the three arched rods 29 are connected to form a circle. The structure of the returning ring can be seen from FIG. 86. In FIG. 86, for the sake of clarity, detailed structures of two legs are not shown, and two hexagonal are used for representing the hip joints and the parallel leg mechanisms.

When the cylinder pair of the CR serial mechanism extends to its largest length, the returning ring is in the form of a circle, and now the returning ring has two functions. First, when the walking parallel robot is in a standing-by-side state, the returning ring helps the walking parallel robot to return to a normal upstanding state (or a reversed state); second, when the walking parallel robot is in a standing-by-side state and cannot return to the normal upstanding state, the returning ring can be used as a rolling ring. When the cylinder pair of the CR serial mechanism extends to the shortest length, the returning ring is shrunk to become smaller, and now the walking robot has better passing-through ability.

Now a group of reference dimensions of the returning ring are given below: the radius of the circumscribed circle of the toe triangle is 50 cm. When the foot arch extends to a longest position, and the distance from the base platform plane to the toes is 40 cm, the maximum radius of the returning ring is 92 cm, so that in various conditions walking robot can always return to its vertical upstanding state. After the returning ring ix contracted, the minimum radius is about 53 cm. In the state of the minimum radius, the robot still has a certain degree of returning ability. That is, only when the parallel leg mechanism is the shortest one, the walking robot has the ability of returning to vertical upstanding state.

For a double-sided walking parallel robot having an adjustable returning ring, we suggest using it in a configuration that the overall height is larger. Since the returning ring has the ability of retracting, the passing-through ability and the returning ability can both be achieved. A walking parallel robot having a larger size can be manufactured, which is conducive to increasing walking speed and enlarging carrying space.

Embodiment 31

Embodiment 31: by slightly modifying Embodiment 30, Embodiment 31 is formed. In Embodiment 30, the CR serial mechanism connecting the returning ring and the hip joints is substituted by an RR serial mechanism. The axis of the rotatable pair is perpendicular to the base platform plane. The rotatable pair connected with the base platform is a driving pair, and the returning ring can be contracted by rotating the driving pair. Other aspects can be understood with reference to Embodiment 30.

(VII) Embodiments of a Symmetrical Double-Platform Parallel Robot Having Combined Downstream Chains (Embodiments 32-33)

Embodiment 32: the original parallel mechanism of Embodiment 32 uses a 6-DOF parallel mechanism proposed by Ben-Horin as prototype. Ben-Horin's 6-DOF parallel mechanism has three chains, each chain being composed of a planar 2-DOF dolly and an SR chain which are connected in series. In the present disclosure, the planar 2-DOF dolly is substituted by a 2-translational-DOF planar parallel mechanism. For example, the 2-DOF dolly is substituted by (2-RR>R) (">" represents that two chains are combined into one chain). The planar parallel mechanism substituting the 2-DOF dolly is called as a 2-DOF planar mechanism. In the present embodiment, the planar 2-DOF dolly is substituted by (2-RR>R). A (2-RR>R) chain is on the base platform plane, and all the axes of the rotatable pairs are perpendicular to the base platform plane. Thus, there are six chains connected with the base platform. The third rotatable pair on the chain comprises a double-output kinematic pair. Two neighboring original chain s share one double-output kinematic pair, and their two downstream original chain s are combined into one downstream original chain. The SR chains remain unchanged. The modified Ben-Horin parallel mechanism has six original chain s and still three downstream chains, and thus we call it as a new Ben-Horin parallel mechanism. The new Ben-Horin parallel mechanism meets the requirements of the invention to the original parallel mechanism. Thus, it can be used as a generating element in the present embodiment.

Embodiment 32

Embodiment 32 (FIG. 87) shows a symmetrical double-platform parallel robot having combined downstream chains. A single original chain can be represented as an RRRSR chain, and the third rotatable pair comprises a double-output kinematic pair. Two neighboring original chain s share one double-output kinematic pair 31, and the two neighboring original chain s and the derivative chains form structure of (2-RR>R<2-SR) (">" represents that two front chains are connected to one kinematic pair; "<" represents that the front kinematic pair has two output ends which are connected with two downstream chains). The two neighboring original chain s which share one double-output kinematic pair 31 are called as combined double chains.

The original base platform is in the form of a ring or a hexagon, with three planar parallel mechanisms (2-RR>R) being mounted to the base platform B1 or being parallel with the base platform plane.

Three planar parallel mechanisms (2-RR>R) are distributed inside the hexagon. The double-output kinematic pair is on the inner side of the hexagon. An upper end of the double-output kinematic pair is a primary output end 32 connected to the downstream original chain 33 (SR), and the lower end of the double-output kinematic pair is an auxiliary output end 32.1 connected to an auxiliary derivative original chain 33.1 (SR). Three downstream original chain s SR on the upper ends are connected to the original movable platform 15, and three auxiliary derivative chains SS on the lower ends are connected to the derivative movable platform 15.1. The derivative movable platform 15.1 is reflectional symmetrical with the original movable platform 15. The derivative parallel mechanism is reflectional symmetrical with the original parallel mechanism.

Embodiment 33

Embodiment 33 (FIG. 88): Embodiment 33 is a double-sided walking parallel robot embodiment with combined downstream chains. Embodiment 33 is formed by slightly modifying two robots of Embodiment 32. The hexagon of the original base platform of Embodiment 32 is modified to a regular hexagon. The upstream portions of original chains are on the inner side of the original base platform hexagon; in the present embodiment, the upstream portions of the chains are all modified as located on the outer side of the hexagon of the original base platform. The original first kinematic pair is mounted to the apex of the hexagon; in the present embodiment, it is modified to be mounted to the sides of the hexagon. Three double chains of the same symmetrical double-platform parallel robot are combined and mounted to three sides of the regular hexagon which are not neighboring to each other. Three double chains of the other symmetrical double-platform parallel robot are combined and mounted to the other three sides of the regular hexagon which are not neighboring to each other. The moving platform is modified as a foot arch structure. In this way, a double-sided walking parallel robot with combined downstream chains is formed. This embodiment will be additionally described with reference to the figure.

FIG. 88 is a top view of Embodiment 33. The regular hexagon in the middle part of the figure are four common base platforms, which are hip joints 23 in the present embodiment. Each side is mounted with a set of combined chains, three chains which are not neighboring to each other are combined to form a symmetrical double-moving-platform parallel robot.

The axes of three front rotatable pairs of three combined double chains of the same parallel leg mechanism are perpendicular to the base platform plane. Six combined double chains are located on the outer side of the regular hexagon. The third rotatable pair comprises a double-output kinematic pair. Two neighboring chains of Leg A share a double-output kinematic pair 31a, and two neighboring chains of Leg B share a double-output kinematic pair 31b. The downstream original chain s are SR chains, Two original parallel mechanisms have six double-output kinematic pairs 31a, 31b, each occupying a 60-degree sector area, so that their working spaces are not interfered with each other (the circles of dashed lines in the figure). To increase the working spaces of the double-output kinematic pairs, two neighboring planar parallel mechanisms (2-RR>R) may be provided on two parallel planes, so that the projections of the neighboring second rotatable pairs of two sets of different combined chains on the base platform plane have an overlapped area, but the working of two neighboring planar parallel mechanisms is not affected.

The movable platform (foot arch A) of the original parallel mechanism A is a Y-shaped convex foot arch 25.1. The movable platform (foot arch B) of the original parallel mechanism B is also a Y-shaped convex foot arch 25.2. The two foot arches are connected with respective output ends via corresponding auxiliary derivative chains (the downstream original chain s). The projections of the two foot arches on the base platform plane are offset from each other by 60 degrees; in addition, foot arch A is relatively high, and foot arch B is relatively low, so that they are not interfered with each other.

According to this solution, the space occupied by the upstream portions (RRR) of the chains in the base platform plane is a surface (theoretically having no volume), the interference area is limited and it is easy to design their layout. The number of downstream portions (SR) of the chains is decreased by half, and the interference space is decreased accordingly. For example, above the original base platform of Embodiment 29, there are 12 auxiliary derivative chains, each derivative chain having its interference space, so the space available for accommodating and arranging equipment is occupied. On the contrary, above the original base platform of the present embodiment, there are only 6 auxiliary derivative chains, so that interference space of six derivative chains is released to be free, and thus the space available for accommodating and arranging equipment is increased. This is conducive to increasing the step length and accommodating space and reducing the structure size.

If the present embodiment is mounted with a returning ring, the radius of the returning ring shall be large enough for encircling the area indicated by the dashed lines. In Embodiment 33, it is also possible to mount generalized sliding pairs on the toes.

The invention claimed is:

1. A multi-motion-platform parallel robot, comprising:
an original parallel mechanism; and
a plurality of $N_1$ derivative parallel mechanisms, wherein:
each of the derivative parallel mechanisms possesses $N_2$ degrees-of-freedom (DOFs) and shares an identical set of DOF properties;
$N_1$ is an integer greater than 1;
$N_2$ is one of 2, 3, 4, 5 and 6;
the original parallel mechanism includes an original base platform, an original movable platform and a plurality of $N_2$ original chains;
the plurality of original chains connects the original base platform and the original movable platform;
each of the original chains includes a plurality of generalized kinematic pairs interconnected in series;
each of the derivative parallel mechanisms includes a derivative base platform, a derivative movable platform and a plurality of $N_2$ derivative chains; and
the plurality of derivative chains connects the derivative base platform and the derivative movable platform.

2. The robot in claim 1, wherein:
the original base platform is a planar base platform;
a first generalized kinematic pair on each of the original chains is an active pair;
each of the original chains includes exactly one active pair;
an input end of the first generalized kinematic pair on the original chain is one of a rotatable pair and a sliding pair;
an axis along the input end of the first generalized kinematic pair is parallel to, coincides with or is perpendicular to a plane defined by the original base platform;
at least one of preceding two or three of the generalized kinematic pairs on the original chains is an expandable output kinematic pair;
a plurality of $N_2$ downstream original chains connect the original movable platform; and
the original movable platform is located on one side of or is co-planar with the plane defined by original base platform.

3. The robot in claim 1, wherein each of the movable platforms is mounted with a manipulator.

4. The robot in claim 1, wherein:
the original parallel mechanism further includes a redundant chain connecting the original base platform with the derivative base platform;
the redundant chain is a passive chain;
DOF of the redundant chain is greater than or equal to two but less than or equal to six; and
the original chain is an unrestraint 6-DOF chain.

5. The robot in claim 1, wherein the original parallel mechanism and the derivative parallel mechanism are in symmetry, which refers to identity symmetry, translational symmetry, rotational symmetry, reflectional symmetry, glide reflection symmetry and scale symmetry.

6. The robot in claim 1, wherein transmission between an original parallel mechanism and a derivative parallel mechanism or between derivative parallel mechanisms is provided by an expandable output kinematic pair between them.

7. The robot in claim 2, wherein:
the expandable output kinematic pair has a plurality of $[(N_1+1)\times N_2]$ output ends;
$N_2$ of the output ends are primary output ends on the original chains;
remaining $(N_1 \times N_2)$ of the output ends are auxiliary output ends; and
the primary output end and the auxiliary output end are in structural symmetry.

8. The robot in claim 2, wherein, on the derivative parallel mechanism:
each auxiliary output end is connected with an auxiliary derivative chain in the expandable output kinematic pair on the original chain;
a portion between the auxiliary output end of the boundary kinematic pair and the derivative movable platform is called downstream derivative chain;
the downstream derivative chain portion is also called auxiliary derivative chain;
the auxiliary derivative chain is identical to or substantially identical to the downstream original chain on the original chain;
the auxiliary derivative chain and the downstream original chain on the original chain are in structural symmetry, which refers to translational symmetry, rotational symmetry, reflectional symmetry, glide reflection symmetry and scale symmetry;
a lower end point on the derivative chain is a hinge point (also called derivative lower-end hinge point) interconnecting a derivative chain and a derivative base platform;
a group of $N_2$ derivative lower-end hinge points having a same set of symmetry properties form one of $N_1$ derivative base platforms;
the derivative base platform and the original base platform are in structural symmetry, which refers to identity symmetry, translational symmetry, rotational symmetry, reflectional symmetry, glide reflection symmetry and scale symmetry;

the auxiliary derivative chains having a same set of symmetry properties form a group of auxiliary derivative chains;

the robot includes a plurality of $N_1$ groups of derivative chains;

each of the groups of auxiliary derivative chains include a plurality of $N_2$ auxiliary derivative chains;

the auxiliary derivative chains in a same group, which are connected to a movable platform, form a parallel mechanism;

the movable platform is called derivative movable platform;

the parallel mechanism is called derivative parallel mechanism;

$N_1$ groups of the auxiliary derivative chains are connected to a plurality of $N_1$ derivative movable platforms; and the robot includes a plurality of $N_1$ derivative parallel mechanisms.

9. The robot in claim 2, wherein an axis along an input end of the active pair meets at least one of the following conditions:

a) the axis along the input end of the active pair sits on a plane defined by the original base platform; and at least three of the axes intersect at one point;

b) the axis along the input end of the active pair sits on a plane defined by the original base platform; and the axis is a tangent to a same circle or to a same ellipse, or is a tangent to two concentric circles defined on a same plane;

c) the axis along the input end of the active pair is parallel to or sits on a plane defined by the original base platform; the axes are pairwise parallel or coincide with one another; and d) each axis along the input end of the active pair is perpendicular to a plane defined by original base platform.

10. The robot in claim 7, wherein:

the robot is a symmetric double-motion-platform parallel mechanism;

the primary output end and the auxiliary output end are in scale symmetry; and the derivative chain is identical to or substantially identical to the original chain.

11. The robot in claim 7, wherein:

the robot is a double-motion-platform parallel mechanism;

an axis along an input end of the kinematic pair sits on a plane defined by the original base platform;

the axis further meets at least one of the following conditions:

(a) the axis is a tangent to a same circle or coincides with a radius of the circle;

(b) the axis is a tangent to two concentric circles defined on a same plane or coincides with a radius of the two circles; and (c) the axis is a tangent to a same ellipse;

the generalized kinematic pair includes a multiple-output kinematic pair;

the multiple-output kinematic pair is a dual output kinematic pair;

a first output end of the dual output kinematic pair is a primary output end;

a second other output end of the dual output kinematic pair is an auxiliary output end;

the main output end sits within a circumference of the circle or the ellipse; and the auxiliary output end sits without the circumference of the circle or the ellipse.

12. A double-sided walking parallel robot, comprising:

a first multi-motion-platform parallel robot; and a second multi-motion-platform parallel robot, wherein:

the multi-motion-platform parallel robot includes an original parallel mechanism and a plurality of $N_1$ derivative parallel mechanisms, wherein:

each of the parallel mechanisms possesses $N_2$ degrees-of-freedom (DOFs) and shares an identical set of DOF properties;

$N_1$ is an integer greater than 1;

$N_2$ is one of 2, 3, 4, 5 and 6;

the original parallel mechanism includes an original base platform, an original movable platform and a plurality of $N_2$ original chains;

the plurality of original chains connects the original base platform and the original movable platform;

each of the original chains includes a plurality of generalized kinematic pairs interconnected in series;

each of the derivative parallel mechanisms includes a derivative base platform, a derivative movable platform and a plurality of ($N_2 \times N_1$) derivative chains; and the plurality of derivative chains connect the derivative base platform and the derivative movable platform;

the multi-motion platform parallel robot is a parallel leg mechanism;

an original parallel mechanism on the first multi-motion platform parallel robot, and an original parallel mechanism or a first derivative parallel mechanism on the second multi-motion platform parallel robot are located on a first side to form a first single-sided parallel walking robot;

a derivative parallel mechanism on the first multi-motion platform parallel robot, and a second derivative parallel mechanism on the second multi-motion platform parallel robot are located on a second side to form a second single-sided parallel walking robot; and the first side is opposite to the second side.

13. The robot in claim 12, wherein:

the original base platform of the first multi-motion platform parallel robot and the original base platform of the second multi-motion platform parallel robot are located on a same plane;

the pair of original base platforms are fixedly connected to each other to form a hip joint; and each of the quartet of movable platforms configures a foot-arch.

14. The robot in claim 13, wherein the first multi-motion platform parallel robot and the second multi-motion platform parallel robot are located on the left and right sides, respectively.

15. The robot in claim 13, wherein:

the hip joint is provided with a returning ring;

the returning ring is coupled to the hip joint by a connecting rod;

the returning ring shares a same center with the hip joint;

the original movable platform is provided with a foot arch;

the foot arch is provided with toes;

a radius of the returning ring is greater than $L/\cos \theta$;

the radius of the returning ring is greater than or equal to a greater of the radius of a circumscribed circle of the toe and a radius of a circumscribed circle of the hip joints;

L is a distance from a mid-point between two neighboring toes to a center of the original base platform;

the mid-point of the neighboring toes and the center of the original base platform define a hypothetical connecting line; and θ is an angle defined by the hypothetical connecting line and the original base platform plane.

16. The robot in claim 13, wherein:

one of the first multi-motion platform parallel robot and the second multi-motion platform parallel robot is a larger robot than the other one, which is a smaller robot;

the smaller robot is encompassed by the larger robot; and a pair of foot arches configured on the movable platform located on a same side of the original base platform are different in sizes, in heights or both in sizes and heights.

17. The robot in claim 13, wherein:

the first multi-motion platform parallel robot and the second multi-motion platform parallel robot are disposed in a cross manner; and a pair of foot arches configured on the movable platform located on a same side of the original base platform are different in sizes, in heights or both in sizes and heights.

18. The robot in claim 15, wherein:

the returning ring includes a plurality segments of arched rods;

each of the arched rods has a groove at both ends;

the groove has a same direction as a tangential direction of the returning ring;

an arched rod at least partially overlaps an adjacent arched rod;

the arched rod is provided with a contracting mechanism connected to the hip joint;

the contracting mechanism forms the connecting rod;

the contracting mechanism includes a rotatable pair;

a first end of the rotatable pair is movably engaged with the grooves of the adjacent arched rods; and a second end of the rotatable pair is connected with the hip joint.

19. The robot in claim 15, wherein at least one of the toes is mounted with a generalized movable pair whose axis is perpendicular to a plane defined by the original base platform on each of the foot arches configured on the movable platform.

* * * * *